US009118676B2

(12) United States Patent
Kamakura

(10) Patent No.: US 9,118,676 B2
(45) Date of Patent: Aug. 25, 2015

(54) STORAGE MEDIUM, INFORMATION PROCESSING DEVICE AND METHOD

(71) Applicant: FUJITSU LIMITED, Kawasaki-shi, Kanagawa (JP)

(72) Inventor: Ken Kamakura, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 270 days.

(21) Appl. No.: 13/925,218

(22) Filed: Jun. 24, 2013

(65) Prior Publication Data

US 2013/0290565 A1 Oct. 31, 2013

Related U.S. Application Data

(63) Continuation of application No. PCT/JP2010/073815, filed on Dec. 28, 2010.

(51) Int. Cl.

*G06F 15/16* (2006.01)
*H04L 29/12* (2006.01)
*G06F 21/70* (2013.01)

(Continued)

(52) U.S. Cl.

CPC ................ *H04L 61/10* (2013.01); *G06F 21/32* (2013.01); *G06F 21/40* (2013.01); *G06F 21/70* (2013.01); *H04L 63/107* (2013.01); *H04W 12/06* (2013.01); *G06F 2221/2111* (2013.01);

(Continued)

(58) Field of Classification Search

CPC ....... H04L 61/10; H04L 29/12; H04L 63/205; H04L 45/02; H04W 12/06; G06F 15/16
USPC .................................. 709/217, 245; 726/219
See application file for complete search history.

(56) References Cited

U.S. PATENT DOCUMENTS

| | | | | |
|---|---|---|---|---|
| 7,823,207 | B2 * | 10/2010 | Evenhaim | 726/26 |
| 8,368,916 | B2 * | 2/2013 | Mizuno | 358/1.15 |

(Continued)

FOREIGN PATENT DOCUMENTS

| | | |
|---|---|---|
| JP | 2004-88657 | 3/2004 |
| JP | 2006-134151 | 5/2006 |

(Continued)

OTHER PUBLICATIONS

English Translation of PCT International Preliminary Report on Patentability mailed Jul. 11, 2013 in corresponding International Application No. PCT/JP2010/073815.

(Continued)

*Primary Examiner* — Tesfay Yohannes
(74) *Attorney, Agent, or Firm* — Staas & Halsey LLP

(57) ABSTRACT

A computer recognizes a first individual address of each of one or more other devices located in a first environment in which the computer is located at a first point in time, maps each first individual address to a first individual point in a coordinate space, and recognizes a first distribution using coordinates of each first individual point. The computer recognizes a second individual address of each of one or more other devices located in a second environment in which the computer is located at a second point in time, maps each second individual address to a second individual point in the coordinate space, and recognizes a second distribution using coordinates of each second individual point. The computer judges whether the first distribution and the second distribution match in accordance with a distribution matching criterion as to whether two distributions match.

12 Claims, 34 Drawing Sheets

(51) Int. Cl.

| | |
|---|---|
| ***G06F 21/32*** | (2013.01) |
| ***G06F 21/40*** | (2013.01) |
| ***H04L 29/06*** | (2006.01) |
| ***H04W 12/06*** | (2009.01) |

(52) U.S. Cl.

CPC .................. *G06F 2221/2113* (2013.01); *G06F 2221/2149* (2013.01); *H04L 63/205* (2013.01)

(56) References Cited

U.S. PATENT DOCUMENTS

| | | | | |
|---|---|---|---|---|
| 8,539,359 | B2 * | 9/2013 | Rapaport et al. | 715/751 |
| 8,566,726 | B2 * | 10/2013 | Dixon et al. | 715/738 |
| 8,577,933 | B2 * | 11/2013 | Evenhaim | 707/809 |
| 2005/0210269 | A1 * | 9/2005 | Tiberg | 713/186 |
| 2008/0133931 | A1 * | 6/2008 | Kosaka | 713/186 |
| 2008/0168534 | A1 * | 7/2008 | Takamizawa et al. | 726/2 |
| 2008/0209545 | A1 * | 8/2008 | Asano | 726/19 |

FOREIGN PATENT DOCUMENTS

| | | |
|---|---|---|
| JP | 2006-164092 | 6/2006 |
| JP | 2006-338424 | 12/2006 |
| JP | 2006-344013 | 12/2006 |
| JP | 2009-278178 | 11/2009 |

OTHER PUBLICATIONS

International Search Report mailed Mar. 1, 2011 in corresponding International Application No. PCT/JP2010/073815.

* cited by examiner

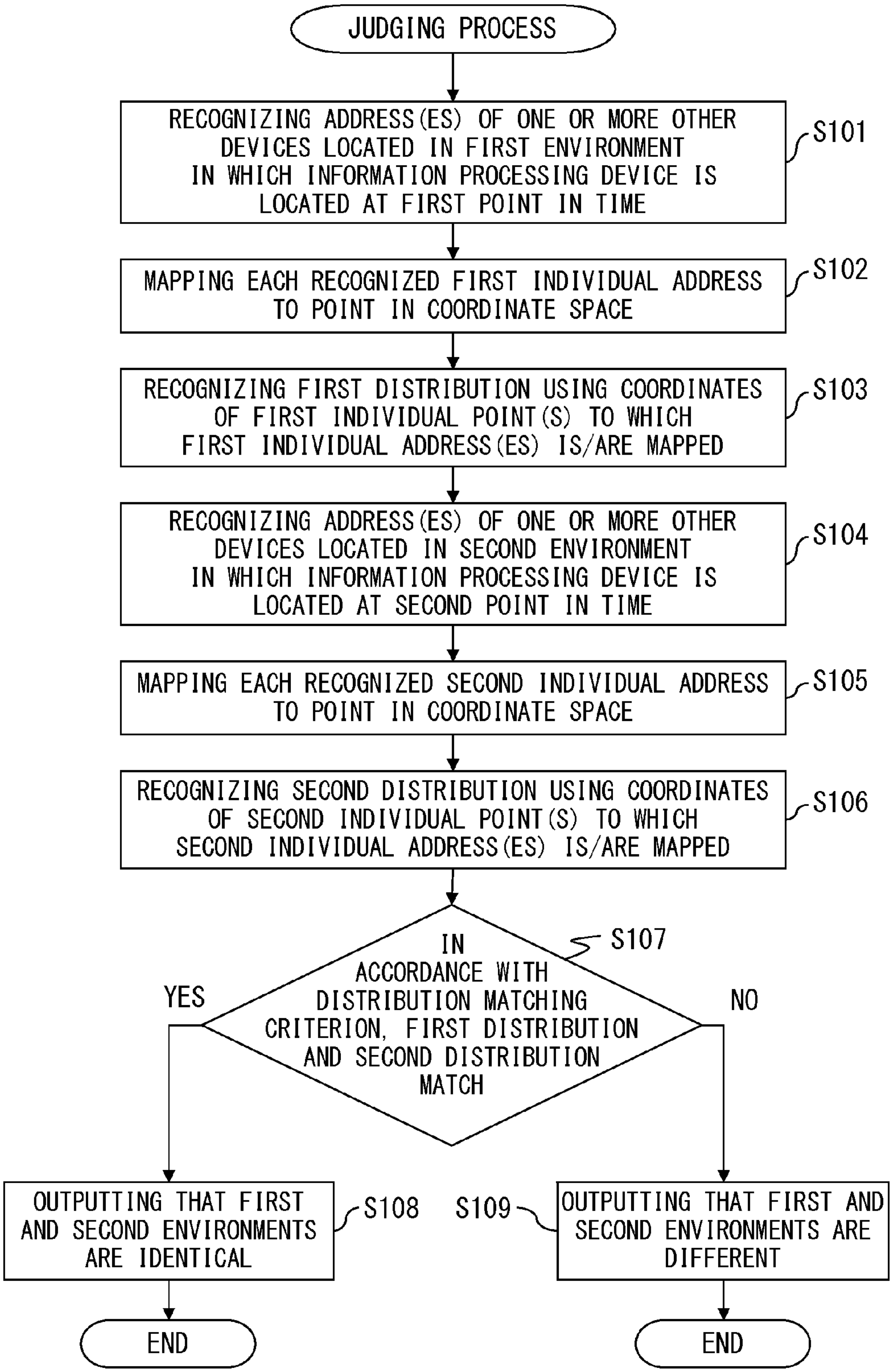
F I G. 2

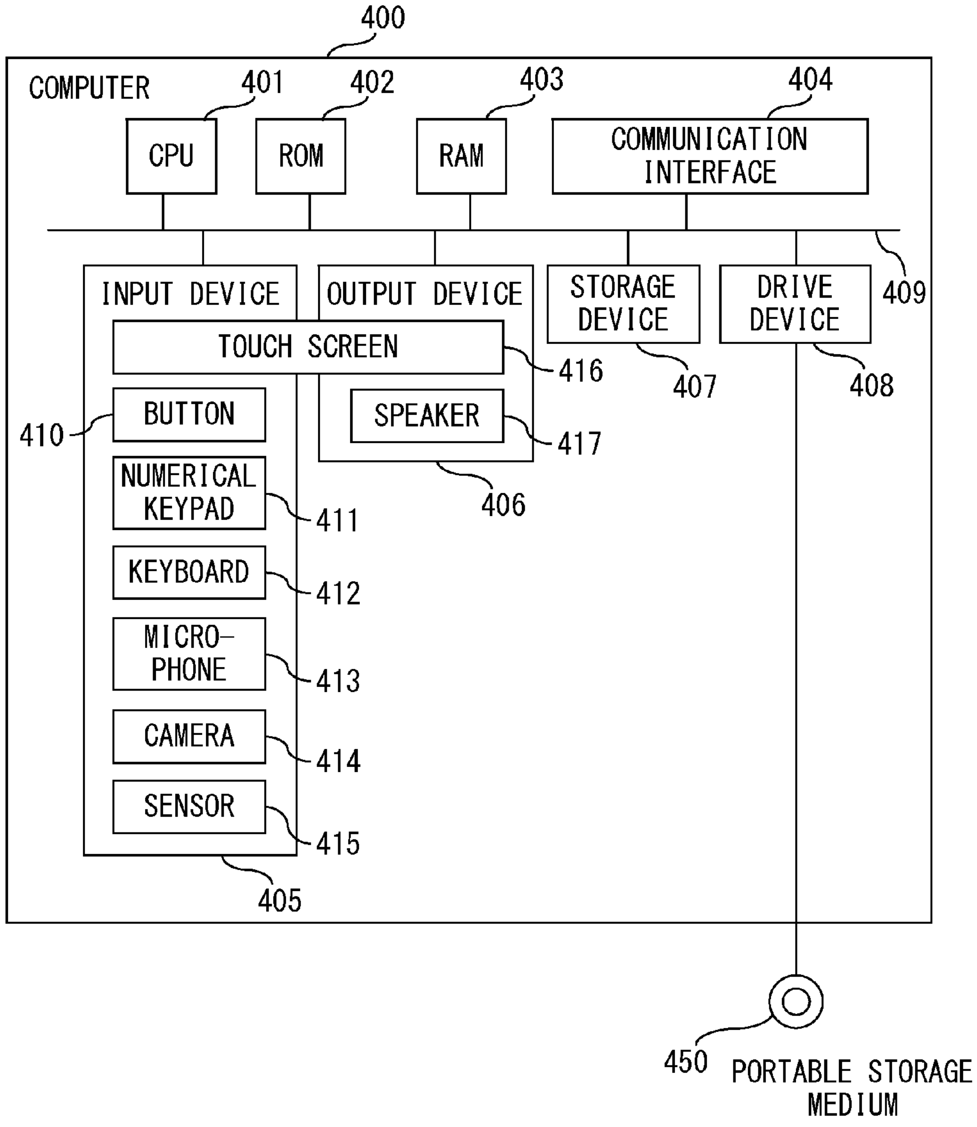
F I G. 4

236

| JUDGMENT RESULT | MATCHING THRESHOLD |
|---|---|
| REGISTERED ENVIRONMENT | 4,500 |
| NEW ENVIRONMENT | 7,000 |

264

| | |
|---|---|
| MEASUREMENT FREQUENCY | 16 |

265

| | |
|---|---|
| REFERENCE FREQUENCY | 16 |

266

| | |
|---|---|
| MEASURING INTERVAL | 30 [MINUTES] |

F I G. 6

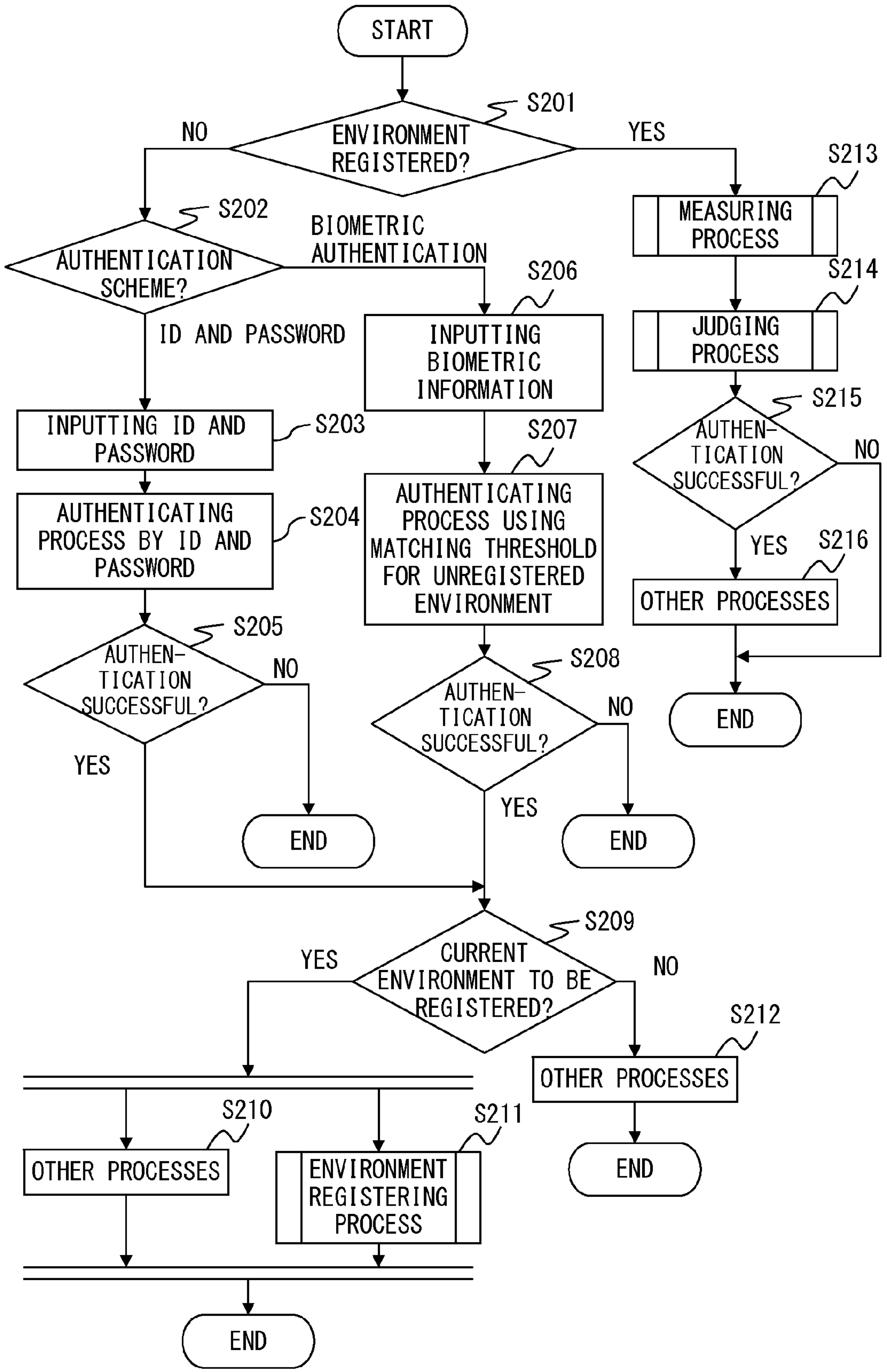
F I G. 7

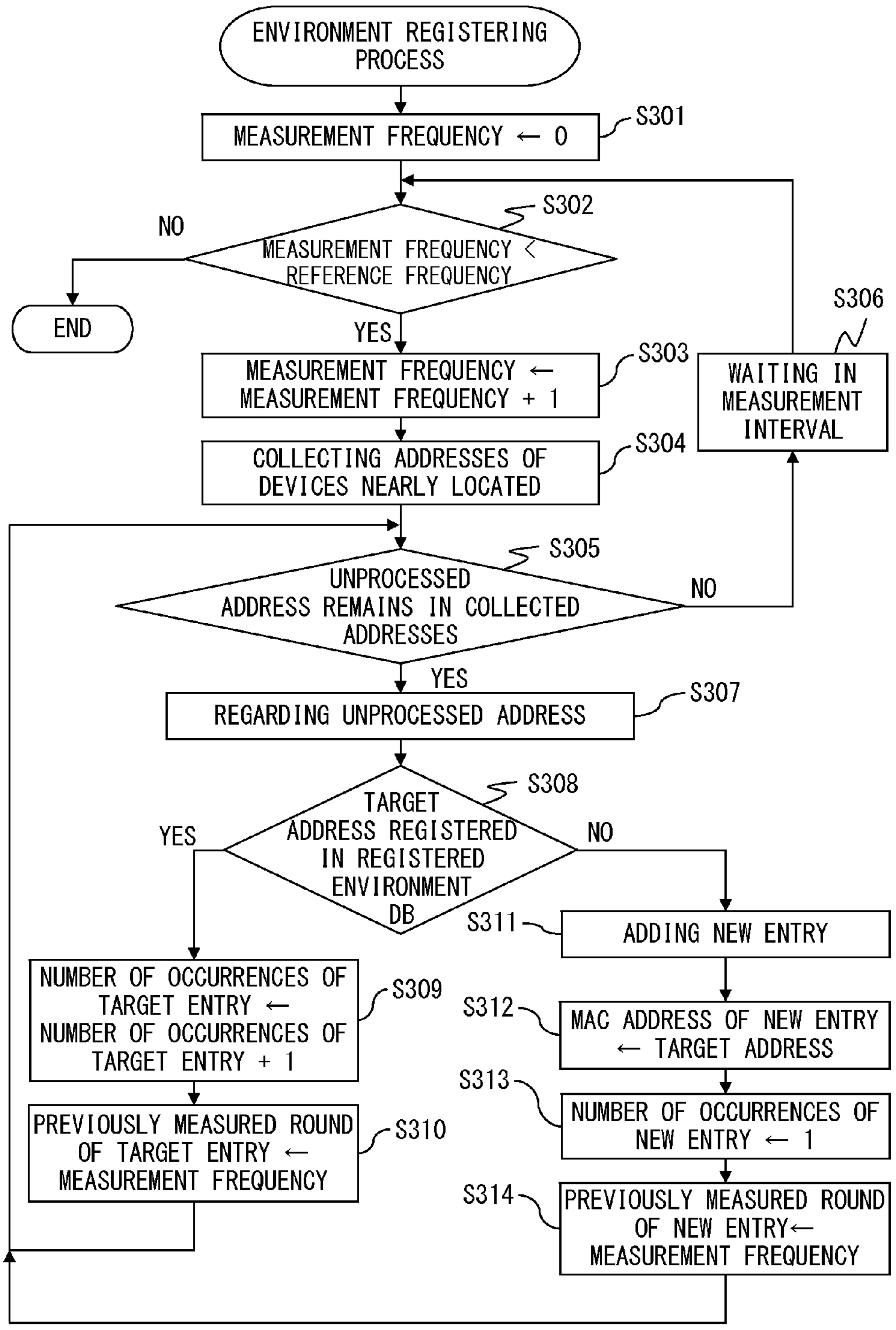
F I G. 8

501a

| | DATE | TIME | MEASUREMENT FREQUENCY | A | B | C | D | E |
|---|---|---|---|---|---|---|---|---|
| REGISTRATION | 2010/8/25 | 9:25 | 1 | ○ | ○ | ○ | – | ○ |
| | | 9:55 | 2 | ○ | ○ | ○ | ○ | ○ |
| | | 10:25 | 3 | ○ | ○ | ○ | ○ | ○ |
| | | 10:55 | 4 | ○ | ○ | ○ | – | ○ |
| | | 11:25 | 5 | ○ | ○ | ○ | ○ | ○ |
| | | 11:55 | 6 | ○ | ○ | ○ | ○ | ○ |
| | | 12:25 | 7 | ○ | ○ | ○ | ○ | ○ |
| | | 12:55 | 8 | ○ | ○ | ○ | – | ○ |
| | | 13:25 | 9 | ○ | ○ | ○ | – | ○ |
| | | 13:55 | 10 | ○ | ○ | ○ | ○ | ○ |
| | | 14:25 | 11 | ○ | ○ | ○ | ○ | ○ |
| | | 14:55 | 12 | ○ | ○ | ○ | ○ | ○ |
| | | 15:25 | 13 | ○ | ○ | ○ | ○ | ○ |
| | | 15:55 | 14 | ○ | ○ | ○ | ○ | – |
| | | 16:25 | 15 | ○ | ○ | – | ○ | – |
| | | 16:55 | 16 | ○ | – | – | ○ | – |
| MEASUREMENT | 2010/8/26 | 9:20 | 17 | ○ | ○ | ○ | ○ | ○ |
| MEASUREMENT | 2010/8/27 | 9:17 | 18 | ○ | ○ | – | ○ | ○ |
| ⋮ | ⋮ | ⋮ | ⋮ | ⋮ | ⋮ | ⋮ | ⋮ | ⋮ |

FIG. 9

| ADDRESS ABBREVI-ATION | MAC ADDRESS | NUMBER OF OCCURRENCES | PREVIOUSLY MEASURED ROUND | ODD OCTET CONCATENA-TION | EVEN OCTET CONCATENA-TION | X COORDI-NATE | Y COORDI-NATE | ANGLE WITH RESPECT TO CENTROID [° ] |
|---|---|---|---|---|---|---|---|---|
| A | 00c0e6f62ecf | 16 | 16 | 00e62e | c0f6cf | 26 | 95 | -72.50 |
| B | 0054ef8a2c54 | 15 | 15 | 00ef2c | 548a54 | 28 | 36 | 66.61 |
| C | 0015af5a84b6 | 14 | 14 | 00af84 | 155ab6 | 32 | 78 | -74.21 |
| D | 00c3a54af566 | 12 | 16 | 00a5f5 | c34a66 | 85 | 66 | -170.66 |
| E | 00645a16b1b8 | 13 | 13 | 005ab1 | 6416b8 | 17 | 16 | 63.98 |

270a (MAC ADDRESS through PREVIOUSLY MEASURED ROUND)

503a (X COORDI-NATE through ANGLE WITH RESPECT TO CENTROID)

F I G. 1 0

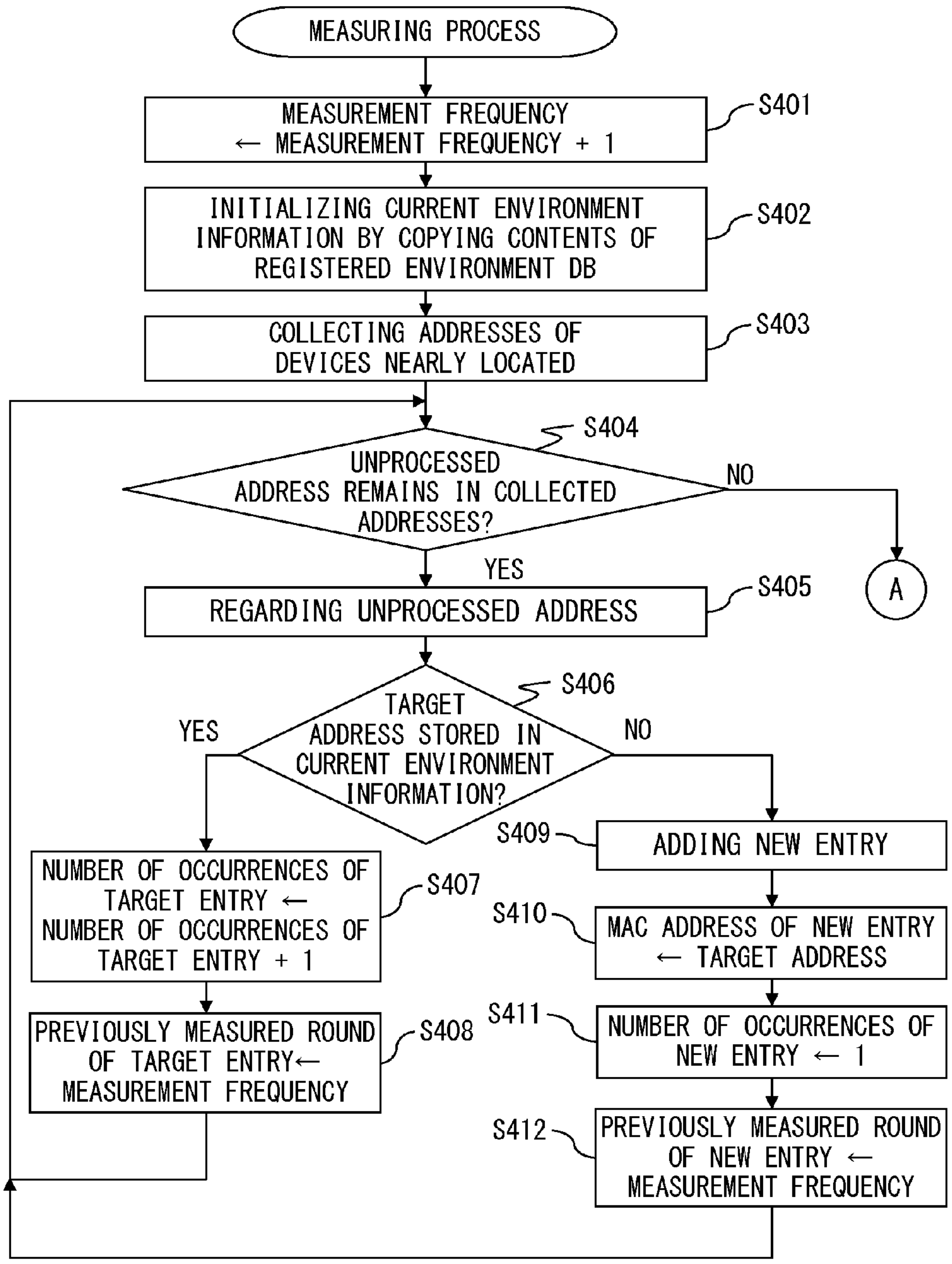
F I G. 1 1

295a

| ADDRESS ABBREVIATION | MAC ADDRESS | BEFORE MOVEMENT | | NUMBER OF OCCURRENCES | PREVIOUSLY MEASURED ROUND | ABSENCE RATE [%] | NUMBER OF ELAPSED ROUNDS | TIME ELAPSE RATE [%] | DISTANCE | RANDOM ANGLE [° ] | AFTER MOVEMENT | | |
|---|---|---|---|---|---|---|---|---|---|---|---|---|---|
| | | X COORDINATE | Y COORDINATE | | | | | | | | X COORDINATE | Y COORDINATE | ANGLE WITH RESPECT TO CENTROID [° ] |
| A | 00c0e6f62ecf | 26 | 95 | 17 | 17 | 0.0 | 0 | 0.0 | 0.0 | 45 | 26 | 95 | -71.84 |
| B | 0054ef8a2c54 | 28 | 36 | 16 | 17 | 5.9 | 0 | 0.0 | 5.9 | 45 | 30 | 38 | 69.23 |
| C | 0015af5a84b6 | 32 | 78 | 15 | 17 | 11.8 | 0 | 0.0 | 11.8 | 40 | 37 | 82 | -86.53 |
| D | 00c3a54af566 | 85 | 66 | 13 | 17 | 23.5 | 0 | 0.0 | 23.5 | 260 | 83 | 54 | 174.55 |
| E | 00645a16b1b8 | 17 | 16 | 14 | 17 | 17.6 | 0 | 0.0 | 17.6 | 110 | 14 | 24 | 55.20 |

296a 297a 505a

F I G. 13

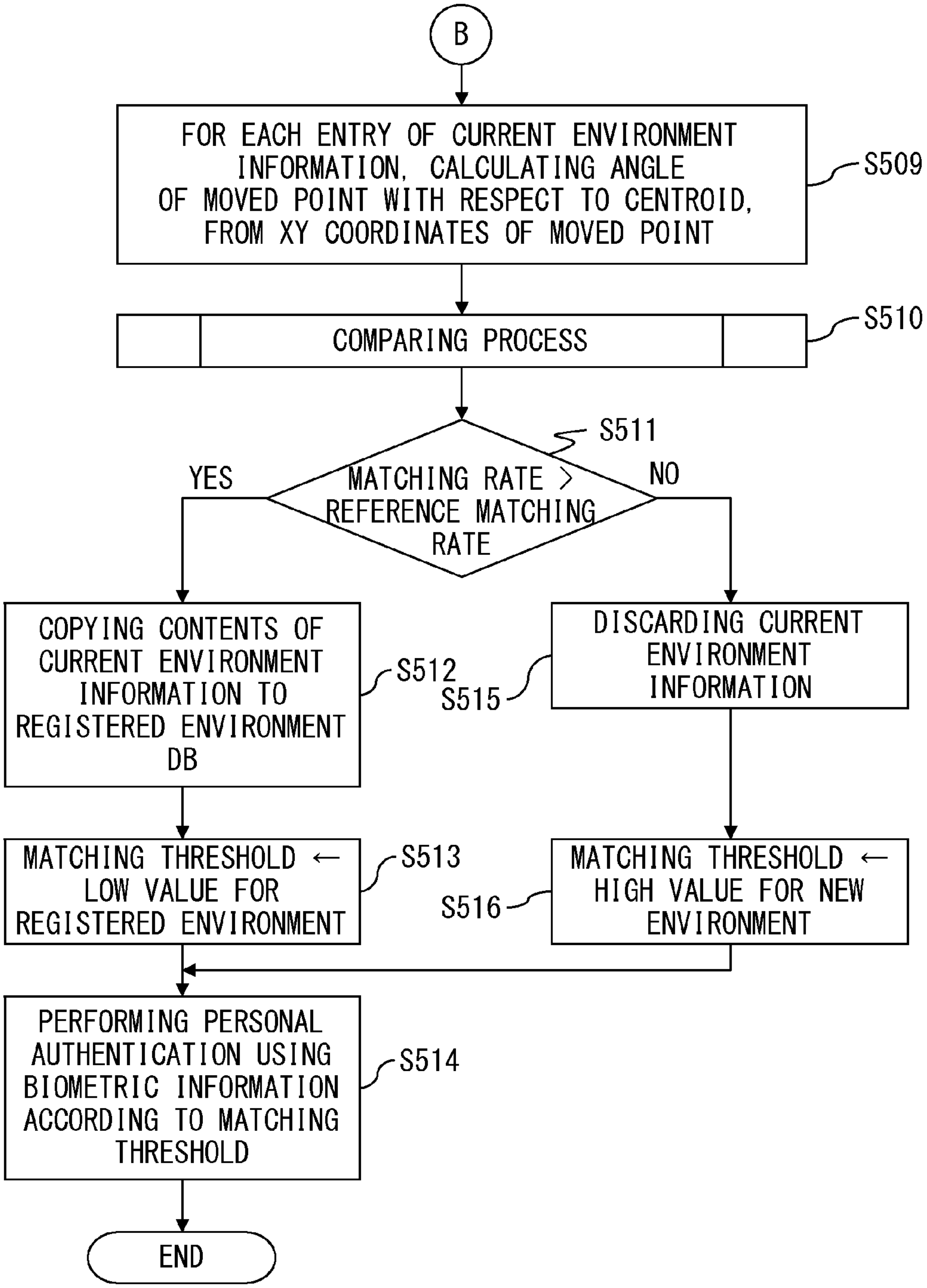
F I G. 1 5

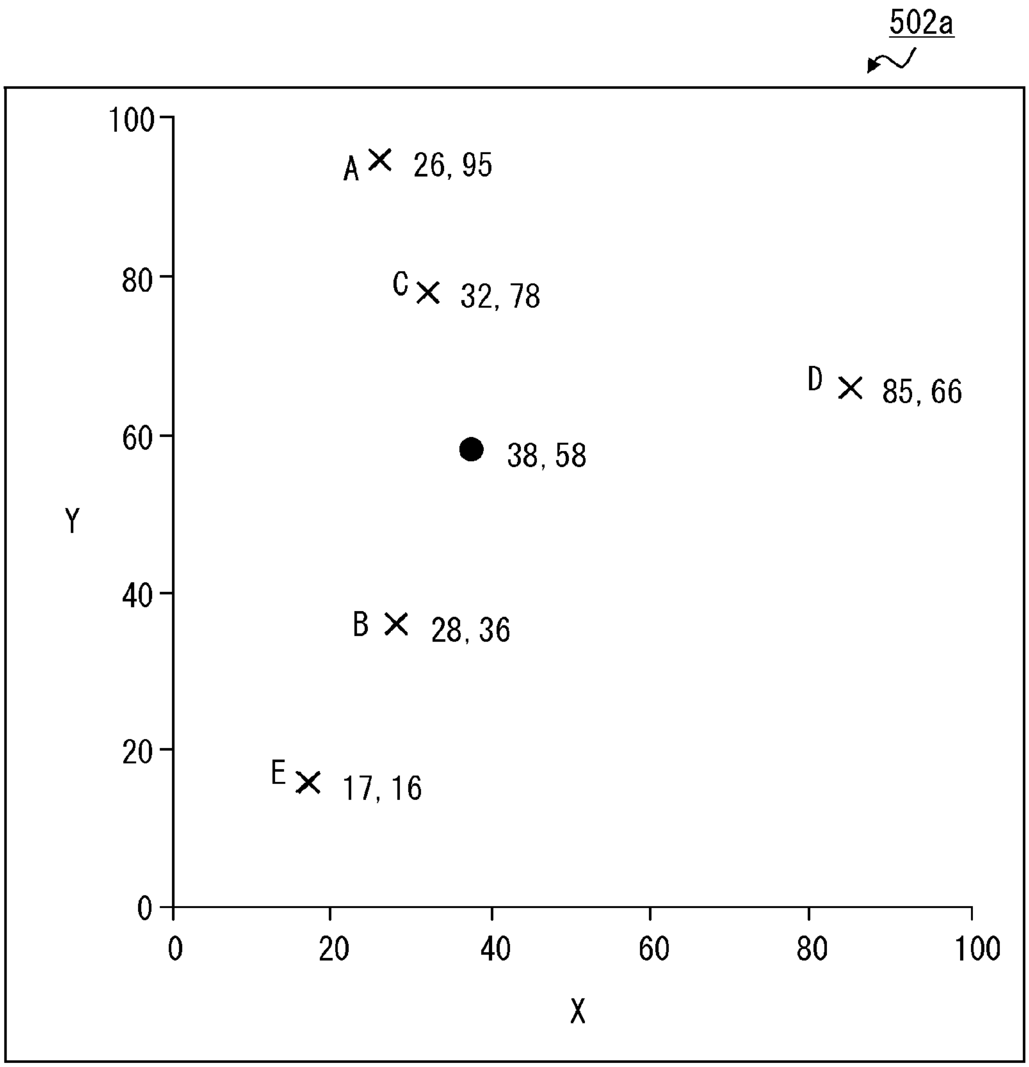
F I G. 1 6

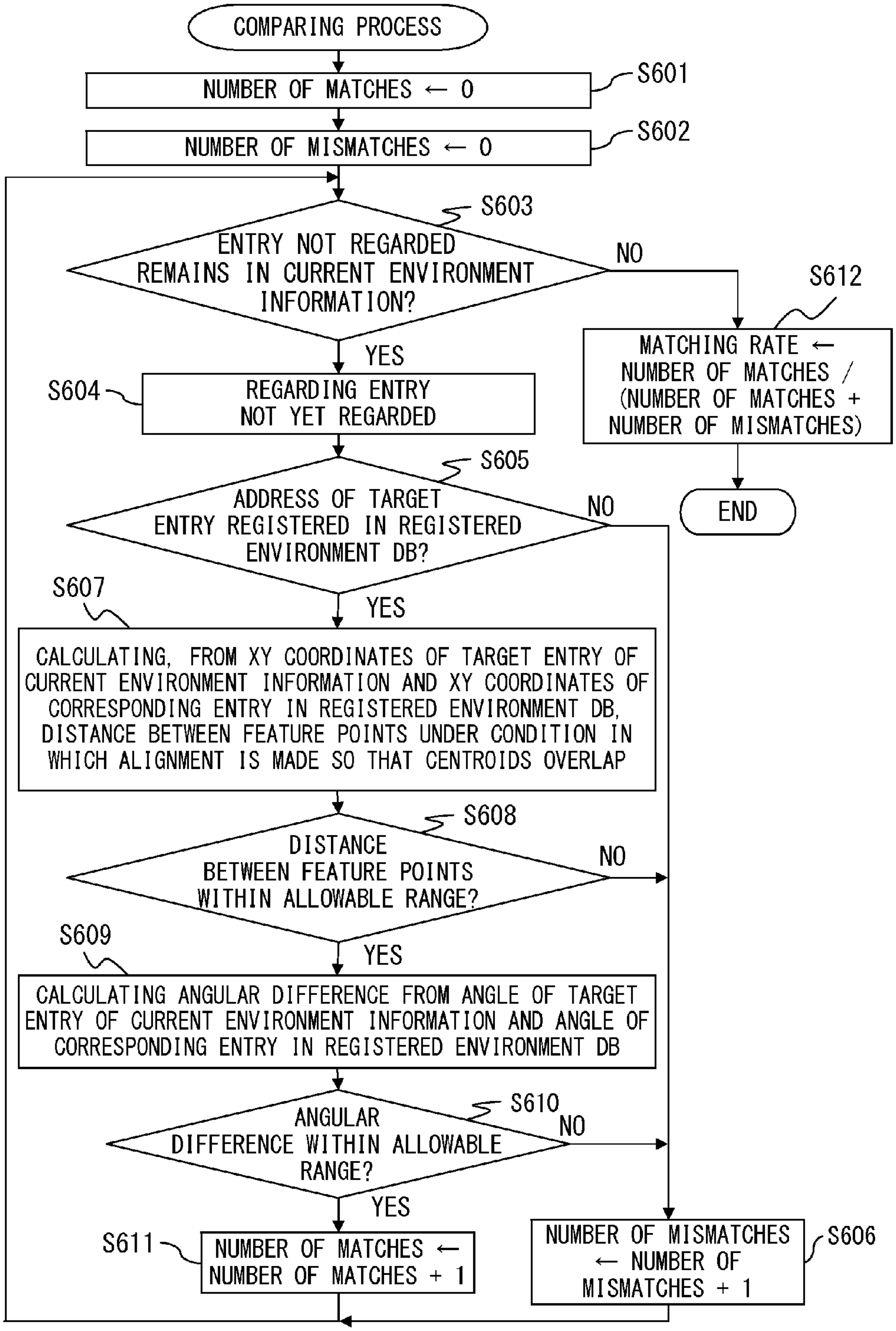
F I G. 2 0

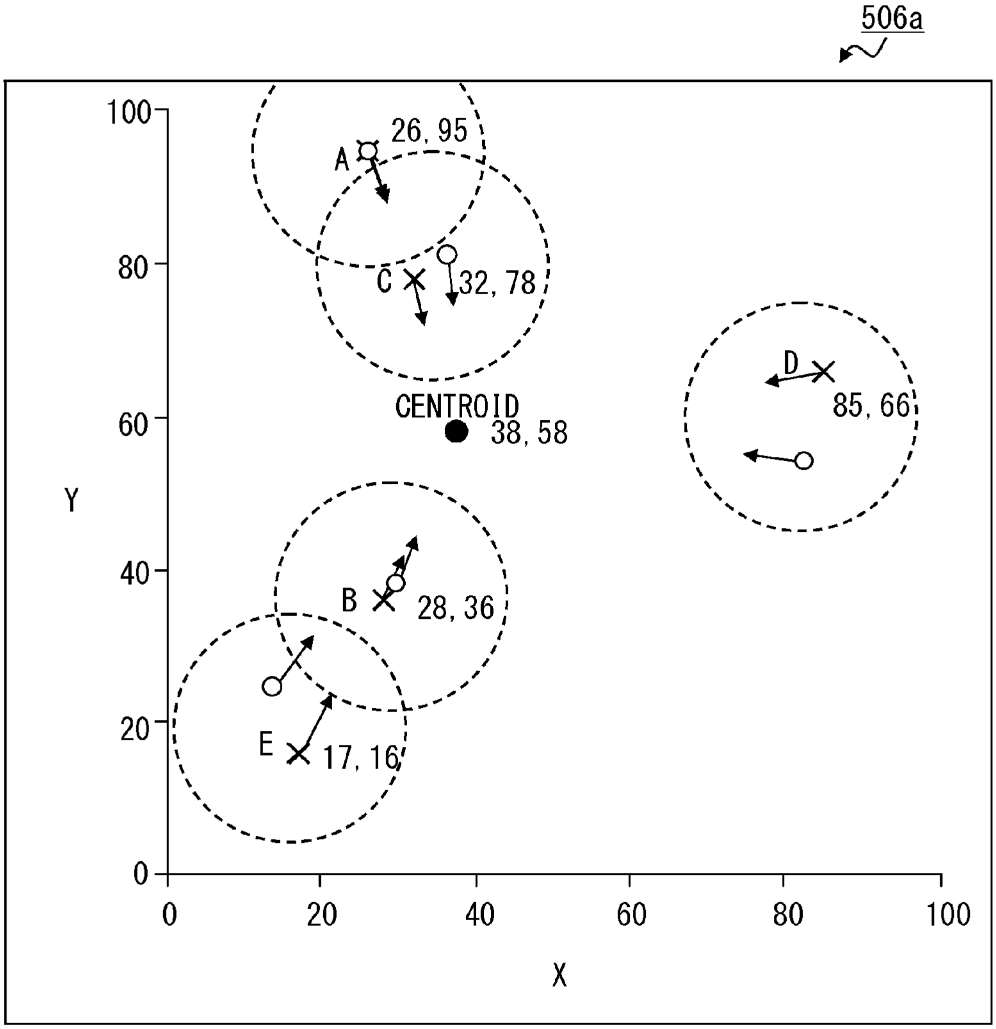
F I G. 2 1

507a

| ADDRESS ABBREVIATION | REGISTERED ENVIRONMENT | CURRENT ENVIRONMENT | ANGULAR DIFFERENCE [° ] |
|---|---|---|---|
| | ANGLE WITH RESPECT TO CENTROID [° ] | ANGLE WITH RESPECT TO CENTROID [° ] | |
| A | -72. 50 | -71. 84 | 0. 67 |
| B | 66. 61 | 69. 23 | 2. 62 |
| C | -74. 21 | -86. 53 | 12. 32 |
| D | -170. 66 | 174. 55 | 14. 80 |
| E | 63. 98 | 55. 20 | 8. 78 |

F I G. 2 2

501b

| | DATE | TIME | MEASUREMENT FREQUENCY | A | B | C | D | E | F | G | H | I |
|---|---|---|---|---|---|---|---|---|---|---|---|---|
| REGISTRATION | 2010/8/25 | 9:25 | 1 | ○ | ○ | ○ | – | ○ | – | – | – | – |
| | | 9:55 | 2 | ○ | ○ | ○ | ○ | ○ | – | – | – | – |
| | | 10:25 | 3 | ○ | ○ | ○ | ○ | ○ | – | – | – | – |
| | | 10:55 | 4 | ○ | ○ | ○ | – | ○ | – | – | – | – |
| | | 11:25 | 5 | ○ | ○ | ○ | ○ | ○ | – | – | – | – |
| | | 11:55 | 6 | ○ | ○ | ○ | ○ | ○ | – | – | – | – |
| | | 12:25 | 7 | ○ | ○ | ○ | ○ | ○ | – | – | – | – |
| | | 12:55 | 8 | ○ | ○ | ○ | ○ | ○ | – | – | – | – |
| | | 13:25 | 9 | ○ | ○ | ○ | – | ○ | – | – | – | – |
| | | 13:55 | 10 | ○ | ○ | ○ | ○ | ○ | – | – | – | – |
| | | 14:25 | 11 | ○ | ○ | ○ | ○ | ○ | – | – | – | – |
| | | 14:55 | 12 | ○ | ○ | ○ | ○ | ○ | – | – | – | – |
| | | 15:25 | 13 | ○ | ○ | ○ | ○ | ○ | – | – | – | – |
| | | 15:55 | 14 | ○ | ○ | ○ | ○ | – | – | – | – | – |
| | | 16:25 | 15 | ○ | ○ | ○ | – | – | – | – | – | – |
| | | 16:55 | 16 | ○ | – | ○ | ○ | – | – | – | – | – |
| MEASUREMENT | 2010/8/26 | 9:20 | 17 | ○ | – | ○ | – | – | ○ | ○ | ○ | ○ |
| MEASUREMENT | 2010/8/27 | 9:17 | 18 | ○ | ○ | ○ | – | ○ | – | – | – | – |
| ⋮ | ⋮ | ⋮ | ⋮ | ⋮ | ⋮ | ⋮ | ⋮ | ⋮ | ⋮ | ⋮ | ⋮ | ⋮ |

| ADDRESS ABBREVI-ATION | MAC ADDRESS | BEFORE MOVEMENT | | NUMBER OF OCCUR-RENCES | PREVI-OUSLY MEAS-URED ROUND | AB-SENCE RATE [%] | NUMBER OF ELAPSED ROUNDS | TIME ELAPSE RATE [%] | DIS-TANCE | RANDOM ANGLE [° ] | AFTER MOVEMENT | | |
|---|---|---|---|---|---|---|---|---|---|---|---|---|---|
| | | X COORDI-NATE | Y COORDI-NATE | | | | | | | | X COORDI-NATE | Y COORDI-NATE | ANGLE WITH RESPECT TO CENTROID [° ] |
| A | 00c0e6f62ecf | 26 | 95 | 17 | 17 | 0 | 0 | 0 | 0. 0 | 85 | 26 | 95 | -65. 43 |
| B | 0054ef8a2c54 | 28 | 36 | 15 | 15 | 12 | 2 | 12 | 16. 6 | 6 | 36 | 37 | 35. 07 |
| C | 0015af5a84b6 | 32 | 78 | 17 | 17 | 0 | 0 | 0 | 0. 0 | 22 | 32 | 78 | -62. 90 |
| D | 00c3a54af566 | 85 | 66 | 12 | 16 | 29 | 1 | 6 | 30. 0 | 321 | 97 | 57 | -167. 07 |
| E | 00645a16b1b8 | 17 | 16 | 13 | 13 | 24 | 4 | 24 | 33. 3 | 115 | 10 | 31 | 20. 51 |
| F | 00151adf551a | 41 | 70 | 1 | 17 | 94 | 0 | 0 | 94. 1 | 50 | 71 | 106 | -110. 51 |
| G | 08a2c515a41b | 84 | 35 | 1 | 17 | 94 | 0 | 0 | 94. 1 | 250 | 68 | -9 | 109. 41 |
| H | 06a1b515cffe | 59 | 26 | 1 | 17 | 94 | 0 | 0 | 94. 1 | 310 | 89 | -10 | 126. 17 |
| I | 03b1aafa151e | 49 | 2 | 1 | 17 | 94 | 0 | 0 | 94. 1 | 150 | 8 | 26 | 26. 36 |

296b 297b 505b

F I G. 24

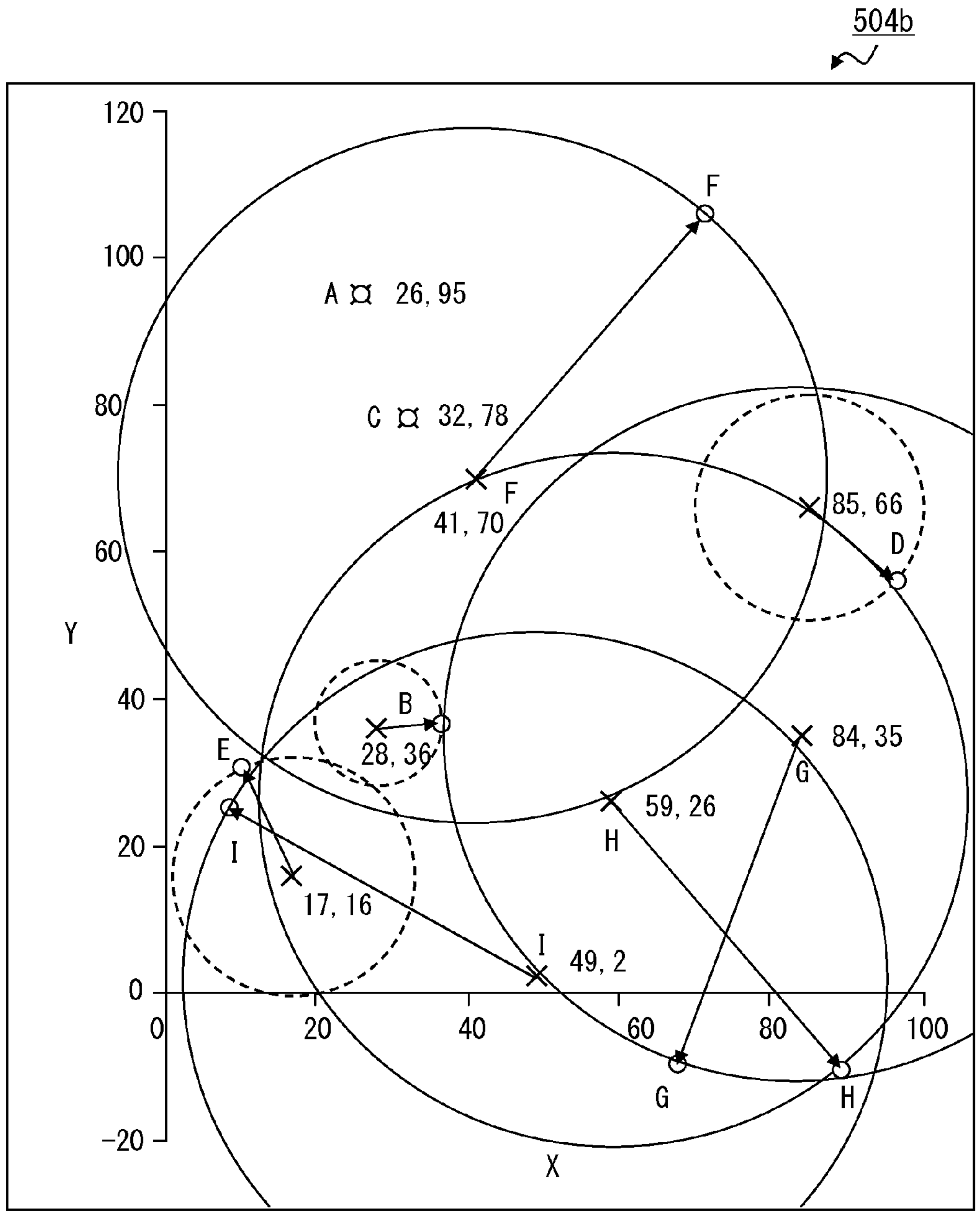
F I G. 25

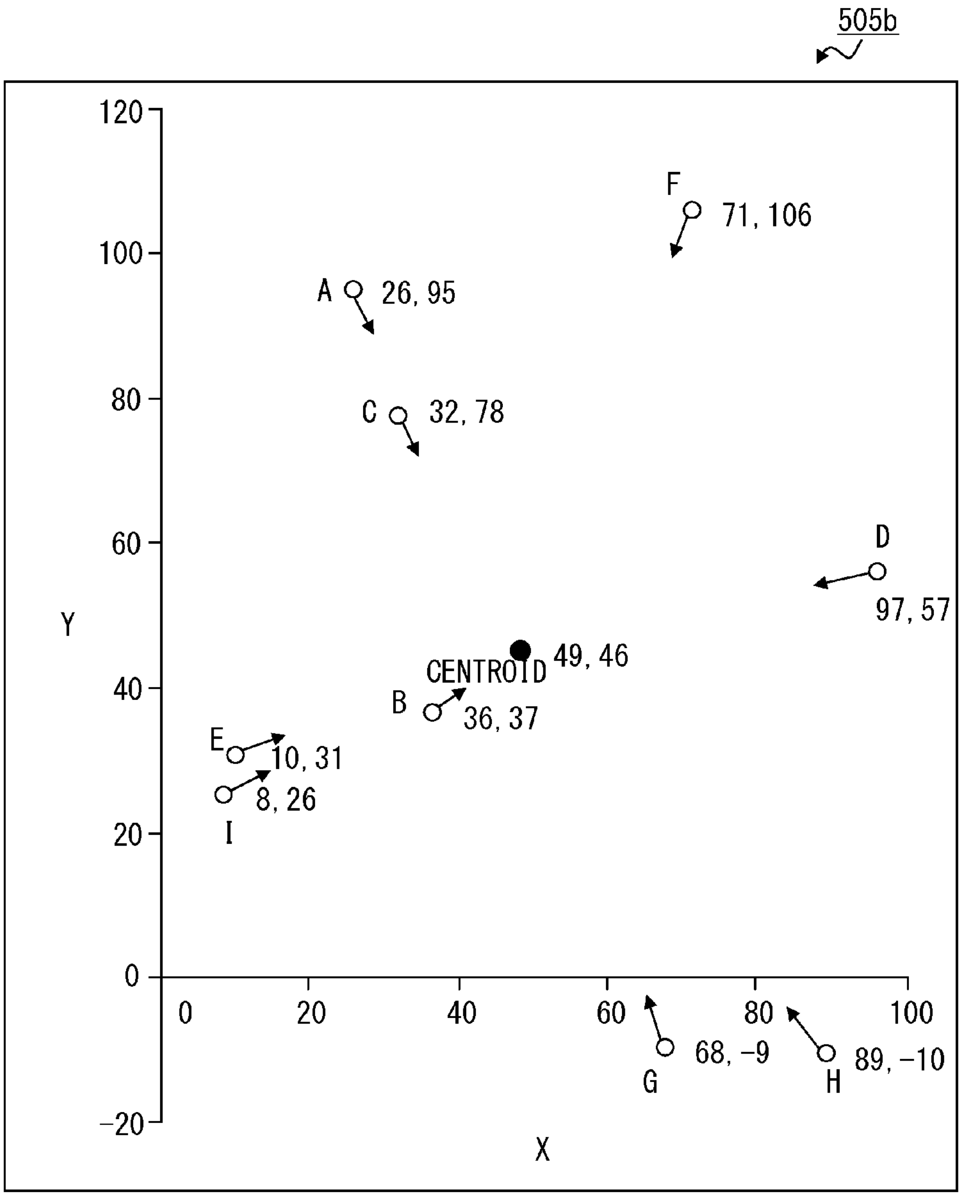
F I G. 26

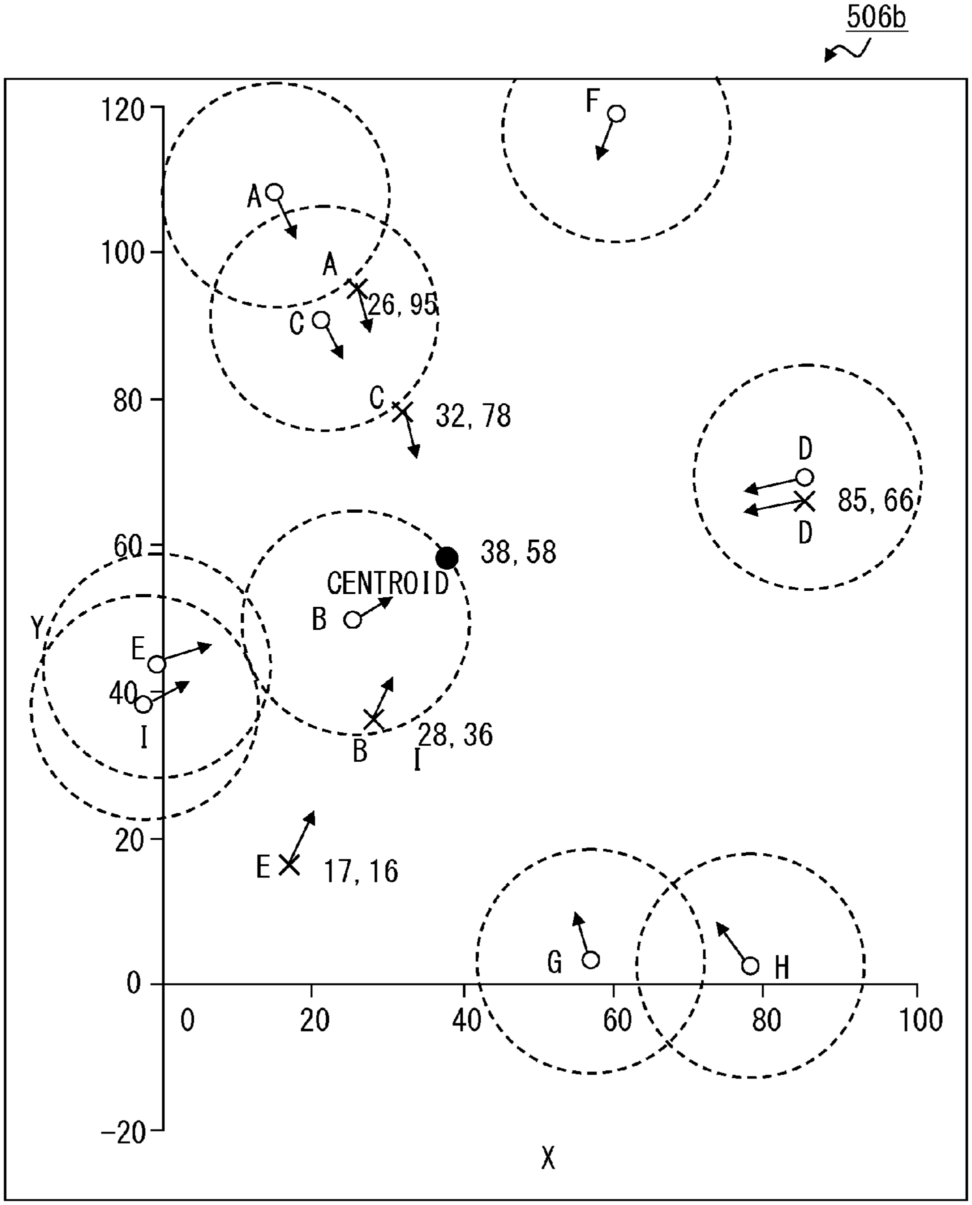
F I G. 27

507b

| ADDRESS ABBREVIATION | REGISTERED ENVIRONMENT | CURRENT ENVIRONMENT | ANGULAR DIFFERENCE [° ] |
|---|---|---|---|
| | ANGLE WITH RESPECT TO CENTROID [° ] | ANGLE WITH RESPECT TO CENTROID [° ] | |
| A | -72.50 | -65.43 | 7.08 |
| B | 66.61 | 35.07 | 31.54 |
| C | -74.21 | -62.90 | 11.31 |
| D | -170.66 | -167.07 | 3.58 |
| E | 63.98 | 20.51 | 43.47 |
| F | NOT DEFINED | -110.51 | NOT DEFINED |
| G | NOT DEFINED | 109.41 | NOT DEFINED |
| H | NOT DEFINED | 126.17 | NOT DEFINED |
| I | NOT DEFINED | 26.36 | NOT DEFINED |

FIG. 28

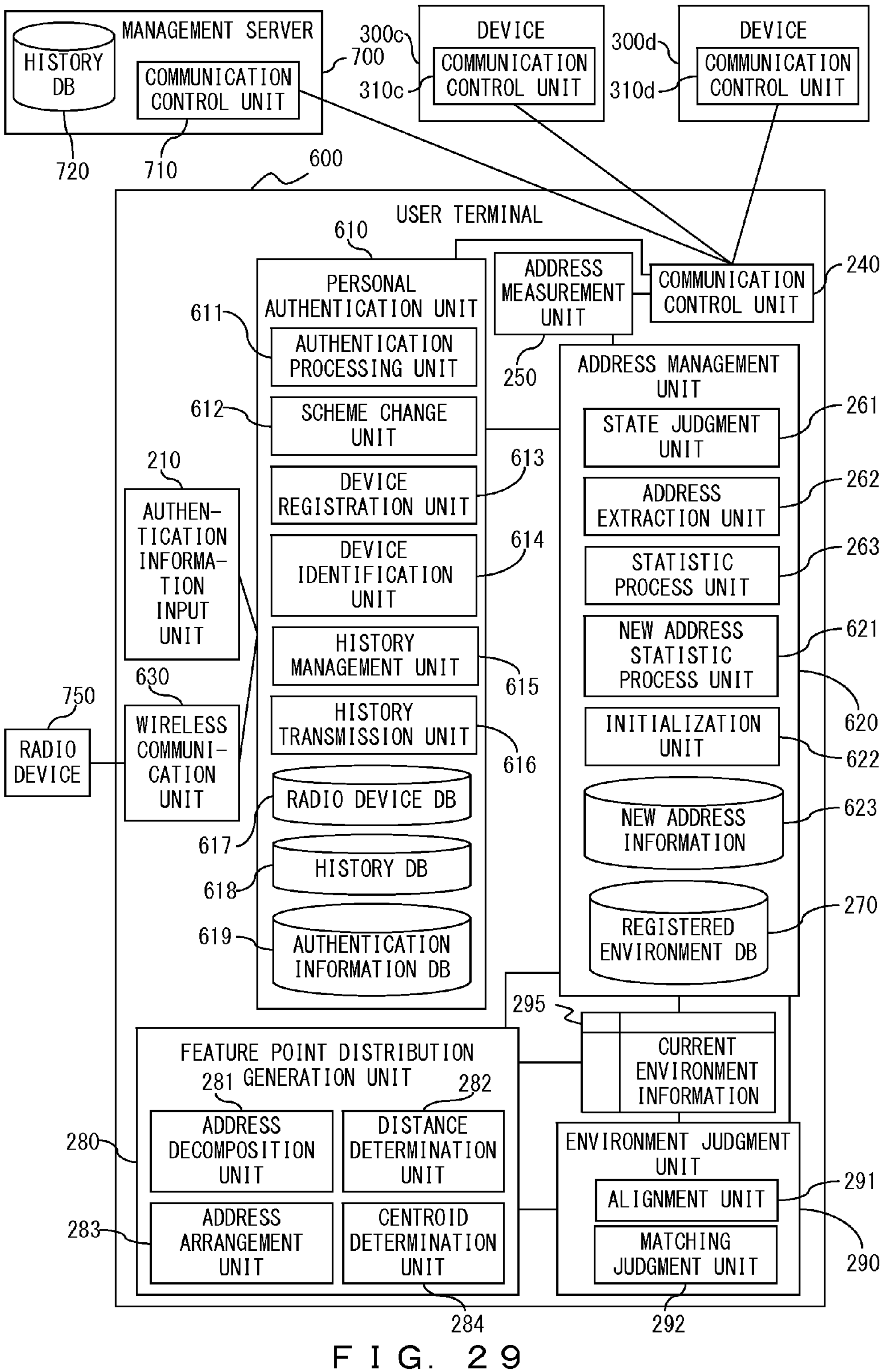
F I G. 29

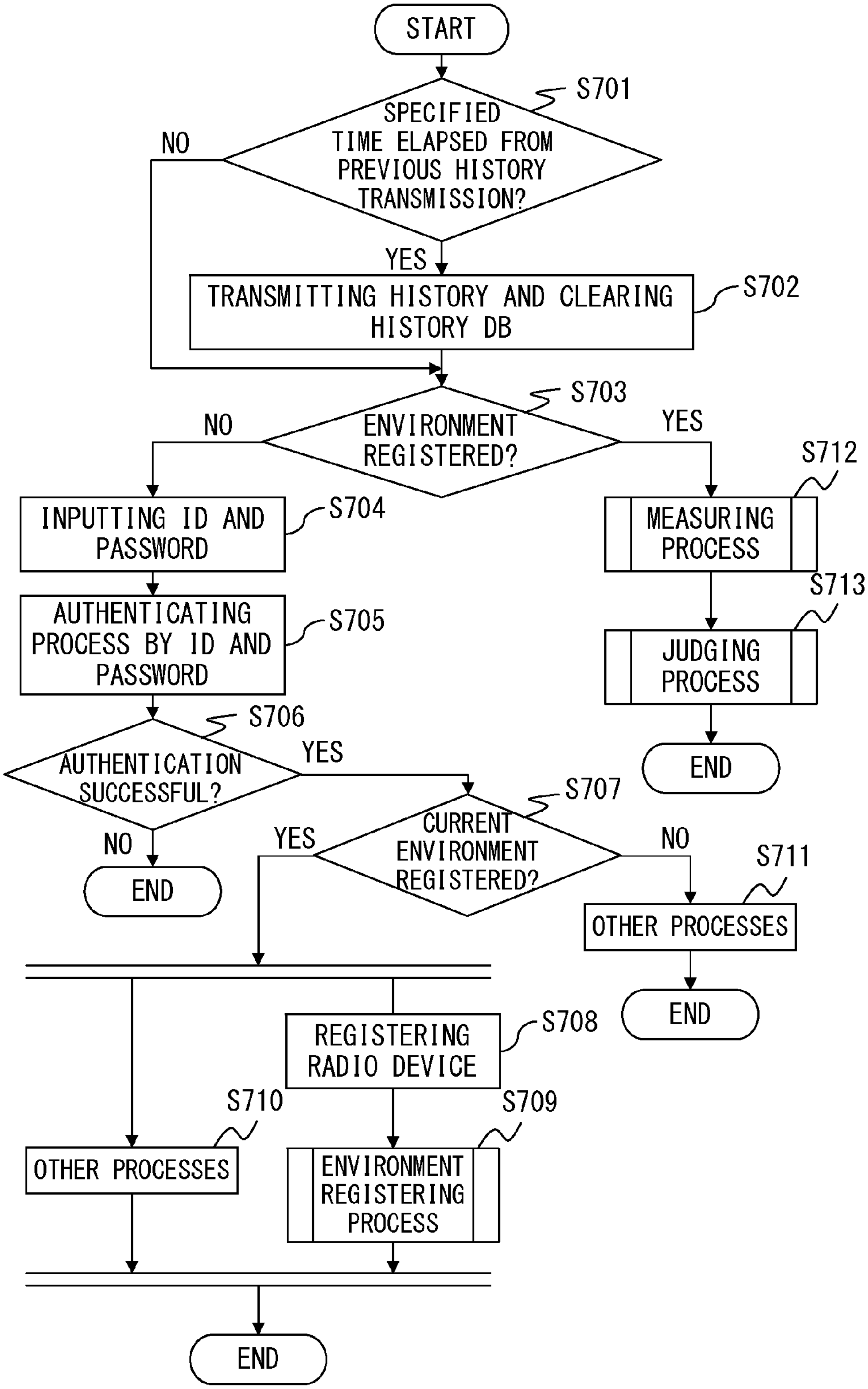
F I G. 30

616a

| | |
|---|---|
| HISTORY TRANSMISSION INTERVAL | 7 [DAYS] |
| IP ADDRESS OF MANAGEMENT SERVER | 192.168.0.1 |
| PREVIOUS TRANSMISSION DATE AND TIME | 2010/9/30 17:30:10 |

617

| USER NAME | WIRELESS COMMUNICATION EQUIPMENT ID |
|---|---|
| User-A | 22645132564981955436246125466231587 |

618

| USER NAME | ENVIRONMENT JUDGMENT RESULT | PERSONAL AUTHENTICATION RESULT | JUDGMENT DATE AND TIME |
|---|---|---|---|
| User-A | REGISTERED ENVIRONMENT | OK | 2010/9/15 18:30:00 |
| User-A | NEW ENVIRONMENT | NG | 2010/9/20 13:30:30 |
| User-A | NEW ENVIRONMENT | OK | 2010/9/30 17:30:10 |

623

| ADDRESS | DETECTION DATE AND TIME |
|---|---|
| J | 2010/8/30 9:25:10 |
| J | 2010/8/30 13:03:27 |
| K | 2010/8/31 9:32:15 |

624

| | |
|---|---|
| REPRODUCIBILITY JUDGMENT TIME | 24 [HOURS] |

FIG. 31

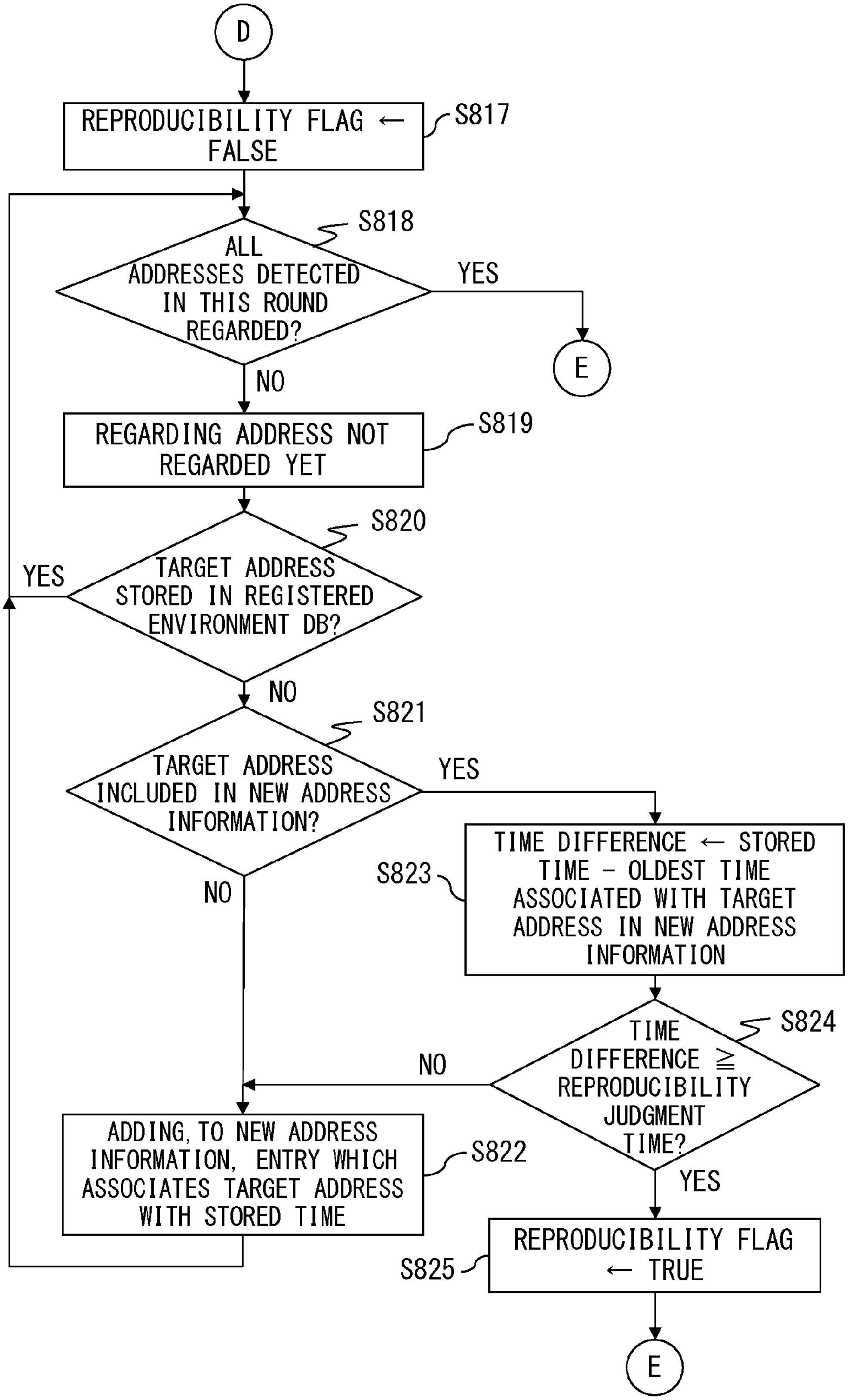
F I G. 3 3

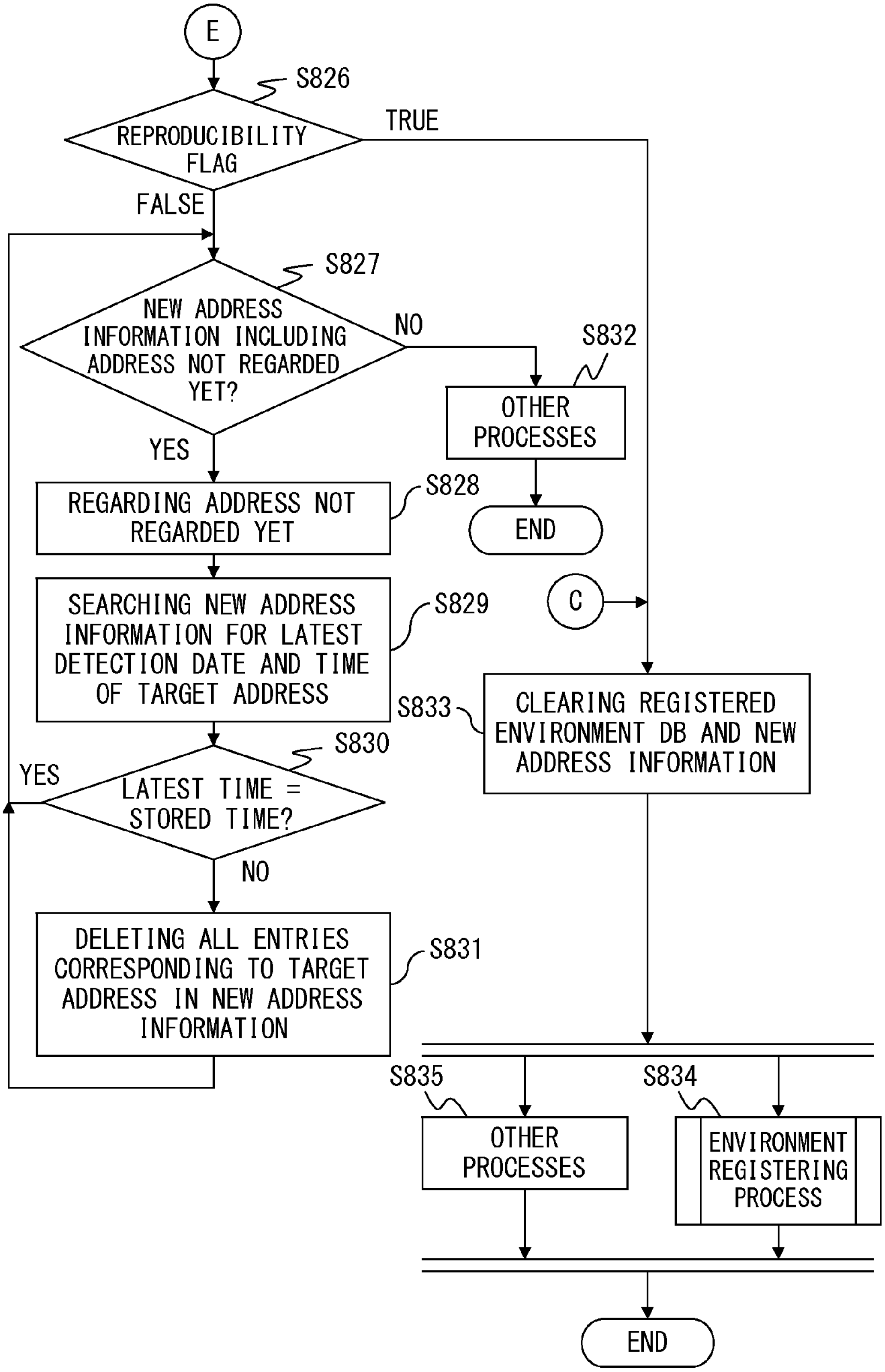
F I G. 3 4

STORAGE MEDIUM, INFORMATION PROCESSING DEVICE AND METHOD

CROSS-REFERENCE TO RELATED APPLICATION

This application is a continuation application of International Application PCT/JP2010/073815 filed on Dec. 28, 2010 and designated the U.S., the entire contents of which are incorporated herein by reference.

FIELD

The embodiments discussed herein are related to the technology of judging the environment of an information processing device.

BACKGROUND

The technology of judging the environment of an information processing device is effective in, for example, realizing personal authentication of a user depending on a user environment, a network setting depending on a user environment, etc.

For example, the following user authentication system has been proposed to perform authentication depending on various authentication requirements for a mobile terminal service, and realize a guarantee of authentication accuracy based on the user environment of a mobile terminal.

A service provider receives a service request from a mobile terminal, and sends an adequate authentication request on the authentication requirements for each service. Each of a portal terminal and a mobile terminal is provided with an authentication means, selects an authentication means depending on the authentication requirements, and performs an authenticating process. Then, the portal terminal and the mobile terminal obtain a probability of authentication from a combined judgment in a tamper-resistant device from a plurality of likelihoods obtained as a result of the comparison by each of the portal terminal and the mobile terminal. Furthermore, the portal terminal and the mobile terminal compare the obtained probability of authentication with the threshold of probability of authentication for each service received from the service provider, and make a final judgment as for authentication. A reliability guarantee server collects and analyzes comparison logs obtained by the authenticating processes of the portal terminal and the mobile terminal, and guarantees the authentication accuracy based on the user environment for a portal terminal.

Also proposed is the following display system in which, when a setting is made between information processing terminals, a connected information processing terminal generates an appropriate initial value, updates a set value of the information processing terminal, and manages the installation of an application. In this case, the initial value refers to a value for a network setting, an application setting, etc.

In the display system, an external storage device stores setting information for communication between an information processing terminal and a display station, and an application executed in the information processing terminal. When the display station is activated or powered on, the CPU (central processing unit) stores the setting information and the application in the storage device through a recognition device storage device.

Furthermore, in an ad hoc network in which components are dynamically changed, the following radio terminal of an ad hoc network is also proposed to enable context information to be used anonymously.

The radio terminal includes an anonymous communication path table (for changing a name, for changing a seal) storage means. The radio terminal also includes a neighbor list storage means for holding particular information about an adjacent terminal on the anonymous communication path. Furthermore, the radio terminal includes a neighbor search means for performing an information exchanging process with an adjacent terminal by searching the neighbor list storage means.

For example, documents such as Japanese Laid-open Patent Publication No. 2006-344013, Japanese Laid-open Patent Publication No. 2006-164092, Japanese Laid-open Patent Publication No. 2004-88657, etc. are well known.

SUMMARY

According to an aspect of the embodiments, a computer-readable storage medium having stored therein a program for causing a computer to execute a process is provided.

The process includes recognizing a first individual address of each of one or more other devices located in a first environment in which the computer is located at a first point in time.

The process includes mapping each first individual address to a first individual point in a coordinate space.

The process includes recognizing a first distribution using coordinates of each first individual point.

The process includes recognizing a second individual address of each of one or more other devices located in a second environment in which the computer is located at a second point in time.

The process includes mapping each second individual address to a second individual point in the coordinate space.

The process includes recognizing a second distribution using coordinates of each second individual point.

The process includes judging whether the first distribution and the second distribution match in accordance with a distribution matching criterion as to whether two distributions match.

The process includes outputting a first result that the first environment and the second environment are identical, when the first distribution and the second distribution are judged to match.

The process includes outputting a second result that the first environment and the second environment are different, when the first distribution and the second distribution are not judged to match.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a flowchart of a judging process according to a first embodiment;

FIG. 4 illustrates a configuration of a computer;

FIG. 6 exemplifies a part of the information used by the user terminal according to the second embodiment;

FIG. 7 is a flowchart of the process started by the user terminal according to the second embodiment when electric power is supplied;

FIG. 8 is a flowchart of an environment registering process;

FIG. 9 is an explanatory view of a first example of an environment change;

FIG. 10 illustrates the information about the environment registered in the first example;

FIG. 11 is a flowchart (No. 1) of a measuring process;

FIG. 13 illustrates the information about the current environment on which the measuring process is performed in the first example;

FIG. 15 is a flowchart (No. 2) of the judging process according to the second embodiment;

FIG. 16 illustrates the mapping of an address of each device existing in the environment registered in the first example to the XY plane;

FIG. 20 is a flowchart of a comparing process;

FIG. 21 is an explanatory view of comparing feature point distributions in the first example;

FIG. 22 illustrates the angular differences calculated in the comparing process with respect to the first example;

FIG. 23 is an explanatory view of a second example of an environment change;

FIG. 24 illustrates the information about the current environment on which the measuring process is performed in the second example;

FIG. 25 is an explanatory view of the movements of points about the current environment on which the measuring process is performed in the second example;

FIG. 26 illustrates the feature point distribution about the current environment on which the measuring process is performed in the second example;

FIG. 27 is an explanatory view of comparing feature point distributions in the second example;

FIG. 28 illustrates the angular differences calculated in the comparing process with respect to the second example;

FIG. 29 illustrates the details of the configuration of the user terminal according to the third embodiment;

FIG. 30 is a flowchart of the process started by the user terminal according to the third embodiment when electric power is supplied;

FIG. 31 exemplifies a part of the information used by the user terminal according to the third embodiment;

FIG. 33 is a flowchart (No. 2) of the judging process according to the third embodiment; and FIG. 34 is a flowchart (No. 3) of the judging process according to the third embodiment.

DESCRIPTION OF EMBODIMENTS

A computer may be located in a particular environment, or in quite a different environment. Furthermore, the particular environment itself is not limited to a constant and fixed environment, and may be somewhat changed depending on the lapse of time.

If the judgment as to whether or not a particular environment at a certain point in time matches an environment in which the computer is currently located is made in a binary manner depending on whether or not the two environments completely match, there is a possibility that a judgment result is incorrect for the following reason. That is, a judgment result of "mismatch" is obtained when the computer is located in a particular environment while the particular environment changes a little, and the same judgment result of "mismatch" is also obtained when the computer is located in an environment quite different from the particular environment.

Therefore, it is a purpose of each of the embodiments below to make it possible to judge as to whether or not the environment in which a computer is located matches a particular environment within an allowable range.

The embodiments are described below in detail with reference to the attached drawings. Concretely, the first embodiment is described first with reference to FIGS. 1 and 2. Then, the second embodiment in which a judgment result as to whether or not environments match is used in the personal authentication of a user is described with reference to FIGS. 3 through 28. Furthermore, the third embodiment in which the judgment result as to whether or not environments match is used in the personal authentication in a method different from the method of the second embodiment is explained with reference to FIGS. 29 through 34. Finally, various modifications are explained.

Figure 1:
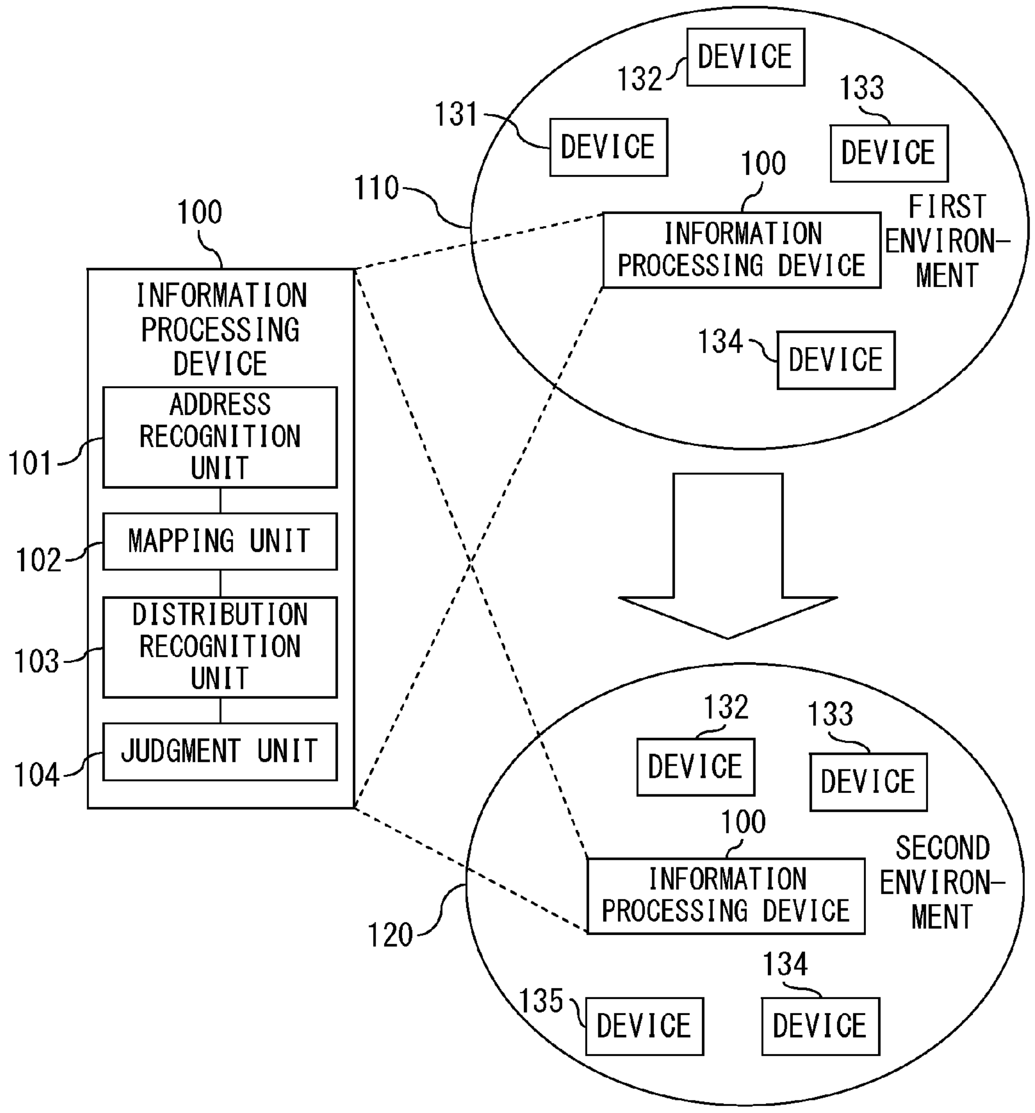
FIG. 1 is an explanatory view illustrating a configuration of an information processing device and examples of environments in which the information processing device is located.

FIG. 1 is an explanatory view illustrating a configuration of an information processing device and examples of environments in which the information processing device is located. As illustrated in FIG. 1, an information processing device 100 according to the first embodiment includes an address recognition unit 101, a mapping unit 102, a distribution recognition unit 103, and a judgment unit 104. The operation of each of these units in the information processing device 100 is described later.

Concrete examples of the information processing device 100 include a general-purpose computer such as a PC (personal computer), a mobile telephone, a smartphone, a tablet or other types of mobile information terminals, etc. The information processing device 100 includes various types of hardware such as a CPU, a RAM (random access memory), a non-volatile storage device such as a hard disk device, and an interface or interfaces for wired, wireless, or both communications.

For convenience of explanation below, the environment in which the information processing device 100 is located (i.e., exists) at a first point in time is referred to as a "first environment", and the environment in which the information processing device 100 is located at a second point in time is referred to as a "second environment". In the example illustrated in FIG. 1, in a first environment 110, other devices 131 through 134 are located (i.e., exist) in addition to the information processing device 100. Ina second environment 120, other devices 132 through 135 are located (i.e., exist) in addition to the information processing device 100.

When the first environment 110 is compared with the second environment 120, the three devices 132 through 134 are located in both environments, the device 131 is located only in the first environment 110, and the device 135 is located only in the second environment 120. In the explanation below, the state in which a certain device is located (i.e., exists) in a certain environment refers to not only that the certain device exists as a physical object, but also that the certain device is able to communicate with the information processing device 100.

For example, the devices 131 through 134 are able to communicate with the information processing device 100 at the first point in time through a wired LAN (local area network) or by wireless communications. Similarly, the devices 132 through 135 are able to communicate with the information processing device 100 at the second point in time through a wired LAN or by wireless communications.

For example, although the device 131 may be still located near the information processing device 100 physically at the second point in time, the device 131 may be powered off at the second point in time. Otherwise, the device 131 may have been taken away to the place physically distant from the information processing device 100 before the second point in time. However, in the both cases, the device 131 is unable to communicate with the information processing device 100 at the second point in time. Therefore, the device 131 is not "located" in the environment of the second environment 120 in the above-explained meaning.

At least one of the devices 131 through 135 exemplified in FIG. 1 may be, for example, a general purpose computer, a mobile telephone, a smartphone, a tablet or other types of mobile information terminals, etc. like the information processing device 100. At least one of the devices 131 through 135 may be a network relay device such as a router, a wireless LAN access point, etc. At least one of the devices 131 through 135 also may be a device (such as a printer) connected to a network. Furthermore, at least one of the devices 131 through 135 may be another type of device which is able to perform communications by a standard wireless communication technique such as Bluetooth (registered trademark) etc. (for example, a keyboard, a mouse, a music player, a head set, etc.).

The information processing device 100 judges whether or not the first environment 110 and the second environment 120 may be regarded as the same within an allowable range (i.e., within an allowance).

Concretely, the address recognition unit 101 recognizes the address of another device (or the addresses of other devices) located in the environment in which the information processing device 100 is located. For example, the address recognition unit 101 recognizes the addresses of the devices 131 through 134, which are located in the first environment 110, at the first point in time, and recognizes the addresses of the devices 132 through 135, which are located in the second environment 120, at the second point in time.

Then, the mapping unit 102 maps each address recognized by the address recognition unit 101 to a point in a coordinate space. The coordinate space may be, for example, a 2-dimensional space preferably. The mapping unit 102 may map the addresses to points in a 3- or more dimensional coordinate space.

Furthermore, the distribution recognition unit 103 recognizes a first distribution using the coordinates of the points to which the addresses (that is, the addresses of the devices 131 through 134 in the example in FIG. 1) recognized by the address recognition unit 101 at the first point in time are mapped by the mapping unit 102. Similarly, the distribution recognition unit 103 recognizes a second distribution using the coordinates of the points to which the addresses (that is, the addresses of the devices 132 through 135 in the example in FIG. 1) recognized by the address recognition unit 101 at the second point in time are mapped by the mapping unit 102.

Then, the judgment unit 104 judges whether or not the first and second distributions match each other in accordance with a distribution matching criterion for defining whether or not two distributions match. The distribution matching criterion is defined based on the allowable range. Concretely, the distribution matching criterion may be, for example, set in advance in the judgment unit 104 in a form of a threshold for defining the allowable range.

When the judgment unit 104 judges that the first and second distributions match, the judgment unit 104 outputs a first result that the first environment 110 is identical to the second environment 120. On the other hand, when the judgment unit 104 judges that the first and second distributions do not match, the judgment unit 104 outputs a second result that the first environment 110 and the second environment 120 are different from each other.

The address recognition unit 101 mentioned above may be realized by, for example, the CPU and the communication interface. The mapping unit 102, the distribution recognition unit 103, and the judgment unit 104 may be realized by the CPU which executes a certain program.

Next, the operation of the information processing device 100 is described further in detail with reference to FIG. 2. FIG. 2 is a flowchart of the judging process according to the first embodiment.

In step S101, the address recognition unit 101 recognizes the individual address of each of one or more other devices (the devices 131 through 134 in the example in FIG. 1) located in the first environment 110 in which the information processing device 100 is located at the first point in time. The address recognized by the address recognition unit 101 is not a variable address which may change depending on time, but a fixed address which is unique to a device and independent of time.

If an address which is dynamically variable depending on time is used, for example, the address of the device 132 may be different between the first and second points in time. Although it may depend on the mapping algorithm used by the mapping unit 102, different addresses are generally mapped to different points. In other words, the mapping unit 102 adopts the mapping algorithm with which the probability that different addresses are incidentally mapped to the same point is negligibly low.

Thus, the degree of matching between the first and second distributions is reduced by the assignment of different addresses to one device 132 at the first and second points in time. As a result, the degree of matching between the first environment 110 and the second environment 120 is not appropriately judged. For the reason above, the address recognition unit 101 recognizes an address which is specific to a device and independent of time.

For example, although an IP (Internet protocol) address may be fixedly assigned, it may also be dynamically assigned by a DHCP (Dynamic Host Configuration Protocol). Therefore, the IP address may be changed.

On the other hand, a MAC (Media Access Control) address is specific to a device. Therefore, it is preferable that the address recognition unit 101 recognizes the MAC address, for example.

Furthermore, since a serial production number is information specific to a device, it may be regarded as a device-specific address. However, it is desirable that the address recognition unit 101 recognizes an address by a protocol independent of the vendors of other devices 131 through 135 because it is expected that the judgment unit 104 outputs a higher accuracy judgment by recognizing an environment from a larger number of devices of a larger number of various vendors than by recognizing the environment from a smaller number of devices of a smaller number of specific vendors.

Furthermore, although a special vendor-dependent protocol may be required to acquire a serial production number in many cases, a MAC address is recognizable through a protocol which is used widely and generally. Therefore, the MAC address is preferable as the type of address recognized by the address recognition unit 101, not only in the aspect that the MAC address is device-specific and constant, but also in the aspect that the MAC address is recognizable through a common protocol.

After the address recognition unit 101 recognizes the addresses in step S101 as described above, the mapping unit 102 maps, in step S102, each first individual address, which is recognized at the first point in time by the address recognition unit 101, to a point in a coordinate space. For example, the mapping unit 102 may map one address to one corresponding point as described below.

That is, the mapping unit 102 extracts bits at a plurality of predefined bit positions from a bit string indicating the above-mentioned one address. Then, the mapping unit 102 calculates a remainder of dividing, by a constant, the integer indicated by a partial bit string which is concatenation of the bits at the plurality of predefined bit positions. The thus calculated remainder may be used as a coordinate, of each coordinate axis in a coordinate space, of the above-mentioned one point corresponding to the above-mentioned one address.

For example, a 2-dimensional coordinate space may be used as the coordinate space. When the address is the MAC address as described above, the length of the bit string indicating an address is 6 octets (that is, 48 bits). Therefore, the mapping unit 102 may extract part of the bits of 6 octets (for example, only the bits belonging to odd-number octets, only odd-number bits, etc.) for calculation of an X coordinate, and obtain a partial bit string by concatenating the extracted bits.

Then, the mapping unit 102 may obtain a remainder as an X coordinate by dividing, by a predetermined constant, the integer indicated by the obtained partial bit string. The mapping unit 102 may also obtain a Y coordinate similarly. For example, by calculating the X and Y coordinates as described above, the mapping unit 102 may map an address to a point in the XY coordinate space.

Using a remainder is effective in appropriately distributing, in the coordinate space, a plurality of points obtained by mapping a plurality of addresses for the following reason.

For example, assume that the mapping unit 102 uses 3 octets in the 6-octet MAC address to calculate the X coordinate, and uses the remaining 3 octets to calculate the Y coordinate. If the mapping unit 102 does not calculate a remainder but does use the integer itself indicated by the partial bit string of a 3-octet length as a coordinate, then the ranges of the X and Y coordinates are expressed by the inequations (1) and (2) because 3 octets are 24 bits.

$$0 \leq X \leq 2^{24}-1 \quad (1)$$

$$0 \leq Y \leq 2^{24}-1 \quad (2)$$

$(2^{24}-1)$ is a value larger than 16,000,000. That is, for example, in the case of the first environment 110 illustrated in FIG. 1, four points corresponding to four devices 131 through 134 are arranged in the very large space including more than 16,000,000×16,000,000 lattice points. Therefore, it is clear that the coordinate space is used very sparsely. Therefore, the use efficiency of the coordinate space is very low. Furthermore, when the distribution is very sparse, it may be difficult to obtain an accurate judgment result by comparing the distributions in the entire coordinate space.

To improve the use efficiency of the coordinate space (that is, to avoid the sparseness), a simple scale transformation is not preferable although a simple scale transformation enables reduction (i.e., shrinkage) of the coordinate space. This is because there is the possibility that two addresses which are incidentally mapped to points close to each other may be degenerated into one point by the scale transformation.

For example, the three points to which the addresses of the devices 131 through 133 are mapped respectively may be closely located in the coordinate space, and only the point to which the address of the device 134 is mapped may be arranged apart. In this case, if the points to which the addresses of the devices 131 through 133 are mapped respectively are degenerated into one point, the first environment 110 is not appropriately expressed.

On the other hand, when the mapping unit 102 adopts a mapping algorithm using a remainder as described above, it is possible to improve the use efficiency of the coordinate space. Furthermore, according to the mapping algorithm using a remainder, it is expected that a plurality of points to which a plurality of addresses are mapped respectively by the mapping unit 102 are appropriately dispersed (i.e., distributed) in the coordinate space.

After the mapping is performed in step S102 as described above, the distribution recognition unit 103 recognizes, in step S103, the first distribution using the coordinates of each of the first individual point(s) to which the first individual address(es) is/are mapped. The first distribution indicates the first environment 110.

As the algorithm used later by the judgment unit 104 in comparing the distributions, for example, a feature point distribution comparing algorithm used for biometric authentication using a fingerprint or a vein pattern is usable. Since the feature point of a fingerprint, a vein pattern, etc. is expressed by coordinates and an angle, the distribution recognition unit 103 may recognize the first distribution using not only the coordinates of the first individual point obtained by the mapping, which is performed by the mapping unit 102, but also a certain angle.

For example, an example of a feature point used in fingerprint authentication is an end point. The position of the end point is expressed by coordinates, and the direction of a ridge at the end point is expressed by an angle. An algorithm for comparing the distributions of feature points, which are each expressed by coordinates and an angle as described above, and calculating the degree of matching between the distributions is widely used in the field of biometric authentication.

Thus, the distribution recognition unit 103 may recognize the first distribution using not only the coordinates of the point obtained by the mapping, which is performed by the mapping unit 102, but also a certain angle so that the judgment unit 104 may use a comparison algorithm that compares feature point distributions and that is used in the field of biometric authentication. For example, the distribution recognition unit 103 may calculate the angle of a point with respect to a certain reference point as an angle relating to the point. An example of the reference point is a centroid of one or more first individual points obtained by the mapping, which is performed by the mapping unit 102.

In step S104, the address recognition unit 101 recognizes the address(es) of one or more other devices (e.g., the devices 132 through 135 in the example in FIG. 1) located in the second environment 120, in which the information processing device 100 is located at the second point in time. The process in step S104 is similar to that in step S101.

In step S105, the mapping unit 102 maps each of the second individual address(es), which is/are recognized at the second point in time by the address recognition unit 101, to a point in the coordinate space. The mapping algorithm in step S105 is similar to that in step S102.

Furthermore, in step S106, the distribution recognition unit 103 recognizes the second distribution using the coordinates of each of the second individual point(s) to which the second individual address(es) is/are mapped. Depending on the judgment algorithm of the judgment unit 104, the distribution recognition unit 103 may appropriately use the angle in recognizing the second distribution in step S106.

The execution order of steps S101 through S106 in FIG. 2 may be appropriately changed. That is, steps S102 and S103 may be performed anytime so far as they are performed after step S101 and before step S107. In addition, steps S105 and S106 may be executed any time so far as they are performed after step S104 and before step S107. Therefore, for example, the process may be performed in the order of steps S101, S104, S102, S105, S103, and S106.

Anyway, after all steps S101 through S106 are performed, the judgment unit 104 judges, in step S107, whether or not the first environment 110 and the second environment 120 match within the allowable range. That is, the judgment unit 104 judges whether or not the first distribution recognized by the distribution recognition unit 103 in step S103 matches the second distribution recognized by the distribution recognition unit 103 in step S106, in the light of the distribution matching criterion.

The distribution matching criterion is an arbitrary criterion for definition as to whether or not two distributions match each other. The distribution matching criterion may be determined in advance. The distribution matching criterion may be defined by, for example, one or more thresholds.

When the judgment unit 104 judges in step S107 that the first and second distributions match each other, the judgment unit 104 outputs in step S108 the first result that the first environment 110 is identical to the second environment 120. When the judgment unit 104 judges in step S107 that the first and second distributions do not match each other, the judgment unit 104 outputs in step S109 the second result that the first environment 110 is different from the second environment 120. When the first or second result is thus output, the judging process in FIG. 2 terminates.

According to a program of the judging process in FIG. 2, if the difference between the first and second environments is small in the light of the distribution matching criterion (even when the first and second environments do not completely match each other), the first result is obtained. This is realized by appropriately defining the distribution matching criterion depending on the allowable range. If the distribution matching criterion is appropriately defined, the second result is obtained when the first and second environment are largely different.

Therefore, the program of the judging process in FIG. 2 enables the judgment as to whether or not the two environments match within the allowable range defined by the distribution matching criterion. That is, the program of the judging process in FIG. 2 enables the judgment as to whether or not the environment in which a computer is located matches a particular environment within the allowable range.

The use of the output first or second result is arbitrary. For example, to realize the personal authentication depending on the environment, the information processing device 100 may switch the scheme or parameter (s) of the personal authentication depending on which has been output, the first or second result.

An example of the scheme of personal authentication, for example, the biometric authentication, the authentication using an ID (identifier) and a password, the authentication depending on whether or not a particular device which is registered in advance is located near the information processing device 100, etc. An example of a parameter of the personal authentication is, for example, a matching threshold in biometric authentication.

Otherwise, the information processing device 100 may switch its configuration file relating to setting a network and an application depending on which result has been output, the first or second result.

Then, for example, the first environment 110 may be a predetermined particular environment. That is, when the information processing device 100 is located in a particular environment, the process in step S101 may be performed.

Then, the information processing device 100 may judge whether or not the current environment is the above-mentioned particular environment by performing the judging process in FIG. 2 while regarding the environment in which the information processing device 100 is currently located as the second environment 120. That is, the information processing device 100 may perform the process in step S104 at the point in time at which the judgment as to whether or not the environment in which the information processing device 100 is currently located matches the above-mentioned particular environment is requested.

To be able to judge whether or not the current environment is the above-mentioned particular environment, the address recognition unit 101 may continue storing each address recognized by the first environment 110. Otherwise, the coordinates of the point to which each address in the first environment 110 is mapped may be continuously stored by the mapping unit 102. Otherwise, the distribution recognition unit 103 may continue storing the first distribution. To continue storing an address, coordinates, or the first distribution, the address recognition unit 101, the mapping unit 102, or the distribution recognition unit 103 may include a non-volatile storage device such as a hard disk device etc.

The operation may be performed so that a user may be easily authenticated if the environment in which the information processing device 100 is currently located is a predetermined particular environment, and the personal authentication may be more strictly performed if the environment in which the information processing device 100 is currently located is not the predetermined particular environment.

For example, in a biometric authenticating system in which a user is authenticated when a matching score is equal to or larger than a matching threshold, and the user is not authenticated when the matching score is less than the matching threshold, the smaller the matching threshold is, the more easily the user is authenticated, and the larger the matching threshold is, the more strictly the user is authenticated. That is, the smaller the value of the matching threshold is, the lower the false reject rate (FRR) becomes. Therefore, as the matching threshold decreases, the user-friendliness is improved, but the false accept rate (FAR) becomes high, thereby reducing the security. On the other hand, if the value of the matching threshold is large, the false accept rate becomes lower, thereby improving the security. However, since the false reject rate becomes high, the user-friendliness is reduced.

For example, it is preferable that the first environment 110 as the above-mentioned particular environment is a secure environment in which the security is ensured by a security mechanism other than the personal authentication by the information processing device 100 itself.

For example, assume that the information processing device 100 is a laptop PC for the job of an employee of a company. In this case, the environment in which the employee performs his or her task at his or her own desk in the company is secure to some extent because, for example, an ID card is checked by a guardian at the entrance of the building of the company or by an ID card reader at the entrance of the building or room. Furthermore, there are a number of employees in the company.

Therefore, it is difficult for a malicious third party to pass through the check of the ID card without being noticed by other employees and use the information processing device 100 in the company. Accordingly, the environment in which the position of an authorized user of the information processing device 100 who is the employee in the company is located is relatively secure.

On the other hand, the employee who is an authorized user of the information processing device 100 may go out with the information processing device 100 and perform his or her task outside the company. However, the environments outside the company come in various types. Furthermore, the employee may leave the information processing device 100 behind somewhere, or a malicious third party may steal the information processing device 100. Therefore, when the information processing device 100 is used outside the company, it is more dangerous to reduce the matching threshold for biometric authentication than in the case in which the information processing device 100 is used in the company.

Therefore, the first embodiment may be used to judge whether or not the environment in which the information processing device 100 is currently located is a secure environment in which the security is ensured by a security mechanism other than the personal authentication by the information processing device 100 itself. According to the first embodiment, the information processing device 100 may automatically judge whether or not the first environment 110 and the second environment 120 are identical environments in the allowable range. Therefore, if the first environment 110 is the above-mentioned secure environment, the security and the user-friendliness may be compatible with each other by switching the matching threshold of biometric authentication depending on the judgment result by the judgment unit 104.

Furthermore, since the address recognition unit 101 automatically recognizes an address, it is not necessary for a user to manually register the addresses of the devices 131 through 134 in the first environment 110. That the manual operation of a user is not required has not only the merit of reducing the time and effort of the user but also the merit of removing the user-dependence of the security. Described below are the first and second comparison examples to aid the understanding of the merits of the first embodiment.

The information processing device of the first comparison example recognizes the address of another device which is located near the information processing device in a predetermined particular environment (for example, the above-mentioned secure environment). Otherwise, the information processing device of the first comparison example accepts from a user the input to specify the address of another device which is located near the information processing device in the above-mentioned particular environment. The information processing device of the first comparison example summarizes the addresses recognized by the information processing device itself or the addresses input by the user in a first address list, and stores the first address list. The information processing device of the first comparison example also recognizes the address of another device which is located near the information processing device in the environment in which the information processing device is currently located, and generates a second address list.

Then, the information processing device of the first comparison example compares the first and second address lists, and judges that the environment in which the information processing device is currently located is a predetermined particular environment if the two address lists completely match each other. On the other hand, if the two address lists do not match each other, the information processing device of the first comparison example judges that the environment in which the information processing device is currently located is not the predetermined particular environment.

The above-mentioned demerit of the first comparison example is clear. That is, in the first comparison example, when the information processing device generates the first address list, another device located in the particular environment is to have been turned on because the information processing device is unable to recognize the address of a device which has not been turned on. In addition, when the information processing device is used in a particular environment, each of other devices is to have been turned on to obtain a correct judgment result. Eventually, in the first comparison example, the user is to be careful to whether or not each of other devices has been turned on.

Then, to overcome the above-mentioned demerits of the first comparison example, the second comparison example below is considered. The information processing device of the second comparison example generates the first and second address lists like in the first comparison example. However, the information processing device of the second comparison example is different from the information processing device of the first comparison example in that a weight is applied in comparing the two address lists in the second comparison example.

In a plurality of devices in a particular environment, a part of devices, for example, a router, a computer, etc. may have been turned on all the time, but other devices may be in the power-off state for a long time. Furthermore, a part of devices which are fixedly provided such as a desk top PC etc. are fixedly located in an environment so far as they are in the power-on state. However, a portable device which may be brought out of an environment is not always located in an environment fixedly although it is constantly turned on.

Therefore, in the second comparison example, the weight of each device which is located in a particular environment is determined in advance to compare the first and second address lists by appropriate weighting by the information processing device. The weight may be determined depending on, for example, the length of time in which each device is in the power-on state, the type of device, etc. If an appropriate weight is applied, the judgment accuracy of the information processing device of the second comparison example may be enhanced.

However, an appropriate weight depends on the concrete operation or type of each device, etc. Then, since the operation of a device is also related to a human factor, it is difficult to mechanically determine an appropriate weight.

Furthermore, a user of an information processing device may set a weight for the information processing device after determining the weight at the user's own discretion. However, in this case, the user has to analyze and perform trial and error until an appropriate weight is obtained. Therefore, a user spends much time and effort. Furthermore, when a user sets a weight, the judgment accuracy of an environment depends on the knowledge and skill of a user.

As described above, the second comparison example also has the demerit of user dependence. On the other hand, in the first embodiment illustrated in FIGS. 1 and 2, a user-defined weight is not used. Therefore, it is not user-dependent in judgment accuracy. Furthermore, in the first embodiment, a user is not to perform a manual operation to register each address.

Then, unlike the information processing device in the first comparison example, the judgment unit 104 according to the first embodiment does not judge whether or not the address sets appearing in two environments completely match. That is, the judgment unit 104 judges whether or not the first and second distributions match in the allowable range defined in the distribution matching criterion. Therefore, the first embodiment has no the demerit of the first comparison example.

As described above, the first embodiment excels the first and the second comparison examples in that a flexible judgment may be made independent on a user.

Furthermore, the information processing device 100 according to the first embodiment excels in that a judgment is autonomously made without any external particular device other than the information processing device 100 such as a management server etc.

Described below are the third through fifth comparison examples to further explain the merits of the first embodiment. According to the third through fifth comparison examples, a terminal may operate depending on the environment under the limited conditions, but the terminal itself is unable to autonomously judge the environment.

The third comparison example is a kind of user authentication system which aims at performing authentication according to various authentication requirements of a mobile terminal service. The user authentication system of the third comparison example includes a mobile terminal, a portal terminal, a service provider, and a reliability guarantee server.

In the user authentication system of the third comparison example, it is assumed that authentication requirements depending on the service are defined in advance, and that the reliability guarantee server analyzes the statistic information for each portal terminal. Therefore, in the third comparison example, it is unable to define the behavior of the mobile terminal in a new environment not defined in advance. Furthermore, in the third comparison example, a portal terminal, a service provider, and a reliability guarantee server are required in addition to the mobile terminal.

On the other hand, in the first embodiment, for example, the behavior of the information processing device 100 in a new environment such as "increasing the matching threshold of biometric authentication when the second result is output in step S109" may be defined. In the first embodiment, the information processing device 100 may autonomously judge an environment without requesting an external device such as a portal terminal, a service provider, a reliability guarantee server, etc.

Furthermore, in the user authentication system of the third comparison example, the analysis by a reliability guarantee server for guarantee of authentication accuracy includes generating a matching value distribution in a round-robin system. Then, even if the authentication data is safely stored in a tamper-resistant device of a mobile terminal, it is necessary to store data about a plurality of users in a mixed state in performing an analysis, thereby causing a problem of data security. However, since a portal terminal or a reliability guarantee server other than the information processing device 100 are not requested in the first embodiment, no such problem occurs.

The fourth comparison example is a system including a display station and one or more information processing terminals. Then, the storage device of a display station stores setting information for communication of an information processing terminal with a display station, and an application to be performed in the information processing terminal. When the display station is activated or powered on, the processing device of the display station stores the setting information and the application in the storage device.

By the management of the storage device by the display station, the installation of an application in the information processing terminal and the setting of the storage device may be easily performed. An easy connection may set a cooperative operation environment among equipment units.

However, the fourth comparison example requests a predetermined storage device. Therefore, the number of information processing terminals which may be simultaneously judged for an environment is limited by the number of predetermined storage devices. On the other hand, in the first embodiment, the information processing device 100 may judge the environment solely by itself, and does not request another device such as a storage device etc. which is managed by a display station. That is, in the first embodiment, each information processing device 100 may autonomously and simultaneously judge an environment regardless of the number of information processing devices 100 illustrated in FIG. 1.

Furthermore, in the fourth comparison example, the information processing terminal is unable to autonomously make a judgment relating to the environment not set in the storage device. On the other hand, the information processing device 100 of the first embodiment recognizes that it is located in a new environment when it is located in the new environment (for example, the second environment 120) different from the predetermined environment (for example, the first environment 110), and may operate according to the new environment. For example, according to the new environment, the information processing device 100 may increase the matching threshold for biometric authentication.

The fifth comparison example is a radio terminal of an ad hoc network, holds the information on the anonymous communication path, and holds the particular information about the adjacent terminal on the anonymous communication path as a neighbor list. Then, the radio terminal of the fifth comparison example performs an information exchanging process with a terminal which is located in the vicinity after searching the neighbor list.

According to the fifth comparison example, context information may be used anonymously in the ad hoc network in which components are dynamically changed. However, in the fifth comparison example, the radio terminal is unable to judge an environment itself. On the other hand, the information processing device 100 of the first embodiment may judge an environment.

Furthermore, in the fifth comparison example, when the information exchanging function is implemented for only a small number of radio terminals as a part of radio terminals in the ad hoc network, an obtained effect is limited. On the other hand, according to the first embodiment, so far as one information processing device 100 is configured as illustrated in FIG. 1, the information processing device 100 is able to exhibit the above-mentioned effect by the operation described above relating to the first embodiment.

As well understood from the survey of a weight in the second comparison example, there may be in a mixed manner a device which is constantly located in a particular environment, and a device which may be unstably located depending on the time. Therefore, the information processing device 100 of the first embodiment may operate as follows to judge whether or not the first and second distributions match with the stability of other devices taken into account.

That is, the address recognition unit 101 may further recognize the addresses of one or more other devices which are located in the environment in which the information processing device 100 is located in each of one or more third points in time different from the first or second point in time. Then, the mapping unit 102 may map to the point in each coordinate space each of the third individual addresses recognized by the address recognition unit 101 in each third point in time.

For example, at the first point in time, it is assumed that the information processing device 100 is located in the predetermined safe first environment 110. The first environment 110 may be somewhat changed with the lapse of time, but it is assumed that the information processing device 100 is still located in the first environment 110 in the period including one or more third points in time.

Furthermore, the distribution recognition unit 103 may recognize the first distribution in step S103 in FIG. 2 using the coordinates of the third individual point to which the third individual address is mapped. Concretely, for example, the distribution recognition unit 103 may recognize the first distribution using the coordinates of all points obtained by mapping the addresses recognized at least at the first point in time and one or more third points in time.

At the second point in time, the information processing device 100 may be moved to quite a different environment in the place physically apart from the first environment 110. On the other hand, also at the second point in time, the information processing device 100 may be placed in the same position as the first point in time and one or more third points in time. Furthermore, although the information processing device 100 is not physically moved, a number of new devices may be added to the first environment 110, and a number of devices may disappear from the first environment 110, thereby the first environment 110 may be changed into quite a different environment at the second point in time.

Then, the distribution recognition unit 103 may recognize the second distribution as described below in step S106 in FIG. 2 to consider the unstableness of other devices.

First, the distribution recognition unit 103 calculates the offset corresponding to each address depending on the fluctuation of the set of addresses recognized by the address recognition unit 101 among a plurality of points in time including the first point in time, the second point in time, and one or more third points in time. Then, the distribution recognition unit 103 adds the corresponding offset to each of the coordinates of the second individual point. The distribution recognition unit 103 recognizes the second distribution using the coordinates obtained by adding the offset as described above.

For example, in the example in FIG. 1, the set of the addresses recognized by the address recognition unit 101 at the first point in time includes four addresses of the devices 131 through 134, and the set of the addresses recognized by the address recognition unit 101 at the second point in time includes four addresses of the devices 132 through 135. The set of the addresses recognized by the address recognition unit 101 at one third point in time may include five addresses of the devices 131 through 135. Otherwise, when the power supply of the device 133 is disconnected during the operation, the set of the address recognized by the address recognition unit 101 at another third point in time may include the three addresses of the devices 131, 132, and 134.

Thus, the set of addresses recognized by the address recognition unit 101 may be fluctuated. Therefore, the distribution recognition unit 103 may recognize the second distribution using the offset depending on the fluctuation as described above.

To be more concrete, the distribution recognition unit 103 may, for example, calculate the offset as described below for each address recognized by the address recognition unit 101 at least one point of time in a plurality of points of time including the first point in time, the second point in time, and one or more third points in time. That is, the distribution recognition unit 103 may calculate one or more address fluctuation indexes indicating the fluctuation relating to the address for which the offset is to be calculated. Then, the distribution recognition unit 103 may calculate the offset corresponding to the address from one or more address fluctuation indexes.

Concretely, the offset may be calculated as a vector. For example, the distribution recognition unit 103 may calculate the size of the offset using a function which simply increases with respect to the size of each fluctuation indicated by each of one or more address fluctuation index, and calculate the direction of the offset using a random number.

At least one of one or more address fluctuation indexes is a value based on the number of points in time in a plurality of points of time including the first point in time, the second point in time and one or more third points in time in which the address has been recognized. For example, the address fluctuation index about the device 131 is a value based on the number of points of time in a plurality of points of time in which the address of the device 131 has been recognized.

To be more concrete, for example, the value such as the rate of the point of time in which the address of the device 131 has not recognized in the plurality of points of time described above may be used as an address fluctuation index. For example, in the second embodiment described later, the absence rate depending on the number of occurrences is a concrete example of the address fluctuation index.

Furthermore, the value based on which is the point in time as the latest point in time at which the address for which the offset is calculated has been recognized may be further used as one of the address fluctuation indexes. For example, as the address fluctuation index relating to the device 131, the value based on the number of points in time in which the address recognition unit 101 has recognized an address in the range from the latest point in time at which the address of the device 131 has been recognized to the second point in time may be used. For example, in the second embodiment described later, the time elapse rate as the value based on the previously measured round is a concrete example of the address fluctuation index.

As described above relating to steps S103 and S106 in FIG. 2, the distribution recognition unit 103 may recognize the first and second distributions using not only the coordinates of a point, but also an angle to allow the judgment unit 104 to use the comparison algorithm between the feature point distributions.

Concretely, the distribution recognition unit 103 calculates a first angle corresponding to the first reference point of the first individual point for the first individual point. As a result, the coordinates and the angle of the first individual point may be obtained. That is, a feature point having the coordinates and angle may be obtained from each address recognized by the address recognition unit 101 at the first point in time. That is, the first distribution is expressed as a feature point distribution. The first reference point may be, for example, the centroid of all points obtained by mapping the address recognized at least at one or more points in time of the first point in time and one or more third point in time.

Furthermore, for each of the second individual points moved by offset, the distribution recognition unit 103 calculates the second angle, with respect to the second reference point, of the moved second individual point. As a result, the coordinates and angle of each second individual point are obtained. That is, a feature point having the coordinates and angle is obtained from each address recognized by the address recognition unit 101 at the second point in time. That is, the second distribution is also expressed as a feature point distribution. The second reference point may be, for example, a centroid of all points moved by offset of a point obtained by mapping the address recognized at least at one point in time of a plurality of points in time including the first point in time, the second point in time, and one or more third points in time.

Therefore, in step S107 in FIG. 2, the judgment unit 104 may use any algorithm for comparison of feature point distributions. For example, the judgment unit 104 may judge whether or not the condition of (A1) and (A2) holds true for each address which is the same as any of the first individual addresses in the second individual addresses.

(A1) The difference between the first relative position to the first reference point of the point to which the address is mapped and the second relative position to the second reference point of the point obtained by moving by offset the point as a result of mapping the address is in the first range. That is, the distance measured by assuming that the distance between the original point to which an address is mapped and the point moved by offset is measured after performing alignment so that the first and second reference point may overlap is in the first range.

(A2) The difference between the first angle and the second angle is in the second range.

The above-mentioned first and second ranges are defined by the distribution matching criterion. For example, the first range may be the range of 30 or less as the distance between the first relative position and the second relative position, and the second range may be the range of −15° or more and +15° or less etc.

Furthermore, the distribution matching criterion defines the lower limit relating to the rate of the address for which the condition of (A1) and (A2) holds true. The lower limit is the value for judgment of the judgment unit 104 that the distributions of the first and second distributions match each other.

For example, when the lower limit is 70%, the judgment unit 104 may judge that the first and second distributions match if the rate of the address for which the condition of (A1) and (A2) holds true for all addresses recognized at the second point in time is 70% or more. Otherwise, instead of the rate for all addresses recognized at the second point in time, the rate for all addresses recognized at least at one point in time of a plurality of points in time including the first point in time, the second point in time, and one or more third points in time may be used. A concrete example of the lower limit defined by the distribution matching criterion is a reference matching rate according to the second embodiment.

For example, by the movement using the above-mentioned offset, the unstableness of other devices may be reflected in the judgment by the judgment unit 104 without using the weight of user definition. That is, by the movement using offset, a misjudgment caused by a small environment fluctuation which may usually occur is reduced, and the accuracy of the judgment in step S107 is improved.

The second embodiment in which the result of the judgment as to whether or not the environments match each other is used in switching the matching threshold in biometric authentication is described below with reference to FIGS. 3 through 28.

Figure 3:
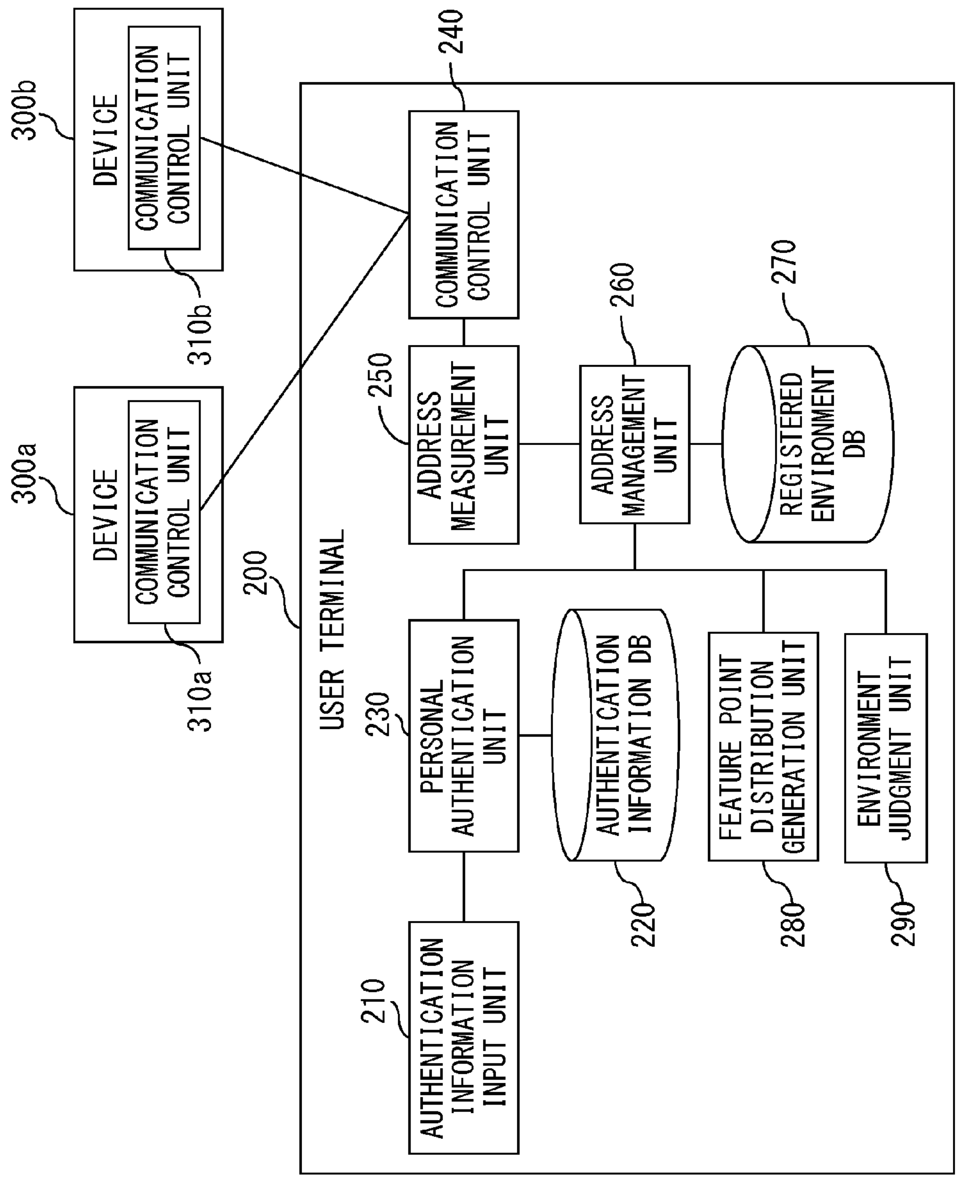
FIG. 3 illustrates the outline of a configuration of a user terminal according to a second embodiment.

FIG. 3 illustrates the outline of the configuration of the user terminal according to the second embodiment.

A user terminal 200 in FIG. 3 includes an authentication information input unit 210, or is connected to the external authentication information input unit 210. The user terminal 200 includes an authentication information DB (database) 220 and a personal authentication unit 230.

The user terminal 200 also includes a communication control unit 240 for communication with other devices (for example, devices 300*a* and 300*b*). The device 300*a* also includes a communication control unit 310*a* for communication with another device (for example, the user terminal 200). Likewise, the device 300*b* also includes a communication control unit 310*b* for communication with another device (for example, the user terminal 200).

Furthermore, the user terminal 200 includes an address measurement unit 250, an address management unit 260, a registered environment DB 270, a feature point distribution generation unit 280, and an environment judgment unit 290. Although the registered environment DB 270 is illustrated outside the address management unit 260 in FIG. 3, the address management unit 260 may include the registered environment DB 270.

The details of each unit above of the user terminal 200 are described below.

The authentication information input unit 210 receives an input of information from a user for personal authentication. The authentication information DB 220 stores in advance the information for use in authenticating a user. The personal authentication unit 230 performs a personal authenticating process using the input received by the authentication information input unit 210 and the information stored in the authentication information DB 220. Although the authentication information DB 220 is illustrated outside the personal authentication unit 230 in FIG. 3, the personal authentication unit 230 may include the authentication information DB 220.

The details are described later, but the personal authentication unit 230 performs biometric authentication using at least user biometric information. The personal authentication unit 230 may further provide a text-based personal authentication function using a combination of an ID and a password.

The type of biometric authentication is arbitrary. For example, the biometric authentication such as a fingerprint, a vein pattern, a voiceprint, an iris, etc. is available.

Furthermore, the matching threshold used by the personal authentication unit 230 in biometric authentication is switchable. The personal authentication unit 230 issues an inquiry to the address management unit 260 to determine which matching threshold is to be used before performing the biometric authentication. A reply to the inquiry is returned from the address management unit 260, or from the environment judgment unit 290 through the address management unit 260. Then, the personal authentication unit 230 switches the matching threshold depending on the reply to the inquiry.

The communication between the communication control unit 240 and the communication control unit 310*a* may be wireless communication or cable communication. Similarly, the communication between the communication control unit 240 and the communication control unit 310*b* may be wireless communication or cable communication. An example of wireless communication is a communication in accordance with the IEEE (The Institute of Electrical and Electronics Engineers, Inc.) 802.11 series wireless LAN standard and a communication by Bluetooth (registered trademark). An example of cable communication is a communication by cable Ethernet (registered trademark).

The address measurement unit 250 collects the addresses of the devices 300*a* and 300*b* located in the same environment as the user terminal 200 through the communication control unit 240 by having the communication control unit 240 perform communication. Collecting an address may be recognizing, measuring, observing, detecting, scanning, and searching the address.

The address management unit 260 requests the address measurement unit 250 to collect an address with appropriate timing in the environment registering process and the measuring process described later. That is, the address management unit 260, the address measurement unit 250, and the communication control unit 240 cooperate with one another to realize the function similar to that of the address recognition unit 101 according to the first embodiment.

In the environment registering process, the address management unit 260 stores the address collected by the address measurement unit 250 in the registered environment DB 270, generates the statistic information based on the address collection result, and stores the generated statistic information in the registered environment DB 270. Furthermore, in the measuring process, the address collected by the address measurement unit 250 may be finally stored in the registered environment DB 270 depending on the judgment result by the environment judgment unit 290, or may be discarded.

The environment registering process is to register in the registered environment DB 270 a particular environment as an environment in which user-friendliness is prioritized over security at an instruction from a user. For example, when the user terminal 200 is a terminal for operation by an employee of a company, the environment in which the employee performs his or her operation at his or her desk in the company may be registered in the registered environment DB 270.

Furthermore, when the address management unit 260 receives an inquiry from the personal authentication unit 230 when no environment has been registered in the registered environment DB 270, the address management unit 260 answers the personal authentication unit 230 that no environment has been registered yet.

The address management unit 260 not only controls the measuring process, but also requests the feature point distribution generation unit 280 to start the judging process described later. Then, the feature point distribution generation unit 280 generates a feature point distribution from the address stored after measured by the address measurement unit 250. That is, the feature point distribution generation unit 280 converts each address into a feature point having the coordinates and angle, thereby generating a feature point distribution from an address set. That is, the feature point distribution generation unit 280 includes components corresponding to the mapping unit 102 and the distribution recognition unit 103 according to the first embodiment.

The environment judgment unit 290 is also a concrete example of the judgment unit 104 according to the first embodiment. By comparing two feature point distributions generated by the feature point distribution generation unit 280, the environment judgment unit 290 judges whether or not the environment in which the user terminal 200 is located is a particular environment registered in the registered environment DB 270 in advance. Then, the environment judgment unit 290 outputs a judgment result to the personal authentication unit 230 through the address management unit 260 (or directly). Then, the personal authentication unit 230 switches the matching threshold used in the personal authenticating process depending on the judgment result.

Next, an example of hardware for realizing the user terminal 200 in FIG. 3 is described below with reference to FIG. 4. The user terminal 200 may be realized by a dedicated hardware circuit, a general-purpose computer for executing a program, or a combination of them, but FIG. 4 illustrates an example in the case in which a common computer realizes the user terminal 200.

FIG. 4 is a configuration of a computer 400. The information processing device 100 in FIG. 1 according to the first embodiment may also be realized by a computer 400 as illustrated in FIG. 4. Furthermore, to be more concrete, the computer 400 may be, for example, a desk-top PC, a laptop PC, a PDA (personal digital assistant), a smartphone, a tablet or other type of mobile information terminal, a mobile telephone, etc.

The computer 400 in FIG. 4 includes a CPU 401, ROM (read only memory) 402, RAM 403, a communication interface 404, an input device 405, an output device 406, and a storage device 407. The computer 400 also includes a drive device 408 of a portable storage medium 450. The CPU 401, the ROM 402, the RAM 403, the communication interface 404, the input device 405, the output device 406, the storage device 407, and the drive device 408 are interconnected through a bus 409.

The CPU 401 loads a program into the RAM 403, and executes the program using the RAM 403 as a work area. The program may be stored in advance in the ROM 402 or the storage device 407, or downloaded from a network through the communication interface 404, and stored in the storage device 407.

Otherwise, the program may be provided after stored in the computer-readable portable storage medium 450, and then read by the drive device 408. The program read from the portable storage medium 450 by the drive device 408 may be loaded directly into the RAM 403, and also may be copies to the storage device 407 and loaded from the storage device 407 into the RAM 403.

The portable storage medium 450 may be an optical disk such as a CD (compact disc), a DVD (digital versatile disk), etc., a magneto optical disk, a magnetic disk, a non-volatile semiconductor memory card, etc. The ROM 402, the RAM 403, the storage device 407, and the portable storage medium 450 are examples of computer-readable storage medium. These computer-readable storage media are tangible, and not transitory media such as a signal carrier.

The communication interface 404 is an interface for cable, wireless, or both communications. For example, the communication interface 404 includes various types of hardware corresponding to the communications such as cable LAN (i.e., wired LAN), wireless LAN, Bluetooth (registered trademark), etc.

The input device 405 may include, for example, a button 410, a numerical keypad 411, a keyboard 412, a microphone 413, a camera 414, and a sensor 415. The input device 405 may further include a pointing device such as a mouse etc. Obviously, the input device 405 may include only a part of the components illustrated in the rectangle indicating the input device 405 in FIG. 4.

Furthermore, as with a touch screen 416, a device functioning as both the input device 405 and the output device 406 may be used. The output device 406 may further include, for example, a speaker 417 in addition to the touch screen 416 or a display not illustrated in the attached drawings.

Furthermore, the storage device 407 is a non-volatile storage device such as a hard disk device, a flash memory, etc.

Described below is the relationship between FIGS. 3 and 4.

The authentication information input unit 210 is realized by the input device 405, and the authentication information DB 220 is stored on the storage device 407. The personal authentication unit 230 is realized by the CPU 401 executing a program. To hold the authentication information DB 220, the tamper-resistant storage device 407 may be used.

When the personal authentication unit 230 performs the personal authenticating process based on a combination of an ID and a password, the authentication information input unit 210 is realized by the keyboard 412. In addition, when the personal authentication unit 230 performs the biometric authentication by voiceprint, the authentication information input unit 210 is realized by the microphone 413. Otherwise, when the personal authentication unit 230 performs biometric authentication by fingerprint, vein pattern, iris, etc., the authentication information input unit 210 may be realized by the camera 414, or realized by a dedicated sensor 415 such as a fingerprint sensor etc.

The communication control unit 240 is realized by the CPU 401 for executing a program and the communication interface 404. The address measurement unit 250 and the address management unit 260 are realized by the CPU 401 executing a program.

Although the registered environment DB 270 is held on the storage device 407, it is obvious that the information in the registered environment DB 270 may be temporarily stored in the RAM 403. The feature point distribution generation unit 280 and the environment judgment unit 290 may also be realized by the CPU 401 executing a program.

Figure 5:
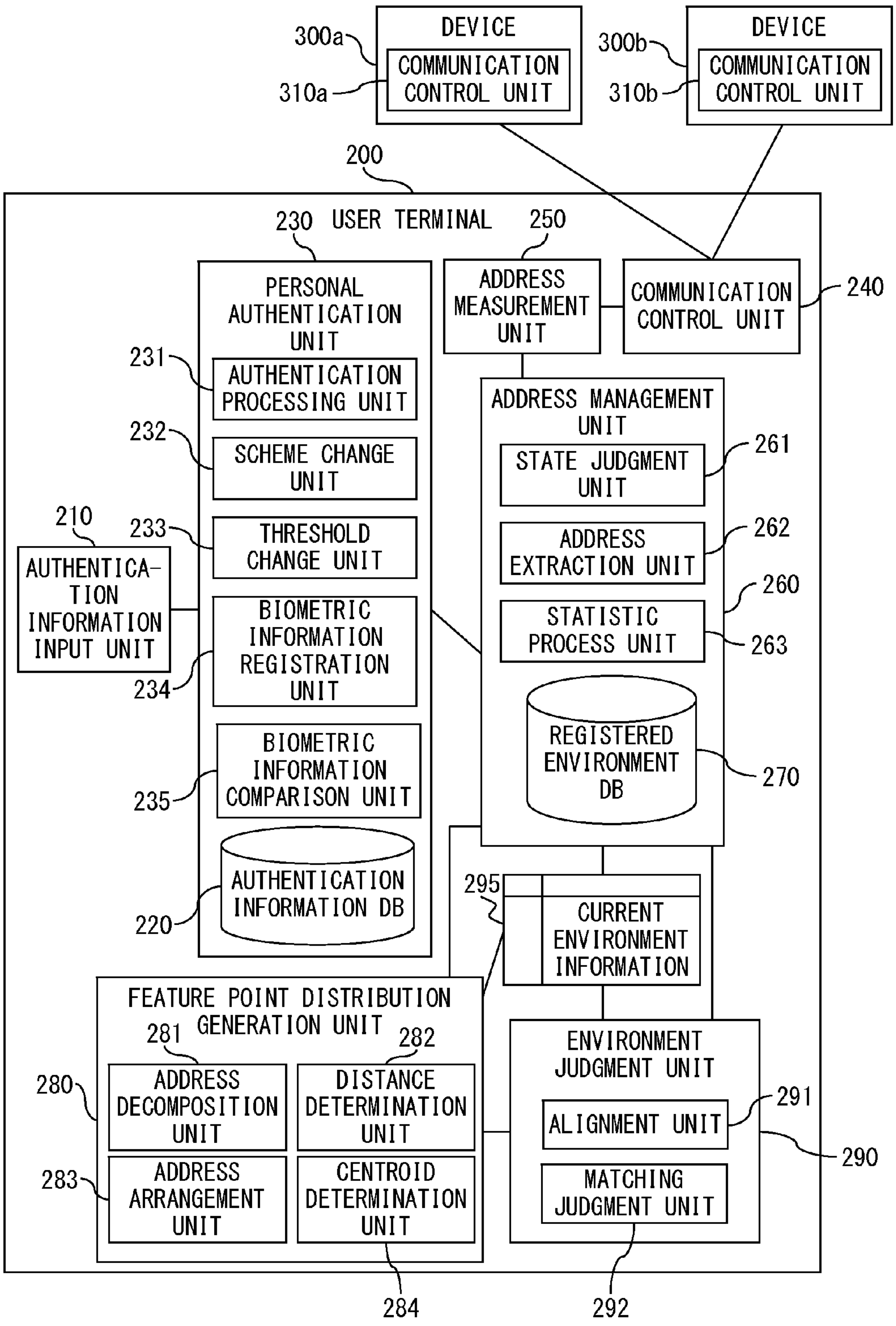
FIG. 5 illustrates the details of the configuration of the user terminal according to the second embodiment.

Next described are the details of the user terminal 200 illustrated in FIG. 3. FIG. 5 illustrates the details of the configuration of the user terminal 200 according to the second embodiment. In FIG. 5, the component similar to that in FIG. 3 is assigned the same reference symbol as in FIG. 3.

As illustrated in FIG. 5, the personal authentication unit 230 includes an authentication processing unit 231, a scheme change unit 232, a threshold change unit 233, a biometric information registration unit 234, and a biometric information comparison unit 235. In addition, although the authentication information DB 220 is illustrated outside the personal authentication unit 230 in FIG. 3, the personal authentication unit 230 may include the authentication information DB 220 as illustrated in FIG. 5.

Then, as illustrated in FIG. 5, the address management unit 260 includes a state judgment unit 261, an address extraction unit 262, and a statistic process unit 263. Although the registered environment DB 270 is illustrated outside the address management unit 260 in FIG. 3, the address management unit 260 may include the registered environment DB 270 as illustrated in FIG. 5.

Then, the feature point distribution generation unit 280 includes an address decomposition unit 281, a distance determination unit 282, an address arrangement unit 283, and a centroid determination unit 284. In addition, the environment judgment unit 290 includes an alignment unit 291 and a matching judgment unit 292.

Furthermore, the user terminal 200 temporarily holds current environment information 295 as internal data. The current environment information 295 is held on, for example, the RAM 403, and accessible from the address management unit 260, the feature point distribution generation unit 280, and the environment judgment unit 290.

Described below is the operation of each unit in FIG. 5.

The authentication processing unit 231 in the personal authentication unit 230 performs the authenticating process using the information input from the authentication information input unit 210 and the information stored in the authentication information DB 220. The authentication information DB 220 stores the information for associating the user ID with the password, and stores the biometric information about the user.

Furthermore, the scheme change unit 232 appropriately switches the scheme for the authenticating process. Concretely, the scheme change unit 232 switches between the text-based authenticating process using an ID and a password, and the authenticating process using biometric information to be used by the authentication processing unit 231.

When the authentication processing unit 231 performs the biometric authentication, the biometric information comparison unit 235 compares the information input from the authentication information input unit 210 with the information stored in the authentication information DB 220. The biometric information comparison unit 235 calculates the score (also referred to as a matching score) indicating the degree of matching between the information input from the authentication information input unit 210 and the information stored in the authentication information DB 220, and outputs the calculated score to the authentication processing unit 231.

The authentication processing unit 231 compares the score output from the biometric information comparison unit 235 with the matching threshold. If the score exceeds the matching threshold, the authentication processing unit 231 judges that the user has been authenticated. If the score is equal to or less than the matching threshold, the authentication processing unit 231 judges that the user is not authenticated.

As described above, the matching threshold is switchable. Concretely, depending on the answer from the address management unit 260 or the environment judgment unit 290 in response to the inquiry from the personal authentication unit 230, the threshold change unit 233 switches the matching threshold.

The biometric information registration unit 234 performs the process of registering the biometric information about a user in the authentication information DB 220.

The state judgment unit 261 in the address management unit 260 judges the state of the process performed by the address management unit 260. Concretely, the state judgment unit 261 judges which is being performed, the environment registering process for registering a particular environment in the registered environment DB 270 or the measuring process for recognizing the environment in which the user terminal 200 is currently located. In the second embodiment, the measurement of an address by the address measurement unit 250 is repeated for plural number of times in the environment registering process. Therefore, the state judgment unit 261 judges the progress of the environment registering process.

When the address management unit 260 requests the feature point distribution generation unit 280 to start the judging process, the address extraction unit 262 extracts data of the address from the registered environment DB 270, and outputs the extracted data to the feature point distribution generation unit 280.

In addition, the statistic process unit 263 generates statistic information based on the state judged by the state judgment unit 261. The statistic process unit 263 stores the statistic information in the registered environment DB 270 or the current environment information 295.

In the feature point distribution generation unit 280, the address decomposition unit 281 decomposes an address into two parts, and calculates the X coordinate and the Y coordinate from the two parts. That is, the address decomposition unit 281 maps the address to the point in the XY coordinate space (that is, the XY plane). The address decomposition unit 281 is also one of an example of the mapping unit 102 in FIG. 1.

The distance determination unit 282 and the address arrangement unit 283 cooperate with each other to perform the process similar to the distribution recognition unit 103 in FIG. 1 (concretely, calculating an offset).

Concretely, the distance determination unit 282 determines the size of the offset using the statistic information included in the current environment information 295. In the second embodiment, the distance which reflects the unstableness of an address is defined as described later, and a half of the distance is used as the size of the offset. Then, the address arrangement unit 283 generates a random angle as the direction of the offset, and moves the point by adding the offset.

Then, the centroid determination unit 284 calculates the position of the centroid of the moved points. Furthermore, the centroid determination unit 284 calculates the angle with respect to the centroid of the moved points as an angle of the feature point. As described above, the feature point distribution generation unit 280 may generate on the environment in which the user terminal 200 is currently located a feature point distribution in which the offset is used.

The feature point distribution generation unit 280 may also generate a feature point distribution without using the offset. That is, the centroid determination unit 284 calculates the centroid of the points mapped on the XY plane by the address decomposition unit 281, and may calculate the angle with respect to the centroid of each point as an angle of each feature point. With respect to the environment registered in the registered environment DB 270, the feature point distribution generation unit 280 generates a feature point distribution without using an offset.

Furthermore, the two feature point distributions generated by the feature point distribution generation unit 280 are compared by the environment judgment unit 290. Concretely, the alignment unit 291 performs the alignment based on the centroid. Then, the matching judgment unit 292 compares the corresponding feature points, and judges whether or not the two feature points match in the allowable range. The environment judgment unit 290 calculates the degree of matching between the feature point distributions.

As a result, the environment judgment unit 290 obtains a judgment result as to whether or not the two environments indicated by the two feature point distributions are identical. The environment judgment unit 290 outputs the judgment result to the address management unit 260. The judgment result is output from the address management unit 260 to the personal authentication unit 230.

FIG. 5 illustrates the authentication information DB 220, the registered environment DB 270, and the current environment information 295 as examples of the information used by the user terminal 200, but other types of information are used in the user terminal 200. FIG. 6 exemplifies a part of the information used in the user terminal 200.

The personal authentication unit 230 holds threshold information 236 illustrated in FIG. 6. The threshold information 236 is the information for association of two matching thresholds with the respective environments. In the example in FIG. 6, the threshold information 236 includes a matching threshold having the value of 4500 for a registered environment, and a matching threshold having the value of 7000 for a new unregistered environment.

In the second embodiment, the larger the matching threshold, the more strictly the biometric authentication is performed. For example, when the matching score is 5000, the user is authenticated if 4500 is used as a matching threshold, but the user is not authenticated if 7000 is used as a matching threshold.

That is, the larger the matching threshold, the lower the false accept rate becomes and the security is enhanced. On the other hand, the smaller the matching threshold, the lower the false reject rate, and the user-friendliness increases.

Therefore, a registered environment is associated with a matching threshold of a relatively small value (4500 in the example in FIG. 6) to prioritize the user-friendliness. On the other hand, a new unregistered environment (that is, an unknown environment) is associated with a matching threshold of a relatively large value (7000 in the example in FIG. 6) to prioritize the security.

The address management unit 260 holds a measurement frequency 264, a reference frequency 265, and a measuring interval 266 as internal data illustrated in FIG. 6. The measurement frequency 264 is, in other words, a measurement count, and it indicates the number of times (i.e., the number of rounds) that the address measurement has been performed.

In the example in FIG. 6, the value of the measurement frequency 264 is 16, but the measurement frequency 264 is incremented each time an address(es) is/are collected. The measurement frequency 264 is written to a non-volatile storage device (for example, the storage device 407) before the user terminal 200 is turned off. The state judgment unit 261 judges the state based on the value of the measurement frequency 264.

The reference frequency 265 is a specified constant for definition of an iteration frequency of measuring an address in the environment registering process. In the example in FIG. 6, the value of the reference frequency 265 is 16, but the value of the reference frequency 265 may be arbitrarily set according to an embodiment.

The measuring interval 266 is a specified constant for definition of the interval of measuring an address in the environment registering process. In the example in FIG. 6, the value of the measuring interval 266 is 30 minutes, but the value of the measuring interval 266 may be obviously arbitrary depending on an embodiment. Based on the reference frequency 265 and the measuring interval 266, the time taken for the environment registering process is regulated.

Described next in more detail is the operation of the user terminal 200.

FIG. 7 is a flowchart of the process started by the user terminal 200 according to the second embodiment when electric power is supplied (i.e., when the user terminal 200 is powered on).

When the user terminal 200 is powered on, the personal authentication unit 230 first issues an inquiry to the address management unit 260 as to how the personal authentication is performed in step S201. Then, the address management unit 260 judges whether or not an environment has been registered in the registered environment DB 270.

Then, if no environment has been registered in the registered environment DB 270 (that is, the registered environment DB 270 is in an initial state in which the registered environment DB 270 has no entry), then the address management unit 260 notifies the personal authentication unit 230 that the environment has been unregistered. Then, control is passed to step S202. On the other hand, if an environment has been registered in the registered environment DB 270 (that is, when the registered environment DB 270 has one or more entries), then control is passed to step S213.

In step S202, in the personal authentication unit 230 which has been notified from the address management unit 260 that no environment is registered, the scheme change unit 232 selects an authentication scheme. When the scheme change unit 232 selects the authentication by an ID and a password as the authentication scheme, control is passed to step S203. On the other hand, if the scheme change unit 232 selects biometric authentication as the authentication scheme, control is passed to step S206.

For example, the user terminal 200 may be a device which supports the authentication by an ID and a password and supports the biometric authentication. Furthermore, the user terminal 200 may be configured so that if the biometric information has been registered in the authentication information DB 220, the biometric authentication is prioritized over the authentication by an ID and a password. Then, in step S202, the scheme change unit 232 selects the biometric authentication as the authentication scheme if the biometric information has been registered in the authentication information DB 220, and selects the authentication by an ID and a password as the authentication scheme if the biometric information has not been registered in the authentication information DB 220.

Otherwise, depending on an embodiment, the user terminal 200 may support only to the authentication by biometric authentication. In this case, assuming that the biometric information has been registered in the authentication information DB 220, the scheme change unit 232 always selects the biometric authentication as the authentication scheme in step S202. Therefore, steps S202 through S205 may be omitted. That is, when no environment is registered, control may be passed from step S201 directly to step S206.

In step S203, the authentication information input unit 210 (for example, the keyboard 412) receives the input of an ID and a password, and outputs the accepted ID and password to the authentication processing unit 231.

Then, in the next step S204, the authentication processing unit 231 performs the authenticating process based on the ID and the password according to the ID and password obtained from the authentication information input unit 210 and the information stored in the authentication information DB 220.

Then in step S205, the authentication processing unit 231 judges whether or not the authentication has been successfully performed. If a correct combination of an ID and a password is input in step S203, the authentication is successfully performed, thereby passing control from step S205 to step S209.

On the other hand, if a combination of an ID and a password is not correct, a successful authentication result is not acquired, thereby terminating the process in FIG. 7. Depending on an embodiment, the authentication processing unit 231 may display an error message on the screen if a successful authentication result is not acquired, and control may be returned to step S203 again.

When the biometric authentication is selected as the authentication scheme, the authentication information input unit 210 (for example, the sensor 415) accepts an input of the biometric information in step S206. Then, the authentication information input unit 210 outputs the accepted biometric information to the authentication processing unit 231.

Then in the next step S207, a strict biometric authenticating process is performed using a matching threshold for a new unregistered environment. Concretely, the following process is performed.

The authentication processing unit 231 requests the biometric information comparison unit 235 to compare the biometric information input from the authentication information input unit 210 with the biometric information registered in the authentication information DB 220. Then, the biometric information comparison unit 235 compares the biometric information according to the request, calculates a score, and outputs it to the authentication processing unit 231.

In addition, the threshold change unit 233 selects a matching threshold for a new unregistered environment from the threshold information 236. That is, the threshold change unit 233 selects a new unregistered matching threshold according to the notification in step S201 from the address management unit 260 that no environment has been registered. Then, the authentication processing unit 231 compares the score obtained from the biometric information comparison unit 235 with the matching threshold selected by the threshold change unit 233.

Then, in the next step S208, the authentication processing unit 231 judges whether or not a successful authentication result has been acquired. When the score exceeds a matching threshold, a successful authentication result is acquired, thereby passing control to step S209.

On the other hand, when the score is equal to or less than the matching threshold, a successful authentication result is not acquired, thereby terminating the process in FIG. 7. Depending on an embodiment, when a successful authentication result is not acquired, the authentication processing unit 231 may display an error message on the screen, and control may be returned to step S206 again.

Step S209 is performed when an environment is unregistered, and a successful authentication result is acquired. In step S209, the address management unit 260 judges whether or not the environment in which the user terminal 200 is currently located is to be registered. For example, the address management unit 260 may accept an instruction from a user relating to whether or not the environment in which the user terminal 200 through a input unit not illustrated in FIG. 5 (for example, input device 405 in FIG. 4) is currently located is to be registered, and make a judgment in step S209 at the instruction.

If the address management unit 260 judges that the current environment is to be registered, then the processes in steps S210 and S211 are concurrently performed. On the other hand, if the address management unit 260 judges that the current environment is not to be registered, control is passed to step S212.

In step S210, the user terminal 200 (concretely, for example, the CPU 401) appropriately performs other processes. The process performed instruction S210 may be an arbitrary process whose performance is authorized to an authenticated user.

In step S211, the address management unit 260, the address measurement unit 250, and the communication control unit 240 cooperate to perform the environment registering process in FIG. 8. As a result, the environment in which the user terminal 200 is located is registered in the registered environment DB 270.

When the steps S210 and S211 are completed, the process in FIG. 7 also terminates. After the termination of the process in FIG. 7, the power supply to the user terminal 200 may be disconnected.

When it is judged that the current environment is not to be registered, the user terminal 200 appropriately perform other processes in step S212 as in step S210. After the termination of other processes, the process in FIG. 7 also terminates. After the termination of the process in FIG. 7, the power supply of the user terminal 200 may be disconnected.

Figure 12:
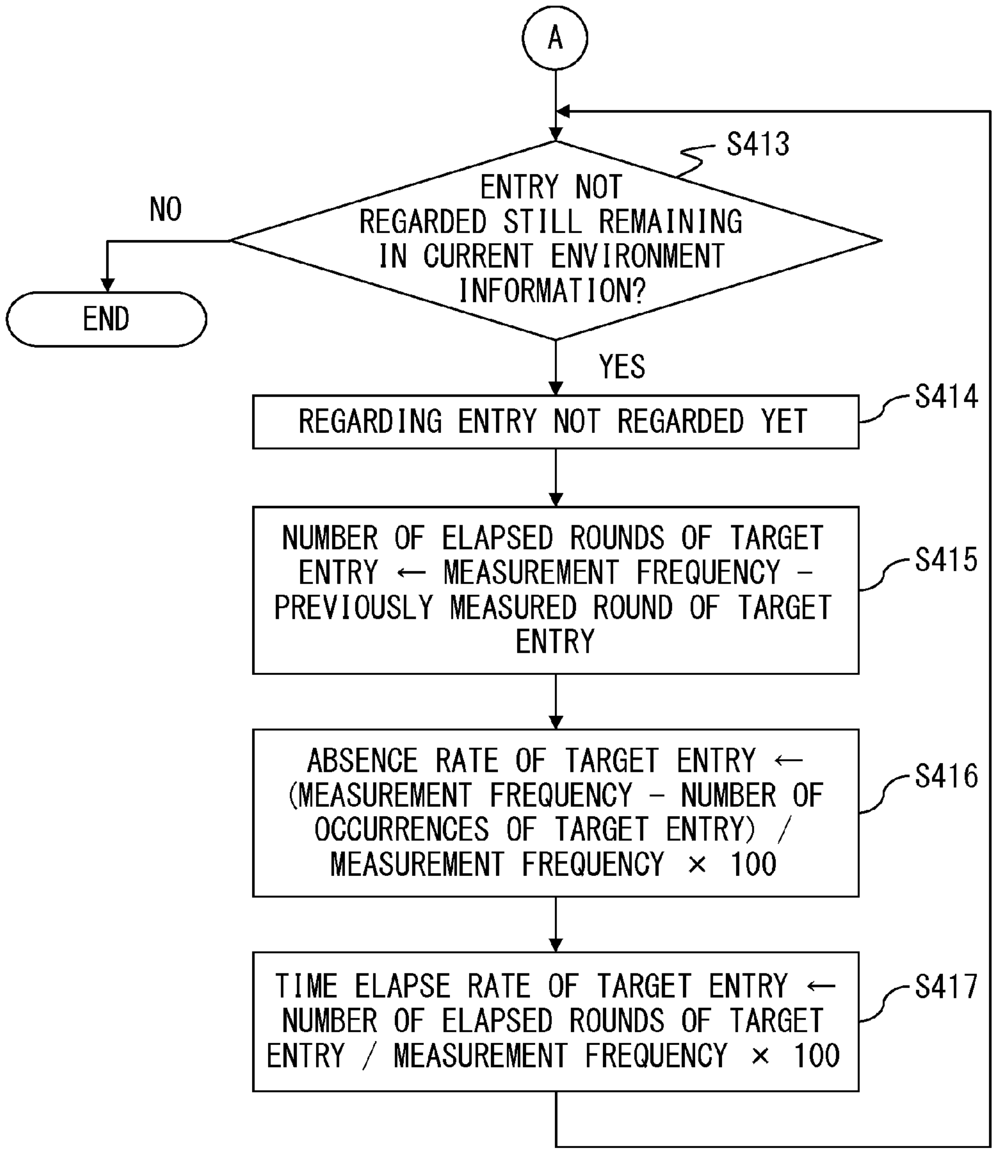
FIG. 12 is a flowchart (No. 2) of the measuring process.

Unlike the processes in steps S202 through S212, if any environment has been registered in the registered environment DB 270, the measuring process illustrated in FIGS. 11 and 12 is performed in step S213. In the measuring process, the addresses of other devices located in the environment in which the user terminal 200 is currently located are collected.

Figure 14:
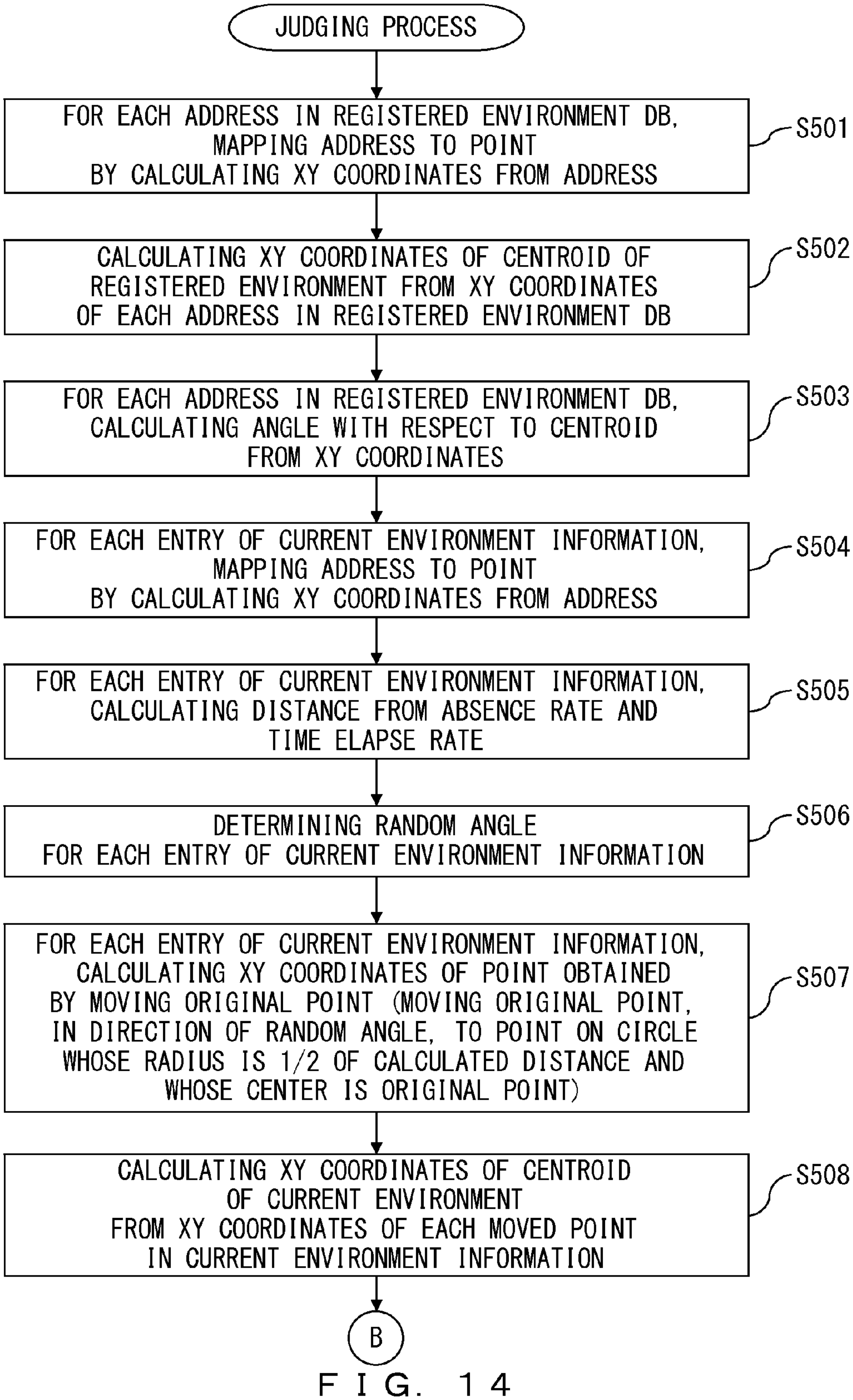
FIG. 14 is a flowchart (No. 1) of a judging process according to the second embodiment.

Then, in the next step S214, the address management unit 260 requests the feature point distribution generation unit 280 to start the judging process in FIGS. 14 through 15 (including the comparing process in FIG. 20). Then, the feature point distribution generation unit 280 generates a feature point distribution corresponding to the environment registered in the registered environment DB 270, and further generates a feature point distribution corresponding to the environment in which the user terminal 200 is currently located.

Then, the environment judgment unit 290 judges from the degree of matching between two feature point distributions whether or not the registered environment is identical to the current environment. The threshold change unit 233 selects a matching threshold depending on the judgment result, and authentication processing unit 231 performs the biometric authentication using the selected matching threshold.

Then, in the next step S215, the authentication processing unit 231 judges whether or not the biometric authentication performed in the judging process is successful. If the score output from the biometric information comparison unit 235 exceeds the matching threshold then a successful authentication result is acquired, thereby passing control to step S216.

On the other hand, when the score is equal to or less than the matching threshold, a successful authentication result is not acquired, thereby terminating the process in FIG. 7. Depending on an embodiment, the authentication processing unit 231 may display an error message on the screen if a successful authentication result is not acquired, or the process may be repeated from the acceptance of the input of the biometric information in the judging process.

When a successful authentication result is acquired in step S214, the user terminal 200 appropriately perform other processes in step S216 as in step S210. After the termination of other processes, the process in FIG. 7 also terminates. After the termination of the process in FIG. 7, the power supply to the user terminal 200 may be disconnected.

Next, the details of the environment registering process in step S211 in FIG. 7 are described below with reference to FIGS. 8 through 10. FIG. 8 is a flowchart of the environment registering process, and FIG. 9 is an explanatory view of the first example of an environment change. FIG. 10 illustrates the information about the registered environment in the first example. In the description below, the flow of the environment registering process is first described with reference to FIG. 8, and then concrete explanation is given as to what information is registered in the registered environment DB 270 in the example in FIG. 9.

In step S301 in FIG. 8, the state judgment unit 261 initializes the value of the measurement frequency 264 to 0. The measurement frequency 264 is a variable to be incremented each time an address is measured by the environment registering process or the measuring process.

Then, in the next step S302, the state judgment unit 261 judges whether or not the measurement frequency 264 is lower than a predetermined reference frequency 265. If the measurement frequency 264 is lower than the reference frequency 265, control is passed to step S303. On the other hand, when the measurement frequency 264 reaches the reference frequency 265, the environment registering process terminates.

In step S303, the state judgment unit 261 increments the measurement frequency 264 by 1.

Then, in the next step S304, the address management unit 260 requests the address measurement unit 250 to collect addresses. Then, the address measurement unit 250 performs communications through the communication control unit 240, and collects the addresses of other devices (for example, the device 300*a* and 300*b*) in the vicinity of the user terminal 200. For the same reason as described with reference to the first embodiment, the address to be collected is a MAC address also in the second embodiment.

That is, the MAC address is an address which is not variable with the lapse of time and specific to a device, and collectable by a common protocol which is independent of a vendor. Therefore, the MAC address is appropriate as an address to be collected for comparison between two feature point distributions respectively indicating the environments at two different points in time.

A concrete method of collecting the MAC address depends on the type of device (for example, the device 300*a* or 300*b*) in the vicinity of the user terminal 200 (that is, a device located in the same environment as the user terminal 200). Obviously, the user terminal 200 does not recognize in advance what type of device is located in the environment in which the user terminal 200 is currently located.

Then, in step S304, the address measurement unit 250 collects addresses in a plurality of methods. Concretely, it is preferable that the address measurement unit 250 collects addresses in two or more methods in the four methods, that is, (B1) through (B4).

(B1) A method of collecting a MAC address, by transmission and reception of packets in accordance with the Bluetooth (registered trademark) standard, from a device compatible with Bluetooth (registered trademark)

(B2) A method of collecting a MAC address, by transmission and reception of ARP (Address Resolution Protocol) packets, from a device which belongs to the same subnet as the user terminal 200

(B3) A method of collecting a MAC address by the reception of a beacon frame from a wireless LAN access point (B4) A method of collecting a MAC address by the reception of a beacon frame from a wireless LAN terminal of the ad hoc mode Described below in detail are the methods of (B1) through (B4) above.

The MAC address which may be collected by the address measurement unit 250 in the method (B1) is the MAC address of a device which is compatible with Bluetooth (registered trademark) and satisfies all of the following conditions (C1) through (C3).

(C1) The device is powered on.

(C2) The device is located in a position in which the device is physically able to communicate with the user terminal 200.

(C3) The device is set so as to respond to device detection (that is, the "Scan Enable" parameter is set to be "enabled").

In the method (B1), the address measurement unit 250 sets Link Control Commands and an Inquiry Command for device search in an HCI (Host Controller Interface) command packet, thereby generating an Inquiry packet (which may be referred to as an IQ packet). Then, the address measurement unit 250 broadcasts the IQ packet through the communication control unit 240.

For convenience of explanation below, for example, assume that the device 300*a* satisfies the conditions (C1) through (C3). In this case, the device 300*a* detects a broadcast IQ packet by periodically scanning an IQ packet.

Then, upon detection of an IQ packet, the device 300*a* generates an FHS (Frequency Hop Synchronization) packet as a reply packet in response to the IQ packet. Concretely, the device 300*a* sets a MAC address of the device 300*a* itself in the FHS packet, and transmits the FHS packet to the user terminal 200, which has transmitted the IQ packet.

Then, the communication control unit 240 of the user terminal 200 receives the FHS packet. Then, the address measurement unit 250 extracts the MAC address of the device 300*a* from the payload of the received FHS packet. As described above, the address measurement unit 250 acquires the MAC address of the device (for example, the device 300*a*) which satisfies the conditions (C1) through (C3) in the method (B1).

In addition, the address measurement unit 250 may collect the MAC address by the method (B2).

In the method (B2), it is assumed that the address measurement unit 250 is able to recognize the IP address set in the user terminal 200, the MAC address of the user terminal 200, and the network address part of the IP address. However, the assumption is not a substantial restriction.

That is, the assumption generally holds true in the computer 400 having a network function. For example, by executing an ipconfig command, the address measurement unit 250 is enabled to recognize the IP address set in the user terminal 200, the MAC address of the user terminal 200, and the network address part (that is, bits specified by a subnet mask) of the IP address.

The address which may be collected by the address measurement unit 250 in the method (B2) is a MAC address of a device which satisfies all of the following conditions (D1) through (D3).

(D1) The device is powered on.

(D2) The device is connected to a cable LAN (i.e., wired LAN) or a wireless LAN.

(D3) The device belongs to the same subnet (that is, the same broadcast domain) as the user terminal 200.

In the method (B2), the address measurement unit 250 first recognizes the IP address, the MAC address, and the subnet mask set in the user terminal 200. Then, the address measurement unit 250 generates all IP addresses which are logically possible in the same subnet as the user terminal 200, from the subnet mask and the IP address set in the user terminal 200.

For convenience of explanation below, for example, assume that the IP address of the user terminal 200 is 192.168.20.5, and the subnet mask is 255.255.255.0. That is, the most significant 24 bits are used as the network address part of the IP address, and the least significant 8 bits are used as the host address part. In this case, the number of the IP addresses which are logically possible in the same subnet as the user terminal 200 is 256, that is, from 192.168.20.0 to 192.168.20.255.

When the length of the host address part of the IP address of the user terminal 200 is H-bit long, the address measurement unit 250 generates bit strings of all (that is $2^H$) possible patterns having the length of H bits. Then, the address measurement unit 250 generates all logically possible IP addresses by prepending the network address part of the IP address of the user terminal 200 to each of the generated bit strings.

In the example above, in the logically possible 256 IP addresses, the IP address of the user terminal 200 itself is 192.168.20.5. Therefore, the address measurement unit 250 generates an ARP request packet for each of the 255 remaining IP addresses, and broadcasts the generated ARP request packet through the communication control unit 240.

The address measurement unit 250 sets the IP address of the user terminal 200 itself in the sender IP address field of the ARP request packet. In addition, the address measurement unit 250 sets the MAC address of the user terminal 200 itself in the sender MAC address field of the ARP request packet.

Then, the address measurement unit 250 sets the generated IP address in the target IP address field of the ARP request packet. For example, assume that, in the generated IP addresses, the IP address which is currently focused on as a process target by the address measurement unit 250 is 192.168.20.35. In this case, the address measurement unit 250 sets 192.168.20.35 in the target IP address field of the ARP request packet.

In the ARP request packet, the target MAC address field is ignored. Therefore, the address measurement unit 250 may set, for example, all bits of the target MAC address field to 1.

If a device having the IP address specified as the target IP address in the ARP request packet exists in the same subnet as the user terminal 200, the device which has received the ARP request packet transmits an ARP reply packet to the user terminal 200. Therefore, when the address measurement unit 250 transmits an ARP request packet to each of the 255 IP addresses as exemplified above, the maximum of 255 ARP reply packets may be received by the user terminal 200.

For convenience of explanation below, for example, assume that the IP address of 192.168.20.35, which is generated by the address measurement unit 250, is assigned to the device 300*b*. In this case, the device 300*b* sets, in the target IP address field of the ARP reply packet, the value (that is, the IP address 192.168.20.5 of the user terminal 200 in the example above) of the sender IP address field of the received ARP request packet. The device 300*b* sets the IP address (that is, 192.168.20.35) of the device 300*b* itself in the sender IP address field of the ARP reply packet.

Then, the device 300*b* sets, in the target MAC address field of the ARP reply packet, the value (that is, the MAC address of the user terminal 200) of the sender MAC address field of the received ARP request packet. Furthermore, the device 300*b* sets the MAC address of the device 300*b* itself in the sender MAC address field of the ARP reply packet.

Then, the communication control unit 240 of the user terminal 200 receives the ARP reply packet. The address measurement unit 250 extracts the MAC address from the sender MAC address field of the ARP reply packet. As described above, the address measurement unit 250 acquires the MAC address of the device (for example, the device 300*b*) which satisfies the conditions (D1) through (D3) in the method (B2).

The address measurement unit 250 may also collect the MAC address in the method (B3).

The method (B3) is effective when the wireless LAN function of the user terminal 200 is set in the infrastructure mode. In the method (B3), the address which may be collected by the address measurement unit 250 is the MAC address of the wireless LAN access point which satisfies all the following conditions (E1) through (E3).

(E1) The device is powered on.

(E2) The device is located in a position in which it may physically communicate with the user terminal 200.

(E3) A setting is made so that a beacon frame is broadcast.

The address measurement unit 250 waits until the communication control unit 240 receives the beacon frame periodically broadcast by the wireless LAN access point. For example, the address measurement unit 250 may wait for the longest possible time which may be set as a beacon interval according to the IEEE 802.11 standard, and monitor whether or not the beacon frame is received in the period. When the communication control unit 240 receives the beacon frame, the address measurement unit 250 extracts the MAC address from the MAC header of the beacon frame, and acquires the address.

Furthermore, the address measurement unit 250 may collect the MAC address in the method (B4).

The method (B4) is effective when the wireless LAN function of the user terminal 200 is set in the ad hoc mode. The address which may be collected by the address measurement unit 250 in the method (B4) is the MAC address of the wireless LAN terminal which satisfies all of the following conditions (F1) through (F4).

(F1) The device is powered on.

(F2) The device is located in the position in which the device may communicate with the user terminal 200.

(F3) The wireless LAN function is set in the ad hoc mode.

(F4) A setting is made so that a beacon frame may be broadcast.

The address measurement unit 250 waits until the communication control unit 240 receives the beacon frame periodically broadcast by another wireless LAN terminal. When the communication control unit 240 receives the beacon frame, the address measurement unit 250 extracts the MAC address from the MAC header of the beacon frame, and acquires the address.

The following method may be used as a variation example of the methods (B3) and (B4). That is, the address measurement unit 250 may transmit a probe request frame through the communication control unit 240 instead of waiting for the reception of the beacon frame. When the communication control unit 240 receives a probe reply frame in response to the transmitted probe request frame, the address measurement unit 250 may extract the MAC address from the probe reply frame.

As explained above, the address measurement unit 250 collects the MAC address of each type of device in the vicinity in a plurality of methods in step S304. Then, the address measurement unit 250 outputs each measured MAC address to the address management unit 260.

Then, in step S305, the address management unit 260 judges whether or not there is an unprocessed address which has not been regarded (i.e., focused on) as a target of the processes in and after step S307 in the addresses collected by the address measurement unit 250.

If there is no more unprocessed address, control is passed to step S306. On the other hand, if there is still an unprocessed address, control is passed to step S307.

In step S306, the address management unit 260 waits only for the measuring interval 266 (for example, 30 minutes in the example illustrated in FIG. 6). If the measuring interval 266 elapses, control is returned to step S302.

On the other hand, in step S307, the address management unit 260 regards (i.e., focuses on) an unprocessed address which has not been regarded by the address measurement unit 250 in the addresses collected in step S304. For convenience in the following description, the address regarded by the address management unit 260 in step S307 is referred to as a target address.

Then, in the next step S308, the address management unit 260 judges whether or not the target address has been registered in the registered environment DB 270. The details are described later with reference to FIG. 10, but each entry of the registered environment DB 270 includes each field of a MAC address, a number of occurrences, and a previously measured round. Therefore, the address management unit 260 searches the registered environment DB 270 for an entry in which the value of the MAC address is equal to that of the target address.

If an entry is found as a result of the search, the target address has already been registered in the registered environment DB 270. Therefore, control is passed to step S309. For convenience in the following description, the entry found in the search in step S308 is referred to as a target entry.

On the other hand, if no entry is found as a result of the search, the target address is an address newly collected this time, and has not been registered in the registered environment DB 270. Therefore, control is passed to step S311.

Then, in step S309, the statistic process unit 263 in the address management unit 260 increments by 1 the value of the number-of-occurrence field in the target entry of the registered environment DB 270. The number-of-occurrence field indicates the number of times the address registered in the MAC address field has been measured by the address measurement unit 250.

In addition, in the next step S310, the statistic process unit 263 sets the value of the current measurement frequency 264 in the value of the previously measured round field in the target entry of the registered environment DB 270. The previously measured round field indicates when the latest measurement in which the address measurement unit 250 measured the address registered in the MAC address field is made.

The operation order of steps S309 and S310 may be inverted. After performing steps S309 and S310, control is returned to step S305.

In step S311, the address management unit 260 adds a new entry to the registered environment DB 270.

Then, in the next step S312, the address management unit 260 sets a target address in the MAC address field of the new entry.

Furthermore, in the next step S313, the statistic process unit 263 initializes the value of the number-of-occurrence field of the new entry to 1.

Furthermore, in the next step S314, the statistic process unit 263 sets the value of the current measurement frequency 264 in the value of the previously measured round field of the new entry.

The operation order of steps S312 through S314 may be arbitrarily changed. After performing steps S312 through S314, control is returned to step S305.

Described next concretely is what information is to be registered in the registered environment DB 270 in the above-mentioned environment registering process.

FIG. 9 is a table 501*a* as a first example of an environment change. The table 501*a* illustrates the states of the following (G1) through (G3).

(G1) The user terminal 200 is powered on in the morning on Aug. 25, 2010, and the process in FIG. 7 is performed. In step S211, the environment registering process in FIG. 8 is performed until evening. After performing the environment registering process, the user terminal 200 is turned off.

(G2) The user terminal 200 is powered on again in the morning on Aug. 26, 2010, and the process in FIG. 7 is performed. This time, the processes in and after step S213 are performed. Afterwards, the user terminal 200 is turned off again.

(G3) The user terminal 200 is powered on again in the morning on Aug. 27, 2010, the process in FIG. 7 is performed, and the processes in and after step S213 are performed again. Afterwards, the user terminal 200 is turned off again.

On the table 501*a*, the state (G1) is indicated on 16 records on which "registration" is written in the leftmost column. The states (G2) and (G3) are indicated on 2 records on which "measurement" is written in the leftmost column. The details of the states (G2) and (G3) are described later with reference to FIGS. 11 through 22.

Furthermore, for convenience of explanation below, "A" through "E" are short for the respective addresses in FIG. 9. In FIG. 9, the collected addresses are marked with a white circle, and the uncollected addresses are marked with a dash.

The state (G1) expressed by the table 501*a* is described in more detail as follows.

First, at 9:25 on Aug. 25, 2010, the value of the measurement frequency 264 is set to 1 in step S303, and the first address collection is made in step S304. The addresses obtained as a result are addresses A, B, C, and E. Therefore, a series of processes insteps S311 through S314 is repeated four times, and four entries are added to the registered environment DB 270 in the initial state in which no entry is included.

Afterwards, through the standby state (that is, the standby state for 30 minutes which is defined by the measuring interval 266) in step S306, control is returned to step S302. Then, at 9:55, the value of the measurement frequency 264 is set to 2 in step S303, and the second address collection is performed in step S304. The addresses obtained as a result are addresses A, B, C, D, and E.

Since the entries corresponding to the addresses A, B, C, and E have been stored in the registered environment DB 270, the processes in steps S309 and S310 are performed on these four addresses. On the other hand, since the address D has first been collected in the second collection, the processes in steps S311 through S314 are performed on the address D.

Similarly, addresses are collected at 30-minute intervals. When the 16th collection is completed at 16:55, the value of the measurement frequency 264 is 16, thereby reaching the reference frequency 265. Therefore, the address collection in the environment registering process is the last 16th acquired collection.

It is assumed that the user terminal 200 is located in a particular environment from 9:25 to 16:55. However, the particular environment is not constant, but somewhat fluctuates. Generally, the environment in which the user terminal 200 is used tends to somewhat fluctuate regularly.

For example, the address A is collected in all of 16 collections. In addition, although the address B is not collected in the 16th collection, it is collected in the other 15 collections. Therefore, a device having the addresses A and B is stably located in the environment.

The addresses C through E are collected in many cases. Therefore, a device having the addresses C through E is also stably located in the environment. However, in the environment registering process, the address C has not been collected two times, the address D has not been collected four times, and the address E has not been collected three times. Therefore, as compared with the device having the addresses A and B, the device having the addresses C through E is unstable to a certain extent.

A small fluctuation exemplified above may be caused by, for example, the following events (H1) through (H3).

(H1) A mobile device has been moved to another place.

(H2) The radio situation has been changed.

(H3) The power supply of a device is temporarily disconnected.

Therefore, it is preferable that whether or not the first environment in which the user terminal 200 is located at the first point in time is the same as the second environment in which the user terminal 200 is located at the second point in time is judged depending on whether or not the first and second environments match in an allowable range with a small fluctuation allowed because a judgment result may be incorrect when it is judged without an allowable range whether or not the first and second environments completely match.

In the second embodiment, a plurality of address collections are performed in the environment registering process as illustrated in FIGS. 8 and 9. Therefore, an environment is registered in the registered environment DB 270 with a fluctuation taken into account in a certain span of time (for example, 7 hours and 30 minutes from 9:25 to 16:55).

In the second embodiment, it is judged whether or not two environments match in an allowable range as described later with reference to FIGS. 11 through 28. Therefore, in the second embodiment, an appropriate judgment result which is robust against a small daily fluctuation is obtained.

In the example in FIG. 9, for example, 9:25 on Aug. 25, 2010 is an example of the first point in time in the first embodiment. In addition, 15 points in time from 9:55 to 16:55 on Aug. 25, 2010 are examples of one or more third points in time in the first embodiment.

Obviously, depending on a point of view, for example, 12:25 on Aug. 25, 2010 may be the first point in time, and the remaining 15 points in time on Aug. 25, 2010 may be one or more third points in time. Anyway, in the example in FIG. 9, the first environment is recognized by the user terminal 200 as a whole from a total of 16 points in time including one first point in time and fifteen third points in time.

The information about the environment registered in the first example illustrated by the table 501*a* in FIG. 9 is concretely described below with reference to FIG. 10. To support the understanding about the judging process described later, FIG. 10 illustrates not only the fields included in the registered environment DB 270, but also various types of information described later. In the description below, the registered environment DB 270 in the state in which the environment in the first example in FIG. 9 is registered is specifically expressed by the reference symbol of 270*a*.

As described with reference to FIG. 8, each entry of the registered environment DB 270 has the fields of a MAC address, the number of occurrences, and a previously measured round. For convenience of explanation below, FIG. 10 also illustrates a column of address abbreviation.

In the address abbreviation column, concretely the symbols "A" through "E" used in FIG. 9 are illustrated. That is, in the first example in FIG. 9, a set of addresses which are collected one or more times includes A, B, C, D, and E in the environment registering process. Therefore, the registered environment DB 270*a* has five entries corresponding to the five addresses.

Furthermore, as illustrated in FIG. 10, concretely, the address A is a MAC address "00c0e6f62ecf", and the address B is a MAC address "0054ef8a2c54". Also, concretely, the address C is a MAC address "0015af5a84b6", the address D is a MAC address "00c3a54af566", and address E is a MAC address "00645a16b1b8".

As illustrated in FIG. 9, the frequencies of the collections of the addresses A through E are respectively 16, 15, 14, 12, and 13 times. Then, the frequencies of the collections of the addresses A through E are stored in the number-of-occurrence field of the registered environment DB 270*a* as illustrated in steps S309 through S313 in FIG. 8.

Furthermore, as illustrated in FIG. 9, the timing of the latest collection of each of the addresses A through E is 16th, 15th, 14th, 16th, and 13th respectively. The value of the measurement frequency 264 when the addresses A through E are collected latest is stored in the previously measured round field of the registered environment DB 270*a* as illustrated in steps S310 and S314 in FIG. 8.

Next, the measuring process in step S213 in FIG. 7 is described in detail with reference to FIGS. 11 through 13. FIGS. 11 and 12 are flowcharts of the measuring process. FIG. 13 illustrates the information about the current environment on which the measuring process is performed in the first example illustrated in FIG. 9.

In step S401 in FIG. 11, the state judgment unit 261 increments the measurement frequency 264 by 1.

For example, in the first example in FIG. 9, as described above in (G2), the user terminal 200 is powered on again in the morning on Aug. 26, 2010. On the other hand, the value of the measurement frequency 264 when the user terminal 200 is shut down on the day before is 16, and the measurement frequency 264 is written to the non-volatile storage device before the disconnection of the power supply. Therefore, when the user terminal 200 is powered on again in the morning on Aug. 26, 2010 and the measuring process in FIGS. 11 and 12 is performed, the state judgment unit 261 increments the value of the measurement frequency 264 from 16 to 17 in step S401.

Similarly, in the first example in FIG. 9, when the user terminal 200 is powered on again in the morning on Aug. 27, 2010 and the measuring process in FIGS. 11 and 12 is performed, the state judgment unit 261 increments the value of the measurement frequency 264 from 17 to 18 in step S401.

Then, in the next step S402, the address management unit 260 copies the contents of the registered environment DB 270, thereby initializing the current environment information 295. Concretely, the address management unit 260 performs the processes of the following (I1) and (I2) in each entry of the registered environment DB 270.

(I1) the process of generating a new entry in the current environment information 295

(I2) the process of reading the values of the MAC address, the number of occurrences, the previously measured round from the entry of the registered environment DB 270, and copying the read values to the respective fields of the MAC address, the number of occurrences, and the previously measured round of the new entry of the current environment information 295.

As described later in detail with reference to FIG. 13, each entry of the current environment information 295 includes various other fields. However, the values of the fields other than the MAC address, the number of occurrences, and the previously measured round are set later.

Then, in the next step S403, the address management unit 260 requests the address measurement unit 250 to collect addresses. Then, the address measurement unit 250 collects addresses of other devices near the user terminal 200 as in step S304 in the environment registering process. Then, the address measurement unit 250 outputs the collected MAC addresses to the address management unit 260.

Then, in step S404, the address management unit 260 judges whether or not there is still an unprocessed address not regarded (i.e., focused on) as a target of the processes in and after step S405 in the addresses collected by the address measurement unit 250.

If there is no unprocessed address, control is passed to step S413 in FIG. 12. On the other hand, if there is still an unprocessed address, control is passed to step S405 in FIG. 11.

In step S405, the address management unit 260 regards (i.e., focuses on) the unprocessed address which has not been regarded in the addresses collected in step S403 by the address measurement unit 250. For convenience of explanation below, the address regarded by the address management unit 260 in step S405 is referred to as a target address.

Then, in step S406, the address management unit 260 judges whether or not the target address has been stored in the current environment information 295. As described above, since each entry of the current environment information 295 has a field of a MAC address, the address management unit 260 searches the current environment information 295 for an entry in which the value of the MAC address is equal to that of the target address.

When an entry is found as a result of the search, the target address has been stored in the current environment information 295. Therefore, control is passed to step S407. For convenience of explanation below, the entry found in the search in step S406 is referred to as a target entry.

On the other hand, if no entry is found as a result of the search, the target address has not been stored in the current environment information 295. Therefore, control is passed to step S409.

The case in which no entry is found as a result of the search in step S406 is a case in which the address not registered in the registered environment DB 270 but collected in the measuring process is regarded in step S405. In this case, the entry corresponding to the target address is not added to the current environment information 295 at the initialization in step S402. Therefore, no entry is found in the search in step S406.

Then, in step S407, the statistic process unit 263 in the address management unit 260 increments by 1 the value of the number-of-occurrence field in the target entry of the current environment information 295.

In addition, in the next step S408, the statistic process unit 263 sets the value of the current measurement frequency 264 in the value of the previously measured round field in the target entry of the current environment information 295.

The operation order of steps S407 and S408 may be inverted. After the execution in steps S407 and S408, control is returned to step S404.

In step S409, the address management unit 260 adds a new entry to the current environment information 295.

Then, in the next step S410, the address management unit 260 sets the value of the target address in the MAC address field of the new entry.

Furthermore, in the next step S411, the statistic process unit 263 initializes the value of the number-of-occurrence field of the new entry to 1.

In the next step S412, the statistic process unit 263 sets the value of the current measurement frequency 264 in the value of the previously measured round field of the new entry.

The operation order of steps S410 through S412 is arbitrarily changed. After the performance in steps S410 through S412, control is returned to step S404.

When the address management unit 260 completes regarding all addresses collected in step S403 by the address measurement unit 250, the address management unit 260 performs the processes in steps S413 through S417 in FIG. 12.

That is, in step S413, the statistic process unit 263 of the address management unit 260 judges whether or not there is an unprocessed entry which has not been regarded (i.e., focused on) as a target of the processes in steps S415 through S417 in the entries of the current environment information 295.

If there is no unprocessed entry, the measuring process in FIGS. 11 and 12 terminates. On the other hand, if there is an unprocessed entry, control is passed to step S414.

In step S414, the statistic process unit 263 regards (i.e., focuses on) an unprocessed entry which has not been regarded as a target of the processes in steps S415 through S417 in the entries of the current environment information 295. For convenience of explanation below, the entry regarded by the statistic process unit 263 in step S414 is referred to as a target entry.

The details are described later with reference to FIGS. 13 and 14, but the each of the entries in the current environment information 295 has the fields of number of elapsed rounds, absence rate, and time elapse rate. In the next steps S415 through S417, values are set in these three fields.

That is, in step S415, the statistic process unit 263 subtracts the previously measured round of the target entry from the current value of the measurement frequency 264. Then, the statistic process unit 263 sets the obtained difference in the number-of-elapsed-rounds field of the target entry of the current environment information 295.

That is, when the address of a target entry is collected by the current measuring process, 0 is necessarily set in the number-of-elapsed-rounds field. On the other hand, when the address of the target entry is not collected in the measuring process this time, the number-of-elapsed-rounds field indicates how many collecting operations have been performed including the current measuring process since the last collection of the address of the target entry through the environment registering process and the measuring process(es) up to this time.

For example, assuming that an address collecting operation is performed 16 times in the environment registering process, and the current operation is the second measuring process, the address collecting operation has been performed 18 times in all. Assume that an address has been last collected in the 15th address collection. Then, three address collections have been performed including the current measuring process since the last collection of the address. That is, in the three consecutive address collections from the 16th to the 18th collection, the address has not been collected. Therefore, 3 is set as the number of elapsed rounds.

In step S416, the statistic process unit 263 subtracts the value of the number of occurrences of the target entry from the current value of the measurement frequency 264, and the obtained difference is divided by the current value of the measurement frequency 264. Then the statistic process unit 263 multiplies the obtained quotient by 100, and the obtained product is set in the absence rate field of the target entry of the current environment information 295.

That is, the absence rate field indicates the percentage of the frequency at which the address of the target entry has not been collected to the total number of address collections performed in the environment registering process and all measuring processes including the latest process. For example, in a total of 18 address collections, the absence rate of the address which has been collected 15 times and has not collected 3 times is about 16.7% (=(18−15)/18×100).

In addition, in step S417, the statistic process unit 263 divides the value of the number of elapsed rounds of the target entry by the current value of the measurement frequency 264, and multiplies the obtained quotient by 100. Then, the statistic process unit 263 sets the obtained product in the time elapse rate field of the target entry of the current environment information 295. The time elapse rate field indicates the percentage of the number of elapsed rounds to the total number of times of the address collection performed in the environment registering process and the all measuring processes including the latest process.

Although step S417 is performed after step S415, step S416 is independent of steps S415 and S417. Therefore, the execution order may be appropriately changed. After executing steps S415 through S417, control is returned to step S413.

Next, the value set in the current environment information 295 in the first example in FIG. 9 in the above-mentioned measuring process is concretely described below.

FIG. 13 illustrates the information about the environment at the point in time (in the following description with reference to FIG. 13, for convenience of explanation below, the point in time is referred to as a "current") in which the measuring process is performed in the first example on Aug. 26, 2010. FIG. 13 illustrates not only the value obtained by the measuring process, but also the value obtained in the judging process in FIGS. 14 and 15. The value obtained in the judging process is described later.

The current environment information 295 includes one or more entries associated with the respective MAC addresses. In the description below, the current environment information 295 obtained in the measuring process and the judging process on Aug. 26, 2010 in the first example in FIG. 9 is specifically expressed by the reference symbol of **295*a***.

In the first example in FIG. 9, the devices of the addresses A through E are located in the environment registered in the environment registering process on Aug. 25, 2010 as illustrated in FIG. 10. According to the first example in FIG. 9, five addresses A through E are detected in step S403 of the measuring process on Aug. 26, 2010.

Therefore, the current environment information **295*a* includes five entries corresponding to the addresses A through E. The fields in which a value is set in the measuring process are the MAC address, the number of occurrences, the previously measured round, the number of elapsed rounds, the absence rate, and the time elapse rate as described above with reference to FIGS. 11 and 12**.

For convenience of explanation below, the symbols A through E are used in FIG. 13 as in FIGS. 9 and 10, but the concrete MAC addresses of the addresses A through E are illustrated in FIG. 13 (that is, the same as in FIG. 10).

Furthermore, in the first example in FIG. 9, the measuring process on Aug. 26, 2010 is the first measuring process after the environment registering process. Therefore, in the current environment information **295*a* in FIG. 13, the value of the number of occurrences of the address A is 17 which is one larger than 16 as the value of the number of occurrences of the address A in FIG. 10**. The same holds true with the other addresses B through E.

In the first example in FIG. 9, the value of the measurement frequency 264 in the measuring process on Aug. 26, 2010 is 17, and the five addresses A through E are detected in the measuring process on Aug. 26, 2010. Therefore, in the current environment information **295*a* in FIG. 13**, the values of the previously measured rounds of the five addresses A through E are 17 equally.

Since the value of the measurement frequency 264 is 17, and the values of the number of occurrences and the previously measured round are illustrated in FIG. 13, the absence rate, the number of elapsed rounds, and the time elapse rate of each address are set as illustrated in FIG. 13 in steps S415 through S417 in FIG. 12. For example, since the number of occurrences is 15 for the address C, the absence rate is about 11.8% (=(17−15)/17×100). Furthermore, since the previously measured round of each address is 17 in the example in FIG. 13, the number of elapsed rounds is 0 (=17−17), and the time elapse rate is 0.0% (=0/17×100).

When the measuring process explained with reference to FIGS. 11 through 13 is performed in step S213 in FIG. 7, the judging process is performed afterwards in step S214. The judging process is described below with reference to FIGS. 14 through 28, and FIGS. 9, 10, and 13 which are described above.

FIGS. 14 and 15 are flowcharts of the judging process according to the second embodiment. The judging process is started by the request from the address management unit 260 to the feature point distribution generation unit 280. When the request is issued, the address extraction unit 262 in the address management unit 260 extracts the MAC address of each entry from the registered environment DB 270, and outputs the address to the address decomposition unit 281 in the feature point distribution generation unit 280.

Then, in step S501, the address decomposition unit 281 of the feature point distribution generation unit 280 calculates the XY coordinates from each address in the registered environment DB 270, thereby mapping the address to the point on the XY plane. That is, step S501 corresponds to step S102 in FIG. 2.

For convenience of explanation below, the MAC address of the j-th ($1 \le j$) entry in the registered environment DB 270 is expressed by the symbol $Addr_j$, and it is assumed that the address $Addr_j$ is mapped to the point $P_j=(X_j, Y_j)$ on the XY plane. The mapping in step S501 may be expressed by the equations (3) and (4) below.

$$X_j = \mathrm{get}X(\mathrm{Addr}_j) \quad (3)$$

$$Y_j = \mathrm{get}Y(\mathrm{Addr}_j) \quad (4)$$

The mapping getX in the equation (3) may be an arbitrary mapping from the MAC address to the X coordinate. Furthermore, the mapping getY in the equation (4) may be an arbitrary mapping from the MAC address to the Y coordinate. In the second embodiment, the following mapping is concretely used as the mapping getX and mapping getY to appropriately distribute a plurality of MAC addresses on the XY plane.

That is, the mapping getX is a function for calculation of a remainder by obtaining 24-bit string by concatenating odd octets of the MAC address, and dividing the integer expressed by the bit string by a constant. In the second embodiment, 100 is concretely used as a constant, but other constants may be obviously used depending on an embodiment. Furthermore, in the description below, the most significant octet of the MAC address is referred to as a 1st octet, and the least significant octet is referred to as a 6th octet.

Then, the mapping getY is a function for calculation of a remainder by obtaining 24-bit string by concatenating even octets of the MAC address, and dividing the integer expressed by the bit string by a constant. The constant used in the mapping getY may be the same value as the constant used in the mapping getX, or another value. In the second embodiment, 100 is concretely used as a constant, but other constants may be obviously used depending on an embodiment.

For example, in FIG. 10, the first address A of the registered environment DB 270*a* is concretely a MAC address of 00c0e6f62ecf. That is, the 1st octet is 00, the 2nd octet is c0, the 3rd octet is e6, the 4th octet is f6, the 5th octet is 2e, and the 6th octet is cf.

Therefore, when odd octets are concatenated, obtained is a bit string having a length of 24 bits and expressed by 00e62e in hexadecimal notation. Since the bit string is expressed by 58926 in decimal notation, the remainder obtained by dividing the number by 100 is 26. That is, the obtained X coordinate for the address A is 26.

In addition, when the even octets are concatenated, obtained is a bit string having a length of 24 bits and expressed by c0f6cf in hexadecimal notation. Since the bit string is expressed by 12646095 in decimal notation, the remainder obtained by dividing the number by 100 is 95. That is, the obtained Y coordinate for the address A is 95.

As described above, the address A is mapped to the point (26, 95) on the XY plane by the address decomposition unit 281. Similarly, the address B is mapped to the point (28, 36), the address C is mapped to the point (32, 78), the address D is mapped to the point (85, 66), and the address E is mapped to the point E (17, 16).

FIG. 10 illustrates the columns of an odd octet concatenation, an even octet concatenation, an X coordinate, and a Y coordinate to aid the understanding of the above-mentioned mapping in step S501 in FIG. 14.

In the example above of the mapping getX and getY, all bits of the MAC address are used in calculating the XY coordinates. However, depending on an embodiment, only a part of bits in the MAC address may be used in calculating the XY coordinates. Furthermore, depending on an embodiment, bit positions may be exchanged, or bit values may be inverted in calculating the XY coordinates.

Furthermore, in the above-mentioned mapping getX and mapping getY, it is expected that the points to which a plurality of MAC addresses are mapped respectively are appropriately distributed on the XY plane because as explained with reference to the first embodiment, the mapping getX and the mapping getY are functions including a residue.

Furthermore, in the MAC address, the most significant 3 octets are a vendor identifier, and the least significant 3 octets are an identifier in the vendor. The above-mentioned mapping getX and getY are defined so that the mapped points may be appropriately distributed on the XY plane with the feature of the MAC address taken into consideration.

If the X coordinate is calculated from the most significant 3 octets, and the Y coordinate is calculated from the least significant 3 octets, for example, in the environment in which five devices from the same vendor are used, the X coordinate of the five mapped points are equal. The mapping getX and getY are defined as described above in the second embodiment so that the mapped points may be appropriately distributed on the XY plane even though a plurality of devices of the same vendor are used.

That is, in calculating the X coordinate, not only a part of the most significant 3 octets (that is, the 1st octet and the 3rd octet), but also a part of the least significant 3 octets (that is, the 5th octet) are used. Similarly, in calculating the Y coordinate, not only a part of the most significant 3 octets (that is, the 2nd octet), but also a part of the least significant 3 octets (that is, the 4th octet and the 6th octet) are used. As a result, although a plurality of devices of the same vendor are used, it is expected that the mapped points are appropriately distributed on the XY plane.

In mapping from the MAC address to the XY coordinates, it is obvious that data is not to be processed in octet units as described above, Depending on an embodiment, for example, odd bits may be used in calculating the X coordinate, and even bits may be used in calculating the Y coordinate.

That is, the mapping getX may be any mapping for extracting a plurality of bits at specified positions from the bit string indicating the address, and obtaining a residue obtained by dividing an integer indicated by a partial bit string which is obtained by concatenating the extracted bits by a constant. The same holds true with the mapping getY.

In the example in FIG. 10, a plurality of bits at specified positions in the mapping getX are concretely the bits belonging to odd octets. However, as described above, the plurality of bits at specified positions may be, for example, odd bits depending on an embodiment.

In addition, although the length of the MAC address is 48 bits, only a part of them may be used in calculating the XY coordinates. For example, there may be an embodiment in which the X coordinate is calculated from 12 bits at specified positions, the Y coordinate is calculated from the 12 bits at other specified positions, and the remaining 24 bits are not used in calculating the XY coordinates.

When the address decomposition unit 281 maps the MAC address to the point on the XY plane in step S501 as described above, the address decomposition unit 281 stores the mapping result as the internal data of the feature point distribution generation unit 280 on, for example, the RAM 403. Then, control is passed to step S502.

In step S502, the centroid determination unit 284 calculates the XY coordinates of the centroid in the registered environment from the XY coordinates of each point obtained by mapping each address registered in the registered environment DB 270.

For convenience of explanation below, assume that the number of entries of the registered environment DB 270 is R ($1 \le R$). Furthermore, the XY coordinates of the centroid is expressed by $(X_\alpha, Y_\alpha)$. The centroid determination unit 284 calculates the XY coordinates $(X_\alpha, Y_\alpha)$ of the centroid by the following equations (5) and (6) using the value of the XY coordinates calculated by the address decomposition unit 281 in step S501. The XY coordinates $(X_\alpha, Y_\alpha)$ of the centroid are stored as the internal data of the feature point distribution generation unit 280 in, for example, the RAM 403.

$$X_\alpha = \frac{1}{R}\sum_{j=1}^{R} X_j \tag{5}$$

$$Y_\alpha = \frac{1}{R}\sum_{j=1}^{R} Y_j \tag{6}$$

For example, the coordinates of the centroid calculated in step S502 relating to the registered environment DB 270*a* in FIG. 10 are concretely calculated by the equations (7) and (8) below.

$$X_\alpha = (26+28+32+85+17)/5 = 37.6 \tag{7}$$

$$Y_\alpha = (95+36+78+66+16)/5 = 58.2 \tag{8}$$

The five points mapped as described above from the addresses A through E and the centroid are expressed on XY plane as illustrated by the graph 502*a* in FIG. 16. In the graph 502*a*, five x marks indicate the five points to which the addresses A through E are mapped. Near each x mark, the symbol indicating the corresponding address and the values of the XY coordinates are written. A black dot indicates the centroid. In FIG. 16, for convenience of explanation, the fractional parts of the coordinates of the centroid are rounded and illustrated.

In the next step S503, for each address in the registered environment DB 270, the centroid determination unit 284 calculates, from the XY coordinates obtained in step S501, the angle with respect to the centroid. That is, the centroid determination unit 284 calculates the angle $\theta_j$, with respect to the centroid $(X_\alpha, Y_\alpha)$, of the point $(X_j, Y_j)$ for each j which satisfies $1 \le j \le R$. In addition, each angle $\theta_j$ is also stored as the internal data of the feature point distribution generation unit 280 in, for example, the RAM 403.

Concretely, the centroid determination unit 284 obtains the value satisfying all of the formulas (9) through (11) as the angle $\theta_j$. Inverse trigonometric functions are multivalued functions, but the value which satisfies all of the formulas (9) through (11) is uniquely determined. Therefore, the centroid determination unit 284 is able to uniquely calculate the angle $\theta_j$.

$$\theta_j = \cos^{-1}\frac{X_\alpha - X_j}{\sqrt{(X_\alpha - X_j)^2 + (Y_\alpha - Y_j)^2}} \tag{9}$$

-continued $$\theta_j = \sin^{-1}\frac{Y_\alpha - Y_j}{\sqrt{(X_\alpha - X_j)^2 + (Y_\alpha - Y_j)^2}} \tag{10}$$

$$-180^\circ < \theta_i \le 180^\circ \tag{11}$$

FIG. 10 also illustrates the angle, with respect to the centroid, of each of the five addresses A through E registered in the registered environment DB 270*a*. For convenience of explanation below, the angle with respect to the centroid is displayed with two digits after the decimal point, but FIG. 10 does not intend to limit the number of valid digits. In other figures, values are appropriately rounded, but no figures intend to limit the number of valid digits.

However, in steps S501 through S503 above, each address is associated with the 3-tuple $\langle X_j, Y_j, \theta_j \rangle$ of the X coordinate, the Y coordinate, and the angle with respect to the centroid $(X_\alpha, Y_\alpha)$. Then, a point having coordinates and an angle may be processed as a feature point. That is, a feature point is obtained from each address in steps S501 through S503.

Then, the distributions of R feature points respectively corresponding to R addresses registered in the registered environment DB 270 indicates the registered environment on the whole. That is, in the above-mentioned steps S501 through S503, the feature point distribution generation unit 280 generates the feature point distribution indicating the registered environment. From another point of view, steps S502 and S503 are concrete examples of step S103 in FIG. 2.

Figure 17:
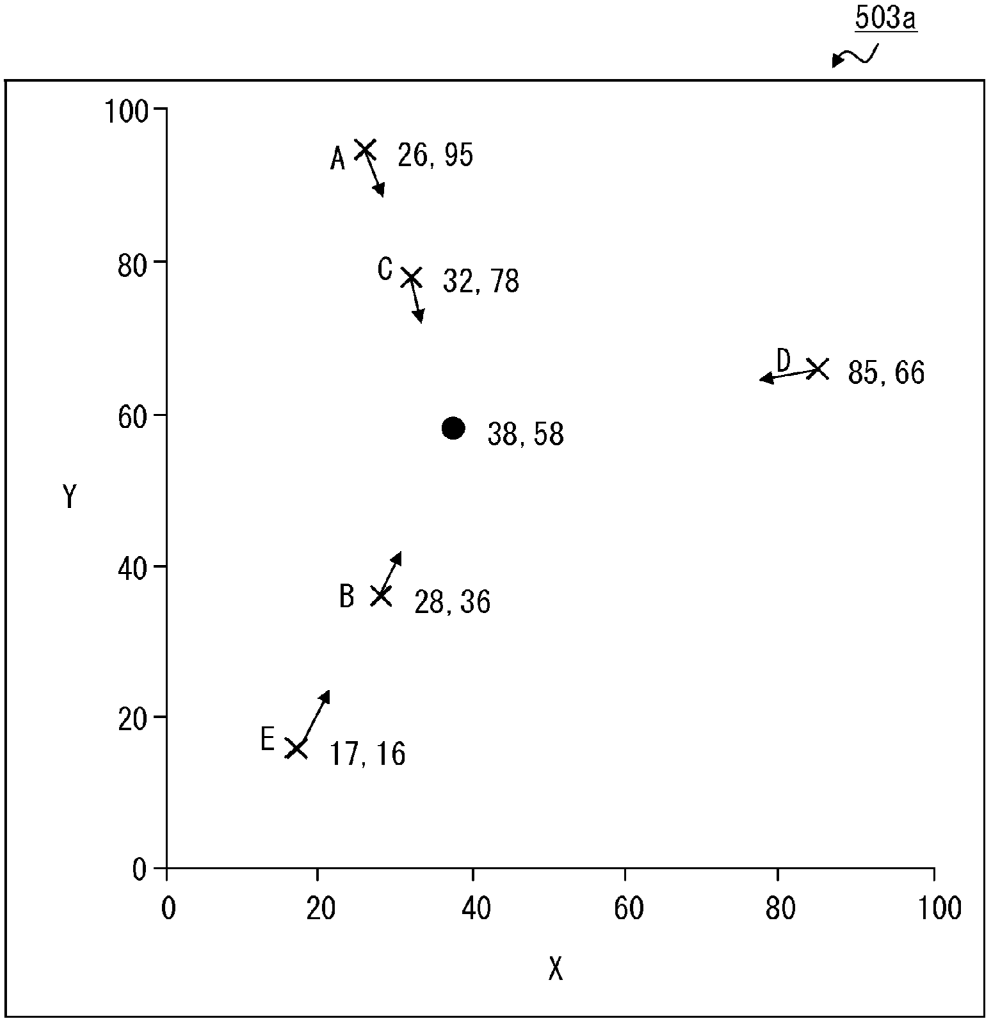
FIG. 17 illustrates the feature point distribution of the environment registered in the first example.

FIG. 17 graphically illustrates the feature point distribution generated as described above. As illustrated in FIG. 17, a feature point distribution 503*a* of a registered environment is expressed as a chart in which an arrow from each point to the centroid is added to the graph 502*a* in FIG. 16.

As illustrated in FIG. 10, for example, the angle, with respect to the centroid, of the point (26, 95) to which the address A is mapped is −72.50°. Therefore, in FIG. 17, an arrow in the direction of −72.50° is drawn using the mark x indicating the point (26, 95) as a starting point. The same holds true with other addresses B through E.

As data as described above, the feature point distribution 503*a* of the registered environment is expressed as a set of feature points represented by the 3-tuple $\langle X_j, Y_j, \theta_j \rangle$ of the X coordinate, the Y coordinate, and the angle with respect to the centroid. Therefore, the three columns of "X coordinate", "Y coordinate", and "angle with respect to centroid" in FIG. 10 are assigned a reference symbol of 503*a* as in FIG. 17.

Next in S504, the address decomposition unit 281 calculates the XY coordinates from the address for each entry of the current environment information 295, thereby mapping the address to the point on the XY plane. Step S504 is identical to step S501 except that the address to be mapped is not the address in the registered environment DB 270, but the address in the current environment information 295. In addition, step S504 corresponds to step S105 in FIG. 2.

For convenience of explanation below, assume that the number of entries of the current environment information 295 is M. From step S402 in FIG. 11, $R \le M$ holds true. For example, in the examples of FIGS. 10 and 13, R=M=5 holds true. In addition, since there is no afraid of confusion, the MAC address of the j-th ($1 \le j \le M$) entry in the current environment information 295 is also expressed by the symbol $Addr_j$.

The process in step S504 is explained as follows using the expression installed as described above. That is, the address decomposition unit 281 calculates in step S504 the XY coordinates by the same equations (3) and (4) as in step S501 for each j satisfying $1 \le j = M$.

In the current environment information 295*a* in FIG. 13, the values of the XY coordinates calculated in step S504 are described in the X coordinate column and the Y coordinate column labeled with "before movement". In FIG. 13, the basic information obtained before the movement of the point by offset is indicated by the reference symbol of "296*a*". That is, the information 296*a* includes the MAC address, the number of occurrences, and the previously measured round obtained in the measuring process, and also includes the X coordinate and the Y coordinate obtained in step S504 of the judging process.

Illustrated in FIG. 13 are "absence rate", "number of elapsed rounds", "time elapse rate", "distance", and "random angle" as the information 297*a* for use in calculating an offset. In the information 297*a*, the absence rate, the number of elapsed rounds, and the time elapse rate have been calculated in the measuring process in FIG. 12. Then, the distance is calculated in the following step S505, and the random angle is determined in step S506.

That is, in step S505 in FIG. 14, the distance determination unit 282 calculates the distance from the absence rate and the time elapse rate for each entry of the current environment information 295. Concretely, the distance determination unit 282 calculates as the distance the square root of the sum of the square of the absence rate and the square of the time elapse rate.

For convenience of explanation below, the following symbols (J1) through (J7) are installed for the j-th ($1 \le j \le M$) entry of the current environment information 295. The current value of the measurement frequency 264 is expressed by the symbol of "CurentRound".

(J1) number of occurrences . . . $\text{Occurrence}_j$
(J2) previously measured round . . . $\text{PrevRound}_j$
(J3) absence rate . . . $\text{AbsenceRate}_j$
(J4) number of elapsed rounds . . . $\text{ElapsedRounds}_j$
(J5) time elapse rate . . . $\text{ElapseRate}_j$
(J6) distance . . . $r_j$
(J7) random angle . . . $w_j$ In the expression above, the absence rate calculated in step S416 in FIG. 12 is represented by the following equation (12).

$$AbsenceRate_j = \frac{CurrentRound - Occurrence_j}{CurrentRound} \times 100 \tag{12}$$

In addition, the number of elapsed rounds calculated in step S415 in FIG. 12 is expressed by the equation (13) below.

$$\text{ElapsedRounds}_j = \text{CurrentRound} - \text{PrevRound}_j \tag{13}$$

Then, the time elapse rate calculated in step S417 in FIG. 12 is expressed by the equation (14) below.

$$ElapseRate_j = \frac{ElapsedRounds_j}{CurrentRound} \times 100 \tag{14}$$

Therefore, the distance calculated by the distance determination unit 282 in step S505 in FIG. 14 is expressed by the equation (15) below according to the definition described above with reference to step S505. The calculated distance is stored as a part of the current environment information 295 on, for example, the RAM 403.

$$r_j = \sqrt{\text{AbsenceRate}_j^2 + \text{ElapseRate}_j^2} \tag{15}$$

For example, FIG. 13 illustrates the distance 0.0, 5.9, 11.8, 23.5, and 17.6 which have been calculated for the addresses A through E in step S505. As clearly indicated by FIG. 13, the distance is the shorter as the number of occurrences is larger. That is, the higher the absence rate is, the longer the distance becomes.

In addition, in the example in FIG. 13, since the values of the previously measured rounds for all addresses A through E are incidentally equal, the difference in distance depending on the difference in previously measured round is not illustrated. However, as clearly indicated by the equations (13) through (15) above, the larger the value of the previously measured round is, the shorter the distance becomes. That is, the larger the number of elapsed rounds is, the longer the distance becomes; and the higher the time elapse rate is, the longer the distance becomes.

A high absence rate for an address refers to that a device having the address is not stably located in the registered environment, and is very unstable. Furthermore, a high time elapse rate for an address refers to that a device having the address has been previously located in a registered environment, but a long time has passed since the device's leaving the registered environment.

Therefore, the higher the unstableness of a device is, the longer the distance of the equation (15) becomes; and the longer the time has passed since a device exited the registered environment, the longer the distance becomes. Inversely, the more stably a device is located in a registered environment, the shorter the distance of the equation (15) becomes; and the later the device is checked as being located in the registered environment, the shorter the distance becomes.

The definition of the distance is variable depending on an embodiment. Any function which monotonously decreases with respect to a number of occurrences (that is, monotonously increases with respect to the absence rate) may be used as a distance. Furthermore, it is preferable that the distance monotonously increases with respect to the number of elapsed rounds (that is, monotonously increases with respect to the time elapse rate) as indicated by the equation (15) above.

Then, in step S506, for each entry of the current environment information 295, the address arrangement unit 283 determines a random angle which is equal to or exceeds 0° and smaller than 360°. The reason for that the angle determined in step S506 is random is described later.

For example, FIG. 13 illustrates the random angles 45°, 45°, 40°, 260°, and 110° determined for the addresses A through E respectively in step S506.

Then, in step S507, for each entry of the current environment information 295, the address arrangement unit 283 calculates the XY coordinates of the point obtained by moving the original point by adding an offset. The offset is a vector.

The size of the offset is ½ of the distance calculated in step S505. The direction of the offset is a random angle obtained in step S506. That is, the address arrangement unit 283 moves the original point, in the direction of the random angle, to a point on the circle whose center is the original point and whose radius is ½ of the calculated distance.

In the description below, the X coordinate and the Y coordinate of the point obtained by moving the point ($X_j$, $Y_j$) is expressed by "$X'_j$" and "$Y'_j$" respectively. The X coordinate $X'_j$ and the Y coordinate $Y'_j$ after the movement are indicated by the equations (16) and (17). The calculated X coordinate $X'_j$ and Y coordinate $Y'_j$ are stored as a part of the current environment information 295 on, for example, the RAM 403.

$$X'_j = X_j + \frac{r_j}{2}\cos w_j \tag{16}$$

$$Y'_j = Y_j + \frac{r_j}{2}\sin w_j \tag{17}$$

For example, FIG. 13 illustrates the X coordinate $X'_j$ and the Y coordinate $Y'_j$ of the moved point obtained in step S507 for each of the addresses A through E (for convenience of explanation with reference to the attached drawings, the fractional parts are rounded). For example, for the address A having the distance of 0.0, the point (26, 95) before the movement and the point (26, 95) after the movement are located at the same position. However, for the address D having a relatively long distance of 23.5 indicates distant positions of the point (85, 66) before the movement and the point (83, 54) after the movement.

Figure 18:
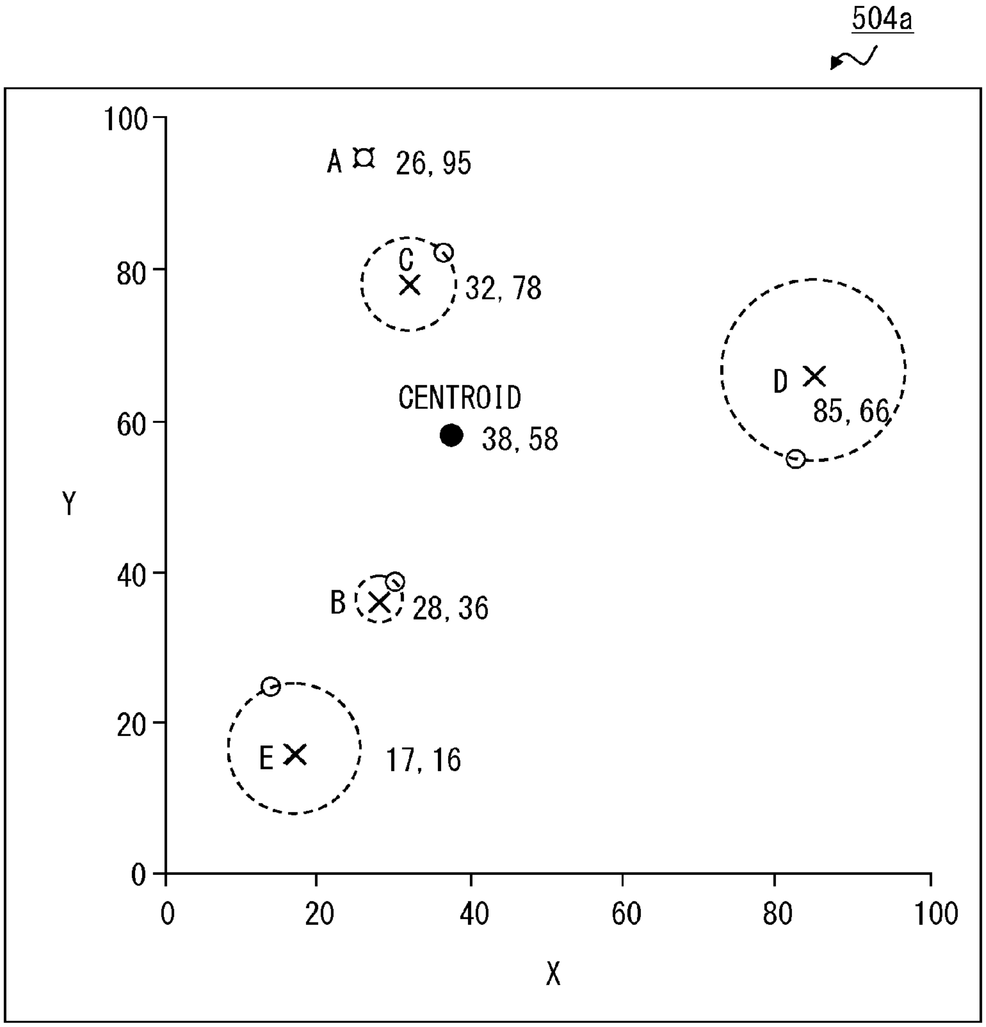
FIG. 18 is an explanatory view of the movements of points relating to the current environment on which the measuring process is performed in the first example.

The movements of the points in step S507 are graphically expressed in FIG. 18. A graph 504*a* in FIG. 18 includes the following (K1) through (K4).

(K1) A×mark indicating the point to which each address is mapped, the XY coordinates of each point, and a reference symbol indicating each address (similar to the graph 502*a* in FIG. 16)

(K2) A black dot indicating the centroid calculated in step S502 (similar to the graph 502*a* in FIG. 16)

(K3) A circle indicated by broken line for each address. Each circle has ½ distance of the value calculated in step S505 as a radius, and has a x mark of (K1) as a center.

(K4) A white dot indicating the point after the movement for each address. The white dot is on the circle of (K3). Furthermore, the angle of the white dot (K1) with respect to the X mark is a random angle determined in step S506.

As described above, when the point is moved in step S507, control is passed to step S508. Then, in step S508, the centroid determination unit 284 calculates the XY coordinates of the centroid of the current environment from the XY coordinates ($X'_j$, $Y'_j$) of each moved point stored as a part of the current environment information 295. The calculated coordinates of the centroid are stored as internal data of the feature point distribution generation unit 280 on, for example, the RAM 403.

In the expression above, the number of entries of the current environment information 295 is M. The XY coordinates of the centroid calculated in step S508 are hereafter expressed as ($X_\beta$, $Y_\beta$). Then, the calculation performed in step S508 by the centroid determination unit 284 is concretely expressed by the following equations (18) and (19).

$$X_\beta = \frac{1}{M}\sum_{j=1}^{M} X'_j \tag{18}$$

$$Y_\beta = \frac{1}{M}\sum_{j=1}^{M} Y'_j \tag{19}$$

For example, according to the current environment information 295*a* in FIG. 13, the X coordinate $X_\beta$ of the centroid calculated in step S508 is about 38, and the Y coordinate $Y_\beta$ is about 59. That is, the centroid ($X_\alpha$, $Y_\alpha$) calculated in step S502 relating to the registered environment and the centroid ($X_\beta$, $Y_\beta$) calculated in step S508 relating to the current environment do not always match each other by the influence of the movement of each point.

When the centroid ($X_\beta$, $Y_\beta$) is obtained as described above, control is passed to step S509 in FIG. 15. Then, in step S509, for each entry of the current environment information 295, the centroid determination unit 284 calculates the angle $\theta'_j$ of the moved point with respect to the centroid ($X_\beta$, $Y_\beta$), from the XY coordinates ($X'_j$, $Y'_j$) of the moved point, which has been moved in step S507. Furthermore, each angle $\theta'_j$ is stored as a part of the current environment information 295 on, for example, the RAM 403.

Concretely, the centroid determination unit 284 obtains the value which satisfies all of the formulas (20) through (22) as the angle $\theta'_j$. Although the inverse trigonometric function is a multivalued function, the value which satisfies all of the formulas (20) through (22) is uniquely determined. Therefore, the centroid determination unit 284 may uniquely calculate the angle $\theta'_j$.

$$\theta'_j = \cos^{-1}\frac{X_\beta - X'_j}{\sqrt{(X_\beta - X'_j)^2 + (Y_\beta - Y'_j)^2}} \tag{20}$$

$$\theta'_j = \sin^{-1}\frac{Y_\beta - Y'_j}{\sqrt{(X_\beta - X'_j)^2 + (Y_\beta - Y'_j)^2}} \tag{21}$$

$$-180° < \theta'_j \leq 180° \tag{22}$$

FIG. 13 illustrates the angle $\theta'_j$ with respect to the centroid ($X_\beta$, $Y_\beta$) for each of the five addresses A through E included in the current environment information 295*a*.

Then, in the above-mentioned steps S504 through S509, each address is associated with the 3-tuple <$X'_j$, $Y'_j$, $\theta'_j$> of the X coordinate $X'_j$, the Y coordinate $Y'_j$, and the angle with respect to the centroid ($X_\beta$, $Y_\beta$). Then, the point having coordinates and an angle may be processed as a feature point. That is, by steps S504 through S509, a feature point may be obtained from each address in the current environment information 295.

Then, the distribution of M feature points corresponding to M addresses included in the current environment information 295 indicates the current environment on the whole. That is, in the above-mentioned steps S504 through S509, the feature point distribution generation unit 280 generates a feature point distribution indicating the current environment. From another point of view, steps S504 through S509 are concrete examples of step S106 in FIG. 2.

As described with reference to step S402 in FIG. 11, the current environment information 295 is initialized using the contents of the registered environment DB 270. Therefore, an entry corresponding to the device which does not practically exist in the environment in which the user terminal 200 is currently located may be included in the current environment information 295. The reason for performing the initialization is that the comparing process in the next step S510 includes the alignment between feature point distributions. The details of the reason are described later.

In this example, it is assumed that the details of the reason for the initialization in step S402 are ignored for the time being. The description is to be continued by recognizing that the feature point distribution obtained in steps S504 through S509 indicates the current environment although an entry corresponding to the device which does not practically exist in the environment in which the user terminal 200 is currently located may be included in the current environment information 295.

Figure 19:
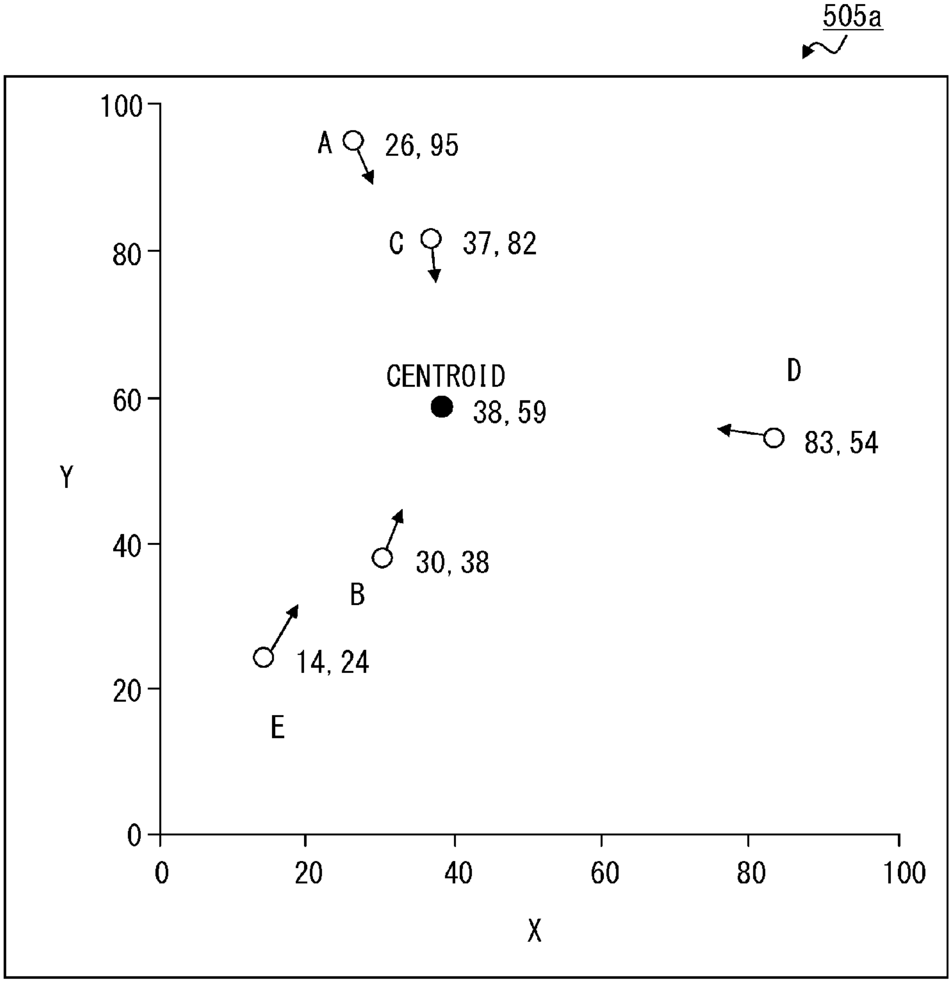
FIG. 19 illustrates the feature point distribution in the current environment on which the measuring process is performed in the first example.

As described above, the feature point distribution obtained in steps S504 through S509 is graphically expressed as illustrated in FIG. 19. As illustrated in FIG. 19, a feature point distribution 505*a* of the current environment is graphically indicated by the following (L1) through (L3).

(L1) A white dot which is the point after the movement in FIG. 18. The XY coordinates of the point after the movement and the reference symbol of the corresponding address are written near the white dot.

(L2) A black dot indicating the centroid ($X_\beta$, $Y_\beta$) obtained in step S508, and its XY coordinates. Since the black dot in FIG. 18 indicates the ($X_\alpha$, $Y_\alpha$) obtained in step S502, it is different from the black dot in FIG. 19.

(L3) An arrow toward the centroid ($X_\beta$, $Y_\beta$) of (L2) from each of the white dots of (L1) above.

For example, as illustrated in FIG. 13, the angle, with respect to the centroid ($X_\beta$, $Y_\beta$)=(38, 59), of the point (37, 82) after the movement corresponding to the address C is −86.53°. Therefore, in FIG. 19, the arrow in the direction of −86.53° is drawn using the white dot indicating the point (37, 82) as a starting point. The same holds true with the other addresses A, B, D, and E.

The feature point distribution 505*a* of the current environment is, as data, expressed as a set of feature points each represented by a 3-tuple <$X'_j$, $Y'_j$, $\theta'_j$>. Therefore, in FIG. 13, the three columns, that is, the "X coordinate", the "Y coordinate", and the "angle with respect to the centroid", labeled with "after movement" in FIG. 13 are assigned the reference symbol of "505*a*" as in FIG. 19.

When the feature point distribution 505*a* of the current environment is obtained as described above, the comparing process is performed in step S510. The details of the comparing process are described later with reference to FIGS. 20 through 22, but the outline of the process is described as follows. That is, in the comparing process, the environment judgment unit 290 compares the feature point distribution 503*a* of the registered environment with the feature point distribution 505*a* of the current environment. Then, the environment judgment unit 290 calculates the score of a "matching rate" indicating the rate of matching between two feature point distributions as a result of the comparison.

Then, in the next step S511, the environment judgment unit 290 judges whether or not the matching rate has exceeded a predetermined reference matching rate (for example, 0.7).

If the matching rate exceeds the reference matching rate, the environment judgment unit 290 outputs the judgment result that the current environment is the same as the registered environment to the address management unit 260. Then, control is passed to step S512.

On the other hand, if the matching rate is equal to or lower than the reference matching rate, the environment judgment unit 290 outputs the judgment result that the current environment is different from the registered environment to the address management unit 260. Then, control is passed to step S515.

In step S512, the statistic process unit 263 in the address management unit 260 copies the contents of the current environment information 295 to the registered environment DB 270.

Concretely, the statistic process unit 263 deletes all entries of the registered environment DB 270. Then, the statistic process unit 263 sequentially regards each entry of the current environment information 295, and performs the following processes (M1) and (M2) on the regarded entry.

(M1) Adding a new entry to the registered environment DB 270.

(M2) Copying the values of the MAC address, the number of occurrences, and the previously measured round of the regarded entry in the current environment information 295 respectively to the fields of the MAC address, the number of occurrences, and the previously measured round of the new entry of the registered environment DB 270.

The statistic process unit 263 discards the current environment information 295 when completely regarding all entries of the current environment information 295.

In the next step S513, the address management unit 260 outputs to the personal authentication unit 230 the judgment result received from the environment judgment unit 290 that the current environment is the same as the registered environment. Then in step S513, the threshold change unit 233 in the personal authentication unit 230 reads a low matching threshold for a registered environment from the threshold information 236 in FIG. 6, and sets the read value as a matching threshold used in biometric authentication. Then, control is passed to step S514.

Furthermore, in step S514, according to the matching threshold set by the threshold change unit 233, the authentication processing unit 231 performs the personal authentication. That is, the authentication processing unit 231 accepts the input of the biometric information from a user through the authentication information input unit 210. Then, the authentication processing unit 231 requests the biometric information comparison unit 235 to compare the accepted biometric information with the biometric information registered in advance in the authentication information DB 220, and calculate a matching score.

Furthermore, the authentication processing unit 231 compares the matching score calculated by the biometric information comparison unit 235 with the matching threshold. If the matching score exceeds the matching threshold, it refers to successful authentication, and the authentication processing unit 231 authenticates the user. On the other hand, if the matching score is equal to or smaller than the matching threshold, it refers to unsuccessful authentication, and the authentication processing unit 231 does not authenticate the user.

When a series of processes above in step S514 terminates, the judging process in FIGS. 14 and 15 also terminates. When the judging process corresponding to step S214 in FIG. 7 terminates, the processes in and after step S215 are performed.

Furthermore, when the matching rate in step S511 is equal to or lower than the reference matching rate, the statistic process unit 263 in the address management unit 260 discards the current environment information 295 in step S515.

Then, in the next step S516, the address management unit 260 outputs to the personal authentication unit 230 the judgment result received from the environment judgment unit 290 that the current environment is different from the registered environment. Then, in step S516, the threshold change unit 233 in the personal authentication unit 230 reads a high matching threshold for an unregistered new environment from the threshold information 236 in FIG. 6, and the read value is set as a matching threshold for use in biometric authentication. Then, control is passed to step S514. The details of step S514 are described above.

The comparing process performed in the next step S510 is described in detail with reference to FIGS. 20 through 22. FIG. 20 is a flowchart of the comparing process.

In step S601, the environment judgment unit 290 initializes to 0 the variable for count of the number of feature points matching in an allowable range between the feature point distributions of the registered environment and the current environment (for example, the feature point distributions 503*a* and 505*a* in FIGS. 17 and 19 respectively). For convenience of explanation below, the variable is also referred to as a "number of matches".

Furthermore, in the next step S602, the environment judgment unit 290 initialize to 0 the variable for count of the number of feature points not matching in the allowable range between the feature point distributions of the registered environment and the current environment (for example, the feature point distributions 503*a* and 505*a* in FIGS. 17 and 19 respective). For convenience of explanation below, the variable is also referred to as a "number of mismatches".

In the next step S603, the environment judgment unit 290 judges whether or not there is an entry which has not been regarded (i.e., focused on) as a target to be processed in steps S605 through S611 in the current environment information 295. If there is an entry which has not been regarded, control is passed to step S604. On the other hand, if all entries have already been regarded, control is passed to step S612.

In step S604, the environment judgment unit 290 regards (i.e., focuses on) an entry in the current environment information 295 which has not been regarded yet as a target of the processes in steps S605 through S611. For convenience of explanation below, the entry regarded by the environment judgment unit 290 in step S604 is referred to as a "target entry".

Then, in the next step S605, the matching judgment unit 292 searches the registered environment DB 270 to judge whether or not the MAC address of a target entry has been registered in the registered environment DB 270.

If the MAC address of the target entry has not been registered in the registered environment DB 270, the target entry corresponds to a device which has not been located in the registered environment. Therefore, the feature point to be compared with the feature point which corresponds to the MAC address of the target entry (that is, the feature point in the feature point distribution of the current environment on which the measuring process has been performed) is not located in the feature point distribution of the registered environment. That is, it is clear that the feature point which matches the feature point corresponding to the target entry is not located in the feature point distribution of the registered environment. Therefore, control is passed to step S606.

On the other hand, if the MAC address of the target entry is registered in the registered environment DB 270, the target entry corresponds to a device which has been located in the registered environment. Accordingly, the feature point to be compared with the feature point (that is, the feature point in the feature point distribution of the current environment on which the measuring process has been performed) which corresponds to the MAC address of the target entry is located in the feature point distribution of the registered environment. Accordingly, control is passed to step S607.

In step S606, the environment judgment unit 290 increments by 1 the number of mismatches. Then, control is returned to step S603.

In step S607, the alignment unit 291 calculates the distance between feature points from the XY coordinates (to be correct, the XY coordinates of the point after the movement) of the target entry of the current environment information 295 and the XY coordinates of the corresponding entry in the registered environment DB 270. The corresponding entry refers to an entry retrieved in the search in step S605. That is, the target entry of the current environment information 295 and the corresponding entry in the registered environment DB 270 have an identical MAC address.

Concretely, in step S607, the alignment unit 291 calculates each distance between feature points under the condition in which alignment between the feature point distribution of the registered environment and the feature point distribution of the current environment, on which the measuring process are performed, is made so that the two centroids overlap.

For convenience of explanation below, assume that the contents of the j-th (1≤j≤R) entry of the registered environment DB 270 are copied to the j-th entry of the current environment information 295 in step S402 in FIG. 11. Also assume that the target entry is the j-th entry.

Then, the feature point corresponding to the target entry of the current environment information 295 may be expressed by a 3-tuple of $<X_j, Y_j, \theta_j>$ using the symbols above. The feature point corresponding to the corresponding entry of the registered environment DB 270 may be expressed by the 3-tuple of $<X'_j, Y'_j, \theta'_j>$ using the symbols above.

Therefore, letting "$d_j$" be the distance between feature points under the condition in which alignment is made so that the two centroids overlap, the distance $d_j$ is expressed by the equation (23).

$$\begin{aligned} d_j &= \sqrt{\{(X'_j - X_\beta) - (X_j - X_\alpha)\}^2 + \{(Y'_j - Y_\beta) - (Y_j - Y_\alpha)\}^2} \\ &= \sqrt{\{(X'_j - X_j) - (X_\beta - X_\alpha)\}^2 + \{(Y'_j - Y_j) - (Y_\beta - Y_\alpha)\}^2} \\ &= \sqrt{[\{X'_j - (X_\beta - X_\alpha)\} - X_j]^2 + [\{Y'_j - (Y_\beta - Y_\alpha)\} - Y_j]^2} \end{aligned} \tag{23}$$

The relative position of the point $(X_j, Y_j)$, to which the address in the registered environment is mapped, with respect to the centroid $(X_\alpha, Y_\alpha)$ is $(X_j-X_\alpha, Y_j-Y_\alpha)$. Furthermore, the relative position of the point $(X'_j, Y'_j)$, which has been moved in the current environment, with respect to the centroid $(X_\beta, Y_\beta)$ is $(X'_j-X_\beta, Y'_j-Y_\beta)$.

Therefore, the distance d between feature points under the condition in which alignment is made so as to overlap the centroids $(X_\alpha, Y_\alpha)$ and $(X_\beta, Y_\beta)$ may be expressed as the distance between the above-mentioned relative positions. The line 1 of the right-hand side of the equation (23) indicates the distance between the relative positions.

The right-hand side of the equation (23) may be transformed into, for example, line 2. The line 2 indicates the following point of view.

If the alignment by overlap of centroids is not performed, the relative position of the point $(X'_j, Y'_j)$ moved in the current environment to the point $(X_j, Y_j)$ obtained by mapping the address of the registered environment is $(X'_j-X_j, Y'_j-Y_j)$. The distanced may be calculated by correcting the relative position by alignment. Since the X component and the Y component of the amount of correction by the alignment are respectively $(X_\beta-X_\alpha)$ and $(Y_\beta-Y_\alpha)$, the distance d between feature points may be expressed by, for example, line 2 of the right-hand side of the equation (23).

Furthermore, the right-hand side of the equation (23) may be transformed into, for example, line 3. Line 3 indicates the following point of view.

The X component and the Y component of the amount of correction by the alignment by overlapping centroids are respectively $(X_\beta-X_\alpha)$ and $(Y_\beta-Y_\alpha)$. Therefore, the XY coordinates of the point obtained by correcting the point $(X'_j, Y'_j)$ moved in the current environment by alignment are $(X'_j-(X_\beta-X_\alpha), Y'_j-(Y_\beta-Y_\alpha))$. The distanced $d_j$ between feature points may also be calculated as the distance between the aligned point and the point $(X_j, Y_j)$ obtained by mapping the address of the registered environment, and concretely expressed by, for example, line 3 of the equation (23).

As described above, when the distanced between the feature points is calculated, control is passed to step S608. Then, in step S608, the matching judgment unit 292 judges whether or not the calculated distance $d_j$ between the feature points is in an allowable range.

The allowable range is regulated by a predetermined threshold. For example, the threshold of 15 may regulate the allowable range to define the distance d equal to or smaller than 15 as "within the allowable range", and the distance $d_j$ exceeding 15 as "out of the allowable range". Obviously, the threshold which regulates the allowable range may be arbitrarily determined depending on an embodiment.

If the distance $d_j$ between feature points is within the allowable range, control is passed to step S609. On the other hand, if the distance $d_j$ between feature points is out of the allowable range, control is passed to step S606 described above.

Then, in step S609, the matching judgment unit 292 calculates the angular difference from the angle $\theta'_j$ of the target entry of the current environment information 295 with respect to the centroid ($X_\beta$, $Y_\beta$), and the angle $\theta_j$ with respect to the centroid ($X_\alpha$, $Y_\alpha$) calculated relating to the corresponding entry in the registered environment DB 270. The angular difference calculated in step S609 correctly refers to the magnitude of the angular difference.

In the description below, the angular difference is expressed by the symbol "$\Delta\theta_j$", and the angular difference $\Delta\theta_j$ is defined within the scope of the inequation (24).

$$0 \le \Delta\theta_j \le 180° \quad (24)$$

Then, the angular difference $\Delta\theta_j$ may be expressed by the equation (25).

$$\Delta\theta_j = \min(|\theta'_j - \theta_j|, 360 - |\theta'_j - \theta_j|) \quad (25)$$

By the equation (25), for example, when $\theta_j = -150°$ and $\theta'_j = 160°$ hold true, $|\theta'_j - \theta_j| = 310°$ also holds true, thereby deriving $\Delta\theta_j = 50°$.

In the next step S610, the matching judgment unit 292 judges whether or not the angular difference $\Delta\theta_j$ is within the allowable range. The allowable range is regulated by a predetermined threshold. For example, the threshold of 30 may regulate the allowable range to define the angular difference $\Delta\theta_j$ equal to or lower than 30° as "within the allowable range", and the angular difference $\Delta\theta_j$ exceeding 30° as "out of the allowable range". Obviously, the threshold which regulates the allowable range may be arbitrarily determined depending on an embodiment.

If the angular difference $\Delta\theta_j$ is within the allowable range, control is passed to step S611. On the other hand, if the angular difference $\Delta\theta_j$ is out of the allowable range, control is passed to step S606 described above.

In step S611, the environment judgment unit 290 increments the number of matches by 1. Then, control is returned to step S603.

As described below, when the environment judgment unit 290 completely regards all entries in the current environment information 295, control is passed to step S612. In step S612, the environment judgment unit 290 calculates the degree of matching rate by dividing the number of matches by a sum of the number of matches and the number of mismatches. Then, the environment judgment unit 290 notifies the address management unit 260 of the calculated matching rate, thereby terminating the comparing process.

FIG. 21 illustrates the above-mentioned comparing process as graphically expressed. That is, the graph 506*a* is expressed by aligning the feature point distribution 503*a* of the registered environment illustrated in FIG. 17 and the feature point distribution 505*a* of the current environment illustrated in FIG. 19 so that the two centroids may overlap each other.

For example, the distance $r_j$ calculated corresponding to the address A in step S505 is 0.0 as illustrated in FIG. 13. Therefore, the XY coordinates of the feature point corresponding to the address A in the feature point distribution 503*a* in FIG. 17 completely matches the XY coordinates of the feature point corresponding to the address A in feature point distribution 505*a* in FIG. 19.

However, the centroid ($X_\alpha$, $Y_\alpha$) in FIG. 17 is a little different from the XY coordinates of the centroid ($X_\beta$, $Y_\beta$) in FIG. 19. Therefore, as a result of the alignment, two feature points corresponding to the address A are slightly shifted in the 506*a* in FIG. 21.

In addition, relating to the addresses B through E, the distance $r_j$ calculated in step S505 may be a value other than 0, and the distance d between the two feature points corresponding to the same one address is not 0. However, as illustrated in FIG. 21, the distanced is not so long for the addresses A through E, and is within the allowable range.

As understood from the direction of the arrow illustrated in FIG. 21, the angular difference $\Delta\theta_j$ for the addresses A through E is not so large, and is within the allowable range. In the example in FIG. 21, 1(=5/5) is obtained as a matching rate.

A concrete value of the angular difference $\Delta\theta_j$ corresponding to the direction of the arrow in FIG. 21 is illustrated in example 22. FIG. 22 illustrates the column of the angle $\theta_j$ corresponding to the centroid ($X_\alpha$, $Y_\alpha$) in the registered environment which is cited from FIG. 10 and the column of the angle $\theta'_j$ corresponding to the centroid ($X_\beta$, $Y_\beta$) in the current environment which is cited from FIG. 13.

Then, FIG. 22 illustrates as the column of an angular difference 507*a* a concrete value of the angular difference $\Delta\theta_j$ calculated by the equation (25) from the angles $\theta_j$ and $\theta'_j$ indicated in the two columns above. The validity of placing a restriction such as the inequation (24) on the range of the angular difference $\Delta\theta_j$ is clear from the example of the address D.

As illustrated in FIG. 22, the angle, with respect to the centroid, of the point obtained by mapping the address D relating to the registered environment is about −170.66°. Relating to the current environment, the angle of the point obtained by moving the point as the mapped address D with respect to the centroid is 174.55°. Therefore, if the absolute value of the difference between two angles is simply obtained as an angular difference, a very large angular difference (about) 345.20° is obtained for the address D.

However, as illustrated in FIG. 21, the direction of −170.66° and the direction of 174.55° are very close to the direction of 9:00 of a clock. FIG. 21 clearly illustrates the small angular difference $\Delta\theta_j$ of the two directions.

Then, the restriction of the inequation (24) is placed on the angular difference $\Delta\theta_j$ which is compared with the allowable range. Furthermore, to satisfy the inequation (24), the matching judgment unit 292 calculates the angular difference $\Delta\theta_j$ according to the equation (25).

FIGS. 10, 13, 16 through 19, 21, and 22 illustrate the concrete data in the first example indicated by the table 501*a* in FIG. 9. Then, as described above, according to the first example, in the judging process performed after the measuring process on Aug. 26, 2010, a result that the registered environment and the current environment are identical is obtained.

On the other hand, in the description below, the second case in which a judgment result that the registered environment and the current environment are different is obtained is described. FIG. 23 is an explanatory view of the second example of an environment change. The format of FIG. 23 is the same as that illustrated in FIG. 9. The table 501*b* in FIG. 23 indicates the state of the following (N1) through (N3).

(N1) The user terminal 200 is powered on in the morning on Aug. 25, 2010, the process in FIG. 7 is performed, and the environment registering process in FIG. 8 is performed in step S211. After performing the environment registering process, the user terminal 200 is powered off.

(N2) The user terminal 200 is powered on again in the morning on Aug. 26, 2010, the process in FIG. 7 is performed, and the processes in and after step S213 are performed. Afterwards, the user terminal 200 is powered off again.

(N3) The user terminal 200 is powered on in the morning on Aug. 27, 2010, the process in FIG. 7 is performed, and the processes in and after step S213 are performed. Afterwards, the user terminal 200 is powered off again.

The state of (N1) indicated by the table 501*b* in FIG. 23 is similar to the state indicated by the table 501*a* in FIG. 9 in that 5 corresponding entries corresponding to the addresses A through E are generated in the registered environment DB 270 as a result of 16 address collections. However, the details are different between the states (N1) and (G1). Concretely, as clearly known by comparing FIG. 9 with FIG. 23, the occurrence patterns of the addresses C and D are different in states (N1) and (G1).

That is, in the environment registering process in the second example in FIG. 23, the addresses A and C are collected in all address collections from 1st collection to 16th collection, and the address B is collected in all address collections except the 16th address collection. The address D is collected in the 2nd, 3rd, 5th through 8th, 10th through 14th, and 16th address collections, and the address E is collected in the 1st through 13th address collection.

Therefore, the contents of the registered environment DB 270 when the environment registering process is completed in the second example in FIG. 23 are different from the contents of the registered environment DB 270*a* illustrated in FIG. 10. Although omitted in the attached drawings, 16, 15, 16, 12, and 13 are registered as the number of occurrences of the addresses A through E respectively in the registered environment DB 270 when the environment registering process is completed in the second example in FIG. 23. Furthermore, 16, 15, 16, 16, and 13 are registered as the previously measured rounds respectively of the addresses A through E.

Afterwards, as described above in (N2), in the second example in FIG. 23, the measuring process is performed in the morning on Aug. 26, 2010. The addresses collected in the measuring process are addresses A, C, and F through I. The value of the measurement frequency 264 at the measuring process is 17.

Then, as described in (N3) above, the measuring process is performed again in the morning on Aug. 27, 2010 in the second example in FIG. 23. The addresses collected in the measuring process are addresses A through C, and E. The value of the measurement frequency 264 at the measuring process is 18.

The environment change indicated in the table 501*b* in FIG. 23 may occur in the following case.

For example, a user normally uses the user terminal 200 at his or her desk in office. The user may consider that the user-friendliness is to be prioritized over the security in the office. Then, as illustrated in FIG. 23, the user inputs an instruction to start the environment registering process in step S209 in FIG. 7 on Aug. 25, 2010, and the user terminal 200 performs the environment registering process.

As a result, the environment of the user at his or her desk in office is registered as illustrated in FIG. 23 on Aug. 25, 2010. For example, a device of the addresses A through E may be a PC which may be used by colleagues, or a wireless LAN access point near the desk of the user, or a peripheral equipment unit such as a keyboard which may be used in communications through Bluetooth (registered trademark).

However, the user may work in a place different from his or her desk in the office on Aug. 26, 2010. For example, the device of the address A and the device of the address C may be mobile devices. Then, the user may take the user terminal 200, the device of the address A, and the device of the address C outside the office with colleagues to work outside the office on Aug. 26, 2010. There may be the devices of the addresses F through I in the environment outside the office.

On Aug. 27, 2010, the user and his or her colleagues may take the user terminal 200, the device of the address A, and the device of the address C to the office, and work at their own desks in the office. In this case, as in the example in FIG. 23, the device of the address D may be located outside the environment because, for example, the device is turned off. As a result, the addresses collected in the measuring process may be the addresses A through C, and E, that is, four in all.

For example, in the case exemplified above, an environment change as indicated on the table 501*b* in FIG. 23 may occur. In the description below, concrete examples of the measuring process and the judging process performed on Aug. 26, 2010 in the second example in FIG. 23 are explained.

FIG. 24 illustrates the details of the current environment information 295 obtained in the measuring process and the judging process on Aug. 26, 2010 in the second example in FIG. 23 in the same format as in FIG. 13. In FIG. 24, the particular current environment information 295 obtained in the measuring process and the judging process on Aug. 26, 2010 in the second example in FIG. 23 is expressed by the reference symbol of 295*b* specifically.

According to the second example in FIG. 23, the addresses A through E have been registered in the registered environment DB 270 in the environment registering process. Therefore, when the measuring process in FIGS. 11 and 12 is performed on Aug. 26, 2010, five entries corresponding to the addresses A through E are generated in the current environment information 295*b* in step S402.

As indicated in the record of Aug. 26, 2010 in FIG. 23, the addresses collected in step S403 are A, C, and F through I. Therefore, the entries respectively corresponding to the addresses F through I are added to the current environment information 295*b* in step S409. As a result, the current environment information 295*b* includes nine entries corresponding to the addresses A through I as illustrated in FIG. 24.

"A" through "I" are reference symbols for convenience of explanation. The actual MAC addresses of the addresses A through I are illustrated in FIG. 24.

When the measuring process is completed, only the fields of the MAC address, the number of occurrences, the previously measured round, the absence rate, the number of elapsed rounds, and the time elapse rate have values in the current environment information 295*b*.

Then, as illustrated in FIG. 23, the addresses A and C are collected 16 times in the environment registering process, and also collected in the measuring process. Therefore, the number of occurrences of the addresses A and C is 17, and the previously measured round of the addresses A and C is 17.

Furthermore, the addresses B, D, and E have been collected 15, 12, and 13 times respectively in the environment registering process, but are not collected in the measuring process. Therefore, the numbers of occurrences of the addresses B, D, and E are respectively 15, 12, and 13. The addresses B, D, and E are last collected in the 15th, 16th, and 13th address collection in the environment registering process. Therefore, the previously measured rounds of the addresses B, D, and E are respectively 15th, 16th, and 13th.

In addition, the addresses F through I have not been collected in the environment registering process. That is, the addresses F through I are first collected in the measuring process on Aug. 26, 2010, and in the measuring process, the value of the measurement frequency 264 is 17. Therefore, the number of occurrences of the addresses F through I is 1, and the previously measured round of the addresses F through I is 17.

Then, the absence rate of each address is calculated by the equation (12) in step S416 in FIG. 12. The number of elapsed rounds of each address is calculated by the equation (13) in step S415. Furthermore, the time elapse rate of each address is calculated by the equation (14) in step S417.

Then, after the explanation of the measuring process, with the progress of the judging process, the values of the remaining fields of the current environment information 295*b* are calculated. The value of each field is illustrated in FIG. 24.

Concretely, in FIG. 24, the X coordinate and the Y coordinate labeled with "before movement" are calculated by the equations (3) and (4) in step S504 in FIG. 14. Furthermore, the distance is calculated by the equation (15) in step S505. Furthermore, a random angle is determined in step S506.

Then, The X coordinate and the Y coordinate labeled with "after movement" are calculated by the equations (16) and (17) in step S507 in FIG. 14. Furthermore, the angle with respect to the centroid is calculated by the formulas (20) through (22) in step S509 in FIG. 15.

FIGS. 25 through 27 graphically illustrate the judging process which is performed as described above on Aug. 26, 2010 relating to the second example in FIG. 23. FIG. 28 illustrates the angular difference calculated in the comparing process included in the judging process.

The graph 504*b* in FIG. 25 indicates the movements of the points in the format similar to that of the graph 504*a* in FIG. 18. That is, in FIG. 25, the point before the movement is indicated by a X mark, and the white dot indicates the point after the movement. FIG. 25 also illustrates an arrow directing from the point before the movement to the point after the movement.

As illustrated in FIG. 24, the distance corresponding to the addresses A and C is 0.0, the point corresponding to the addresses A and C is not moved consequently. The distances corresponding to the addresses B, D, and E are 16.6, 30.0, and 33.3 respectively. Therefore, the points corresponding to the addresses B, D, and E depending on the distance and the random angle are moved to the positions indicated by the white dots on the circle indicated by broken line.

The distance corresponding to the addresses F through I not registered in the registered environment DB 270 is 94.1 in FIG. 24. Therefore, the point corresponding to the addresses F through I are moved to the position of a white dot on the circle indicated by solid line depending on the distance and the random angle, and greatly deviated from the original position.

FIG. 26 graphically illustrates the feature point distribution about the current environment obtained as a result of the movement of the point as described above. FIG. 26 illustrates the feature point distribution 505*b* of the current environment in the format similar to that in FIG. 19.

That is, the feature point distribution 505*b* of the current environment in FIG. 26 includes the feature points corresponding to the addresses A through I respectively, and each feature point is expressed by a white dot and an arrow indicating the angle to the centroid. The centroid is expressed as a black dot, and the coordinates of the centroid is $(X_\beta, Y_\beta)$= (49, 46) as illustrated in FIG. 26.

The first example in FIG. 9 and the second example in FIG. 23 are different in occurrence pattern of the address in the environment registering process. However, as understood from steps S501 through S503 in FIG. 14, the feature point distribution 503*a* of the registered environment only depends on the set of addresses collected in the environment registering process, and is independent of the number of occurrences and the previously measured round of each collected address.

Then, in each of the first example in FIG. 9 and the second example in FIG. 23, the set of addresses collected in the environment registering process is {A, B, C, D, E}. Therefore, the feature point distribution obtained in steps S501 through S503 in the judging process of the second example in FIG. 23 is the same as the feature point distribution 503*a* in FIG. 17 when it is graphically expressed.

Therefore, the alignment in the comparing process included in the judging process on Aug. 26, 2010 in the second example in FIG. 23 is graphically expressed as overlapping feature point distributions in FIGS. 17 and 26 with the centroids overlapping. Concretely, it is expressed by the graph 506*b* in FIG. 27. Furthermore, the graph 506*b* in FIG. 27 also illustrates a circle by broken line indicating the allowable range when the allowable range relating to the distance $d_j$ between aligned feature points is equal to or smaller than 15.

The graph in FIG. 27 is explained along the flowchart of the comparing process in FIG. 20 with reference to the current environment information 295*a* in FIG. 24.

When the entry of the address A is regarded in step S604, control is passed from step S605 to step S607 because the address A is registered in the registered environment DB 270. However, in FIG. 27, the mark X corresponding to the address A is located outside the circle by broken line which has a white dot corresponding to the address A as the center.

That is, relating to the address A, the distance $d_j$ between aligned feature points is outside the allowable range. Therefore, the control is passed from step S608 to step S606, and the number of mismatches is incremented for the address A.

In addition, when the entry of the address B is regarded in step S604, control is passed from step S605 to step S607 because the address B has been registered in the registered environment DB 270. In FIG. 27, the mark X corresponding to the address B is located in the circle by broken line having a white dot corresponding to the address B as the center.

That is, relating to the address B, the distance $d_j$ between aligned feature points is within the allowable range. Therefore, the control is passed from step S608 to step S609.

FIG. 28 illustrates the angular difference $\Delta\theta_j$ about each address. The format of FIG. 28 is similar to that of FIG. 22.

In the first example in FIG. 9 and the second example in FIG. 23, since the set of addresses registered in the registered environment DB 270 in the environment registering process is identical, and therefore the angle $\theta_j$ with respect to the centroid $(X_\alpha, Y_\alpha)$ in the registered environment is identical between the first and second examples. Therefore, in FIG. 28, the angle $\theta_j$ with respect to the centroid $(X_\alpha, Y_\alpha)$ in the registered environment is cited from FIG. 10. Also in FIG. 28, the angle $\theta'_j$ with respect to the centroid $(X_\beta, Y_\beta)$ in the current environment is cited from FIG. 24.

As illustrated in FIG. 23, the addresses collected in the environment registering process are the addresses A through E only. Therefore, relating to the addresses F through I, the angle θ with respect to the centroid $(X_\alpha, Y_\alpha)$ in the registered environment has not been registered.

The angular difference 507*b* at the rightmost column in FIG. 28 is the angular difference $\Delta\theta_j$ defined by the equation (25). As described above, relating to the addresses F through I, the angle $\theta_j$ has not been defined. Therefore, the angular difference $\Delta\theta_j$ has not been defined obviously.

Then, as illustrated in FIG. 28, the angular difference about the address B is 31.54°. Furthermore, assume that the allowable range in step S610 in FIG. 20 is predetermined as "within 30°".

Then, relating to the address B, control is passed from step S610 to step S606. Therefore, the number of mismatches is incremented also for the address B.

Furthermore, when the entry of the address C of the current environment information 295*b* is regarded in step S604, the number of mismatches is also incremented as in the case in which the address A is regarded.

On the other hand, when the entry of the address D is regarded in step S604, the number of matches is incremented because the process is performed as follows.

Since the address D is registered in the registered environment DB 270, control is passed from step S605 to step S607. In FIG. 27, the mark x corresponding to the address D is located in the circle by broken line having a white dot corresponding to the address D as the center.

That is, relating to the address D, the distance $d_j$ between aligned feature points is within the allowable range. Therefore, control is passed from step S608 to step S609.

Then, with reference to FIG. 28 indicating the angular difference $\Delta\theta_j$, the angular difference $\Delta\theta_j$ relating to the address D is 3.58°, which is within 30°, and is within the allowable range. Therefore, control is passed from step S610 to step S611, and the number of matches is incremented.

When the entry of the address E is regarded in step S604, the number of mismatches is incremented as in the case in which the address A is regarded.

Furthermore, when the entry of the address F is regarded in step S604, control is passed from step S605 to step S606 because the address F has not been registered in the registered environment DB 270. Then, the number of mismatches is incremented for the address F. When the entries of the addresses G through I are regarded in step S604, the number of mismatches is similarly incremented.

As described above, the number of matches is incremented only for one entry (that is, the entry of the address D) in the nine entries of the current environment information 295*b* in FIG. 24 in the comparing process. For the remaining eight entries, the number of mismatches is incremented. Therefore, the matching rate calculated in step S612 is 1/9 (that is, about 11%).

Assume that the reference matching rate in step S511 in the judging process in FIG. 15 is 0.7 (that is, about 70%) as described above. Then, since $1/9 \leq 0.7$ holds true, the environment judgment unit 290 outputs the judgment result that the current environment is not the registered environment in the judging process on Aug. 26, 2010 in the examples in FIGS. 23 through 28.

Therefore, the authentication processing unit 231 performs the strict biometric authentication using a matching threshold for an unregistered new environment. That is, the improvement of the security by reducing the false accept rate (FAR) is prioritized over the improvement of user-friendliness by reducing the false reject rate (FRR).

As described above, according to the second embodiment, a judgment may be made as to whether or not the environment in which the user terminal 200 is currently located matches a particular environment in an allowable range (that is a registered environment). Then, the user terminal 200 prioritizes the user-friendliness in a particular environment by switching a matching threshold in the biometric authentication depending on the judgment result, and prioritizes the security in another environment. Therefore, according to the second embodiment, an authenticating operation is realized with the user-friendliness and the security well balanced.

Furthermore, according to the second embodiment, a user spends only a little time and effort. Then, the security level does not depend on a user.

For example, when the second embodiment is compared with the first and second comparison examples, it is not necessary for a user to input the address or weight of another device existing in the environment to be registered. In the second embodiment, the operation performed by the user on the registration of an environment is only issuing a start instruction.

Therefore, in the second embodiment, a user spends only a little time and effort. Furthermore, in the second embodiment, unlike the second comparison example, an environment is not judged based on the weight which depends on the skill or knowledge of the user. That is, the user terminal 200 according to the second embodiment performs the judging process without information input by the user. Therefore, a judgment result in the second embodiment does not depend on the skill or knowledge of the user.

In addition, as described above with reference to step S202 in FIG. 7, the user terminal 200 may be a device corresponding to only the authentication by biometric authentication. Otherwise, the user terminal 200 may support the authentication by an ID and a password and the biometric authentication, and be configured to prioritize the biometric authentication over the authentication using an ID and a password when the biometric information is registered in the authentication information DB 220. That is, according to the second embodiment, an authentication scheme which saves user's time and effort is adopted.

Generally, in the authentication using information memorized by a user such as an ID and a password (or an ID and an identification number), the user spends much time and effort to keep a security level. For example, since a user is requested to set a random password which is hardly guessed, or periodically change the password, the user spends much time and effort to keep a security level.

In addition, a user with low security consciousness may use a password which is easily estimated for a long time. As a result, in the authenticating operation performed using the information memorized by the user, the security level depends on the user.

On the other hand, the biometric authentication does not impose much time and effort on the user to hold a security level, or the security level does not depend on the user. Since the biometric authentication having a preferable feature is adopted in the second embodiment, a user spends only a little time and effort, and the security does not depends on the user.

Furthermore, as compared with the third through fifth comparison examples, the second embodiment has the merit that any particular device other than the user terminal 200 (for example, an external server such as a reliability guarantee server in the third comparison example) is not requested to judge an environment. That is, according to the second embodiment, a particular assumption such as an external server, etc. is not requested, but the user terminal 200 may self-sufficiently judge an environment in any environment.

Furthermore, in performing biometric authentication by a mobile information terminal, there are generally following problems. However, according to the second embodiment, the following problems may be solved.

That is, a biometric authenticating system which may be implemented on a mobile information terminal is practically restricted by the size and cost of a device for biometric authentication. Furthermore, since the mobile information terminal is portable, it is not known in advance where it is used. For example, the mobile information terminal may be used outdoor under direct sunlight, in a dark place, in a hot place, or in a cold place.

Then, generally, an image is used in authentication using an iris etc. When an image is captured to obtain biometric information of a user to be authenticated under direct sunlight outdoors, or in a dark place, the image is not obtained with stable quality. Therefore, the false reject rate of biometric authentication may rise depending on the place where the mobile information terminal is used.

In addition, in authentication using a fingerprint, the false reject rate is also affected by sweat. Therefore, when a mobile information terminal is used in a hot place, the false reject rate may greatly rise.

That is, as compared with the condition under which biometric authentication is performed in a place where air-condition and quantity of light are well controlled such as the location of an ATM (automated teller machine) in a bank etc., the mobile information terminal has the problem that the false reject rate may rise depending on the location, thereby consequently deteriorating the user-friendliness. Then, as described above, in the situation in which a device for biometric authentication available as a practical mobile information terminal is limited, it is difficult to completely solve the problem by a high-technology device for biometric authentication.

The second embodiment proposes a solution to the above-mentioned general problem relating to the biometric authentication with a mobile information terminal.

That is, according to the second embodiment, it is not necessary to use an expensive and high-performance device as the authentication information input unit 210. Furthermore, according to the second embodiment, it is not necessary to complicate the authentication algorithm in an authentication processing unit 611.

Nevertheless, according to the second embodiment, since a relatively low matching threshold is selected in a particular registered environment, the false reject rate may be reduced (that is, the user-friendliness is improved). That is, according to the second embodiment, although the false reject rate may rise depending on the location, the rise of the false reject rate may be canceled out by selecting a relatively low matching threshold in a particular registered environment.

Furthermore, the second embodiment does not take a countermeasure which may cause a risk of reducing security by constantly using a low matching threshold to solve the problem of high false reject rate depending on the location with a mobile information terminal. Therefore, according to the second embodiment, the user-friendliness and the security level are well balanced.

The well balanced user-friendliness and security level in the second embodiment may be explained from the following point of view. That is, according to the second embodiment, the matching threshold is reduced to prioritize the user-friendliness in a particular registered environment in which security level is relatively high because of the reason outside the user terminal 200, such as ID card reader, a guardian, or the attention of colleagues, etc. On the other hand, a matching threshold is raised in other environments to prioritize the security. Therefore, in the second embodiment, the user-friendliness and the security level is well balanced.

Furthermore, used in the second embodiment are three thresholds for regulation of the allowable ranges, that is, the allowable range of the distance in step S608 in FIG. 20, the allowable range of the angle in step S610, and the reference matching rate in step S511 in FIG. 15. The three thresholds provides a distribution matching criterion for regulation of the allowable range as to whether or not feature point distributions match in an allowable range.

Therefore, if the three thresholds are appropriately defined, it may be judged according to the second embodiment whether or not feature point distributions match each other in an appropriately defined allowable range, that is, whether or not environments match each other in an appropriate defined allowable range. Thus, when a judgment is made with an allowable range, as compared with the judgment with the fixed judgment such as the above-mentioned first comparison example, it has the merit of obtaining a correct and flexible judgment result. That is, in the second embodiment, a misjudgment caused by a small temporary fluctuation which normally occurs frequently may be reduced.

Next, some supplementary explanation is given request the above-mentioned second embodiment.

First, in step S402 in FIG. 11, the reason for the initialization of the current environment information 295 with the contents of the registered environment DB 270 (that is, the reason for the initialization of the current environment information 295 which is not initialized as blank) is explained below.

For convenience of explanation below, an example of a feature point distribution including only three reference points is explained. In the first feature point distribution, assume that the XY coordinates of the three feature points are (20, 10), (15, 40), and (30, 25). Furthermore, in the second feature point distribution, assume that the XY coordinates of the three feature points are (50, 20), (45, 50), and (60, 35). That is, the second feature point distribution is obtained by parallel translation of the first feature point distribution by +30 in the X-axis direction and by +10 in the Y-axis direction.

Therefore, the first and second feature point distributions completely match if aligned on the centroids. That is, although the original XY coordinates are quite different, the first and second feature point distributions completely match by the alignment.

To avoid such an incidental matching and reflect a change by the difference in centroid if an environment changes, the current environment information 295 is initialized with the contents of the registered environment DB 270 in the second embodiment. If the current environment information 295 is initialized with the contents of the registered environment DB 270, the relative position of each feature point to the centroid is more clearly changed as compared with the case in which the current environment information 295 is initialized as blank when a new address not registered in the registered environment DB 270 is collected in the measuring process.

For the current environment to be treated in the measuring process, a point is moved in step S507 in FIG. 14, and the centroid is calculated in step S508 with respect to the point after the movement. Therefore, the difference between the position ($X_\alpha$, $Y_\alpha$) of the centroid in the registered environment and the position ($X_\beta$, $Y_\beta$) of the centroid in the current environment obviously includes the influence of the difference by the movement of the point.

However, the difference of two centroids in position is not only subject to the influence of the movement of the point, it also reflects the difference in set of addresses included in the registered environment DB 270 and the current environment information 295. Therefore, by initializing the current environment information 295 with the contents of the registered environment DB 270, the existence of a new address, which has not been registered in the registered environment DB 270 but has been collected in the measuring process, may be reflected by the relative position of each feature point to the centroid.

Thus, a change of an environment is reflected by a difference in position of a centroid. The change of an environment may be caused by, for example, that a part of the devices located in a registered environment have been incidentally powered off when the measuring process is performed, that a new device has been introduced to the environment, that the user terminal 200 has been moved to an environment quite different from the registered environment, etc. However, regardless of the causes, once the environment changes, a change of the environment is reliably reflected in the difference in position of the centroid by initializing the current environment information 295 with the contents of the registered environment DB 270.

The larger the change in environment is, the larger the difference in position of the centroid becomes, and a number of points are moved in step S507. As a result, the larger the change in environment is, the higher the probability becomes that the feature points corresponding to the same address mapped to the same coordinates do not match in the comparing process. Therefore, the larger the change in environment is, the higher probability that the judgment result of different environments between the registered environment and the current environment is obtained.

Thus, according to the second embodiment, the entire image of the feature point distribution is captured indirectly through the position of the centroid. That is, the matching level between feature point distributions may be comprehensively captured by alignment through overlap of centroids Next, the effect of step S512 in FIG. 15 is supplemented. In step S512, when the judgment result that the current environment is the same as the registered environment is obtained, an address not identical to any address included in the registered environment DB 270 (for convenience, referred to as an "address of new occurrence") is added to the registered environment DB 270. Furthermore, the registered environment DB 270 is a database which stores environment information about a registered environment.

Therefore, step S512 is a process of updating environment information so that when a small fluctuation occurs in a registered environment, a result of the small fluctuation may be newly introduced to the registered environment. By step S512, the registered environment DB 270 changes with a small fluctuation which may daily occur.

Next, the third embodiment is described with reference to FIGS. 29 through 34. The common points with the second embodiment are appropriately omitted in the descriptions.

FIG. 29 illustrates the details of the configuration of the user terminal according to the third embodiment. A user terminal 600 in FIG. 29 may also be realized by the computer 400.

The user terminal 600 in FIG. 29 includes the authentication information input unit 210 or is connected to the external authentication information input unit 210 as with the user terminal 200 in FIG. 5. The user terminal 600 includes the communication control unit 240, the address measurement unit 250, the feature point distribution generation unit 280, and the environment judgment unit 290 as with the user terminal 200. Furthermore, the user terminal 600 includes the current environment information 295 as internal data as with the user terminal 200.

On the other hand, the user terminal 600 includes a personal authentication unit 610 instead of the personal authentication unit 230, and also includes an address management unit 620 instead of the address management unit 260. Furthermore, the user terminal 600 includes a wireless communication unit 630 or is connected to an external wireless communication unit 630.

Furthermore, the function of the communication control unit 240 of the user terminal 600 may be similar to the function of the communication control unit 240 of the user terminal 200. In FIG. 29, the user terminal 600 is connected to a device 300*c*, a device 300*d*, and a management server 700 through a cable or wireless network. Therefore, the user terminal 600 may communicate with the device 300*c*, the device 300*d*, the management server 700 through the communication control unit 240.

The device 300*c* includes a communication control unit 310*c*, the device 300*d* includes a communication control unit 310*d*, and the management server 700 includes a communication control unit 710. Although described later in detail, the management server 700 includes a history DB 720 for accumulating history information transmitted from the user terminal 600.

The personal authentication unit 610 of the user terminal 600 includes an authentication processing unit 611, a scheme change unit 612, a device registration unit 613, a device identification unit 614, a history management unit 615, a history transmission unit 616, a radio device DB 617, a history DB 618, and an authentication information DB 619.

Then, the address management unit 620 includes the state judgment unit 261, the address extraction unit 262, the statistic process unit 263, and the registered environment DB 270 as with the user terminal 200. The address management unit 620 further includes a new address statistic process unit 621, an initialization unit 622, and new address information 623.

Described below are the differences from the user terminal 200.

The authentication processing unit 611 performs an authenticating process using an ID and a password input from the authentication information input unit 210, and the information stored in the authentication information DB 619. That is, the authentication information DB 619 stores the information for association of the ID and the password of a user.

Otherwise, the authentication processing unit 611 authenticates, based on the judgment result by the environment judgment unit 290, a user depending on whether or not the wireless communication unit 630 may communicate with a specified radio device 750.

For example, the radio device 750 may be a contactless IC (integrated circuit) card which is the same meaning as a smart card. In this case, the wireless communication unit 630 is an IC card reader incorporated into the user terminal 600 (or connected to the user terminal 600).

Otherwise, the radio device 750 may be a mobile telephone loaded with a wireless communication chip (for example, a FeliCa (registered trademark) chip) developed for a contactless IC card. In this case, the wireless communication unit 630 is a reader which performs wireless communication with a wireless communication chip loaded into the radio device 750.

The communication between the radio device 750 and the wireless communication unit 630 is not limited to a radio communication, but may be, for example, an infrared communication depending on an embodiment. Otherwise, depending on an embodiment, the combination of the radio device 750 and the wireless communication unit 630 may be replaced with a communication of a contact type IC card and its reader. Otherwise, a device which may be connected through a cable or a connector (for example, a USB (universal serial bus) memory etc.) may replace the radio device 750, and an interface (for example, a USB port) provided with a connecting terminal may replace the wireless communication unit 630.

Although described later in detail, the authentication processing unit 611 authenticates a user without requesting input of an ID and a password so far as the wireless communication unit 630 may communicate with a specified radio device 750 depending on the judgment result by the environment judgment unit 290. If the wireless communication unit 630 is unable to communicate with a specified radio device 750, the authentication processing unit 611 performs an authenticating process using an ID and a password.

The authentication performed depending on whether or not a user terminal may recognize a particular device (for example, the radio device 750) has been put into commercial use associated with the authentication using an IC card (or a hardware token including an IC chip). However, when a user simultaneously loses a user terminal and an IC card (or hardware token), there is a risk of an imposter instead of the user (i.e., there is a risk of spoofing).

However, according to the third embodiment as described later, when the user terminal 600 is used in an unregistered and unknown environment, a user is prompted for his or her ID and password although the radio device 750 is located near the user terminal 600. Therefore, according to the third embodiment, the imposter described above may be rejected.

The scheme change unit 612 appropriately switches a scheme for an authenticating process. That is, the scheme change unit 612 determines which authentication the authentication processing unit 611 is to perform, the authenticating process using an ID and a password, or the authenticating process depending on whether or not a communication may be performed with a specified radio device 750.

To realize the authenticating process depending on whether or not a communication may be performed with a specified radio device 750, concretely the device registration unit 613 registers the particular radio device 750 in the radio device DB 617 in advance. For example, since an ID is assigned to the radio device 750, the device registration unit 613 associates the user of the user terminal 600 with the ID of the radio device 750 and registers the association data in the radio device DB 617.

Then, the device identification unit 614 reads the ID of the radio device 750 from the radio device 750 through the wireless communication unit 630, thereby identifying the radio device 750. Then, the authentication processing unit 611 compares the ID read by the device identification unit 614 with the ID registered in advance in the radio device DB 617, thereby judging whether or not a communication may be performed with the registered and specified radio device 750.

Furthermore, the history management unit 615 accumulates a result of the judgment by the environment judgment unit 290 and the history information about the result of the authenticating process by the authentication processing unit 611 in the history DB 618. Then, the history transmission unit 616 transmits the history information accumulated in the history DB 618 to the management server 700 through the communication control unit 240 with appropriate timing. Then, the management server 700 accumulates the history information received from the user terminal 600 through the communication control unit 710 in the history DB 720.

Furthermore, the user terminal 600 performs the environment registering process and the measuring process as with the user terminal 200. However, the judging process performed by the user terminal 600 is partly different from the judging process performed by the user terminal 200.

Concretely, when the environment judgment unit 290 judges that the current environment is a registered environment, the address management unit 620 judges whether or not there is an address not registered in the registered environment DB 270 in the addresses collected in the measuring process. If such an address is found, and the found address is reproducible, then the address management unit 620 performs the environment registering process again. By the address management unit 620 performing the environment registering process again depending on the situation as described above, the tracking of the registered environment DB 270 to the change of the registered environment is improved.

For example, assume that the addresses A through E have been registered in the registered environment DB 270. When the addresses A through E and J are collected in the measuring process, it may be judged in the judging process that the current environment is a registered environment.

In this case, in the judging process according to the second embodiment, the contents of the current environment information 295 are copied to the registered environment DB 270 in step S512 in FIG. 15. That is, the address J is registered in the registered environment DB 270 as having the number of occurrences of 1.

On the other hand, the number of occurrences of the addresses A through E which have originally been registered in the registered environment DB 270 may be, for example, 17 or a further larger value such as 35 etc. In addition, the device of the address J may be hereafter constantly located in the registered environment. However, according to the second embodiment, the difference in number of occurrences between the addresses A through E and address J appears as a large difference in absence rate between the addresses A through E and the address J for the time being (that is, until the frequency of the measuring process to be performed hereafter reaches a certain value).

That is, for the time being, the distance $r_j$ is large for the address J, and the amount of movement is still large. If it is confirmed that the address J is reproducible to a certain extent, it is preferable that the state in which the device of the address J is stably located in the environment is reflected in the registered environment DB 270 without waiting for the frequency of the measuring process because the tracking of the registered environment DB 270 to the environment change is attained in a short time.

In the user terminal 600 according to the third embodiment, the address management unit 620 appropriately performs the environment registering process again depending on the situation with a view to improving the tracking to an environment change as exemplified above.

Concretely, an address which is not registered in the registered environment DB 270, and an address collected in the measuring process performed on the environment which has been judged in the judging process as the same as the registered environment is added to the new address information 623. That is, if a candidate for a device which has been newly added after the environment registering process, afterwards continues to be constantly located in the registered environment, and seems to have high probability is found, then the address of the found candidate device is temporarily stored as the new address information 623.

The new address statistic process unit 621 manages the addition of an address to the new address information 623 as described above. Then, the new address statistic process unit 621 judges the reproducibility of an address according to the new address information 623 in the judging process, and deletes the address which is confirmed as having no reproducibility from the new address information 623.

When an address of reproducibility is found, the initialization unit 622 initializes the registered environment DB 270, and newly calls the environment registering process. The initialization unit 622 initializes the registered environment DB 270 even when the user explicitly specifies to perform the environment registering process again, and newly calls the environment registering process.

Next, the operation of the user terminal 600 is described in detail with reference to the flowcharts in FIGS. 30, and 32 through 34 and the data example in FIG. 31. FIG. 30 is a flowchart of the process started by the user terminal according to the third embodiment when electric power is supplied.

When the user terminal 600 is powered on, first in step S701, the history transmission unit 616 judges whether or not a specified time has passed from the previous transmission of the history information. In the judgment in step S701, the history transmission setting 616*a* in FIG. 31 is used.

The history transmission setting 616*a* illustrated in FIG. 31 is the information stored as internal data of the history transmission unit 616 on the non-volatile storage device (for example, the storage device 407).

The history transmission setting 616*a* includes "history transmission interval" indicating the lower limit of the interval at which the history transmission unit 616 transmits the history information to the management server 700. In the example in FIG. 31, the history transmission interval is 7 days.

The history transmission setting 616*a* also includes an IP address of the management server 700. In the example in FIG. 31, the IP address of the management server 700 is 192.168.0.1.

Furthermore, the history transmission setting 616*a* includes "previous transmission date and time" indicating the date and time when the history transmission unit 616 transmitted the history information to the management server 700 in the previous round. In the example in FIG. 31, the previous transmission date and time is 17:30:10 on Sep. 30, 2010.

Back to the explanation with reference to FIG. 30, the history transmission unit 616 calculates in step S701 subtracts the previous transmission date and time of the history transmission setting 616*a* from the current time, thereby calculating the elapsed time from the previous transmission date and time. Then, the history transmission unit 616 judges whether or not the calculated elapsed time is equal to or exceeds the history transmission interval of the history transmission setting 616*a*.

If the calculated elapsed time is equal to or exceeds the history transmission interval, control is passed to step S702. On the other hand, if the calculated elapsed time is smaller than the history transmission interval, control is passed to step S703.

In step S702, the history transmission unit 616 transmits the history information (that is, the contents of all entries of the history DB 618) included in the history DB 618 to the management server 700 through the communication control unit 240. Since the history transmission setting 616*a* includes the IP address of the management server 700, the history transmission unit 616 may recognize the destination management server 700. After the transmission, the history transmission unit 616 clears the history DB 618, and sets the current time in the previous transmission date and time of the history transmission setting 616*a*.

Described below with reference to FIG. 31 is an example of the history DB 618. Each entry of the history DB 618 includes fields of a "user name", an "environment judgment result", a "personal authentication result", and a "judgment date and time".

The user name is an ID for identification of a user of the user terminal 600.

The environment judgment result indicates the judgment result by the environment judgment unit 290. In FIG. 31, for support of understanding in FIG. 31, the environment judgment result is expressed by the term of "registered environment" or "new environment". However, it is obvious that the environment judgment result may be expressed by a value or a symbol depending on an embodiment.

The personal authentication result indicates a result of whether or not the authentication by the authentication processing unit 611 has been successfully completed. For support of understanding, in FIG. 31, the word "OK" indicating that the personal authentication has been successfully performed, and the word "NG" indicating that the personal authentication has been unsuccessfully performed are used. However, it is obvious that the personal authentication result may be expressed by a value or a symbol.

The judgment date and time indicates the date and time when an entry is added to the history DB 618. If a short time taken to perform the process is ignored, the judgment date and time is approximately the date and time when the environment judgment unit 290 makes the judgment, and the authentication processing unit 611 performs the authenticating process.

When the environment judgment result is a "registered environment", and the personal authentication result is "OK", it is estimated that the authenticated user powered on the 600 in the specified environment, and the authentication is successful.

In addition, if the environment judgment result is a "registered environment", and the personal authentication result is "NG", it is estimated that the user terminal 600 is powered on in the specified environment, but the authentication is unsuccessful. The cause of the failure of the authentication may be "the third party illegally (or by mistake) tried to use the user terminal 600", "the user left the radio device 750 behind somewhere, and input a wrong password", etc.

Furthermore, if the environment judgment result is a "new environment" and the personal authentication result is "OK", it is estimated that the user terminal 600 is powered on in an environment which is different from the specified environment, but the authentication is successful. Since the authentication is successful, the person who is using the user terminal 600 is estimated as an authenticated user. However, the user terminal 600 is a terminal for office use to be operated in, for example, the office of the user, and it may be prohibited to take the terminal outside the office. In this case, the environment judgment result as a "new environment" may be a proof that the user has violated the rule.

Furthermore, if the environment judgment result is a "new environment", and the personal authentication result is "NG", it is estimated that the user terminal 600 is powered on in an environment different from the specified environment, and the authentication is unsuccessful. In this case, there is a possibility that "the authenticated user input a wrong password", or it is more probable that "an unauthorized person took out the user terminal 600, and tried to illegally use the terminal".

Therefore, the illegal use of the user terminal 600 may be monitored by transmitting the contents of the history DB 618 including the above-mentioned fields by the history transmission unit 616 in step S702 in FIG. 30, and storing the data received by the management server 700 in the history DB 720.

For example, the management server 700 searches the history DB 720 for an entry for which the environment judgment result is a "new environment", thereby checking whether or not the rule is violated. Furthermore, the management server 700 searches the history DB 720 for an entry for which the environment judgment result is a "new environment" and the personal authentication result is "NG", thereby checking whether or not an imposter has tried to use the terminal. If the violation of the rule or an illegal use of an unauthorized person is found, the management server 700 may perform an appropriate process of, for example, transmitting e-mail to a particular person such as an administrator about a result of the check above.

Back to the explanation with reference to FIG. 30, in step S703, the personal authentication unit 610 inquires the address management unit 620 about how the personal authentication is to be performed. Then, the address management unit 620 judges whether or not the environment has been registered in the registered environment DB 270.

If any environment has not been registered in the registered environment DB 270 (that is, the registered environment DB 270 has no entry), then the address management unit 620 notifies the personal authentication unit 610 that the environment has not been registered. Then, control is passed to step S704. If the environment has been registered in the registered environment DB 270 (that is, the registered environment DB 270 has one or more entries), then control is passed to step S712.

In step S704, in the personal authentication unit 610 which is notified by the address management unit 620 that the environment has not been registered, the scheme change unit 612 selects the authentication with an ID and a password as an authentication scheme. Furthermore, the authentication information input unit 210 (for example, the keyboard 412) accepts the input of the ID and the password, and outputs the accepted ID and password to the authentication processing unit 611.

Then, in the next step S705, the authentication processing unit 611 performs the authenticating process based on an ID and a password according to the ID and the password obtained from the authentication information input unit 210, and the information stored in the authentication information DB 619.

In step S706, the authentication processing unit 611 judges whether or not the authentication has been successfully performed. When a correct combination of an ID and a password is input in step S704, the authentication is successful, thereby passing control from step S706 to step S707.

On the other hand, when a combination of an ID and a password is not correct, the authentication is unsuccessful, thereby terminating the process in FIG. 30. Depending on the embodiment, when the authentication is unsuccessful, the authentication processing unit 611 may display an error message on the screen, and control may be returned to step S704.

If the environment is unregistered, and the authentication is successful, the address management unit 620 judges in step S707 whether or not the environment in which the user terminal 600 is currently located is to be registered. For example, the address management unit 620 may accept an instruction from a user, and may judge in step S707 at the instruction through the input unit (for example, the input device 405 in FIG. 4) not illustrated in FIG. 29.

If the address management unit 620 judges "the current environment is to be registered", then a series of processes in steps S708 and S709, and the process in step S710 are concurrently performed. On the other hand, if the address management unit 620 judges that the current environment is not to be registered, control is passed to step S711.

In step S708, the device registration unit 613 registers the radio device 750 in the radio device DB 617. For example, the device registration unit 613 may display the message for prompting the user to register a radio device on the screen, and wait until an ID is read from any radio device through the wireless communication unit 630.

When the user makes the radio device 750 to be registered approach the user terminal 600, the wireless communication unit 630 may communicate with the radio device 750. Therefore, the wireless communication unit 630 reads an ID from the radio device 750 and outputs the read ID to the device registration unit 613.

Then, the device registration unit 613 associates the ID of the radio device 750 with the user name of the user, and registers the ID in the radio device DB 617. FIG. 31 exemplifies the radio device DB 617 for association of the user name of "User-A" with the ID of "226451325649819554362161254662315 87" of the radio device 750.

As described above, when the radio device 750 is registered in the radio device DB 617, then in step S709, the address management unit 620, the address measurement unit 250, and the communication control unit 240 cooperate to perform the environment registering process in FIG. 8. As a result, the environment in which the user terminal 600 is located is registered in the registered environment DB 270.

In step S710, the user terminal 600 (concretely, the CPU 401, for example) appropriately performs another process. The process performed in step S710 may be any process for which the authenticated user is granted permission to execute.

When the processes in step S709 and S710 are both completed, the process in FIG. 30 is also completed. After the completion of the process in FIG. 30, the user terminal 600 may be powered off.

In addition, in step S711, as in step S710, the user terminal 600 appropriately performs another process. After the termination of another process, the process in FIG. 30 also terminates. After the termination of the process in FIG. 30, the user terminal 600 may be power off.

On the other hand, when any environment is registered in the registered environment DB 270, the measuring process in FIGS. 11 and 12 is performed in step S712.

Figure 32:
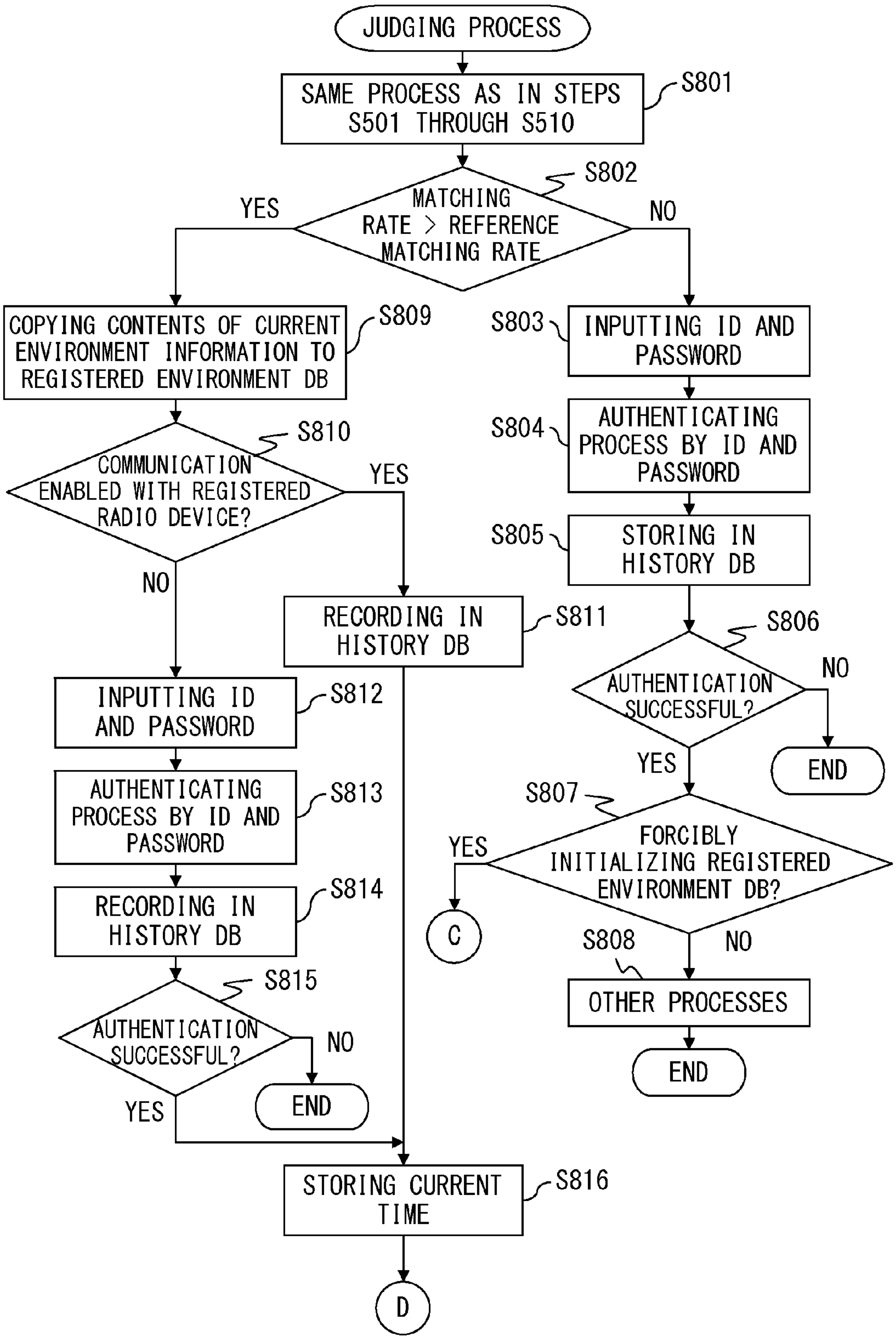
FIG. 32 is a flowchart (No. 1) of a judging process according to the third embodiment.

Then, in the next step S713, the address management unit 620 requests the feature point distribution generation unit 280 to start the judging process in FIGS. 32 through 34. Then, the judging process in FIGS. 32 through 34 is performed. After the termination of the judging process, the process in FIG. 30 also terminates. For convenience of explanation below, the name "judging process" is used. However, the judging process in FIGS. 32 through 34 is not only the process for judging an environment, but also includes the authenticating process and other processes.

Next, the judging process is explained in detail with reference to the flowchart in FIGS. 32 through 34 and the data example in FIG. 31.

As described in step S801 in FIG. 32, in the third embodiment, the process similar to the process in steps S501 through S510 of the judging process in FIGS. 14 and 15 is performed.

Then, in step S802, the environment judgment unit 290 judges whether or not the matching rate obtained in the comparing process in step S510 exceeds the predetermined reference matching rate (for example, 0.7).

If the matching rate is equal to or smaller than the reference matching rate, the environment judgment unit 290 notifies the address management unit 620 of the judgment result that the current environment is different from the registered environment. Then, the address management unit 620 notifies the personal authentication unit 610 of the judgment result notified from the environment judgment unit 290. Then, control is passed to step S803.

On the other hand, if the matching rate exceeds the reference matching rate, the environment judgment unit 290 notifies the address management unit 620 of the judgment result that the current environment is the same as the registered environment. Then, the address management unit 620 notifies the personal authentication unit 610 of the judgment result notified from the environment judgment unit 290. Then, control is passed to step S809.

In step S803, the authentication information input unit 210 (for example, the keyboard 412) accepts the input of an ID and a password, and outputs the accepted ID and password to the authentication processing unit 611.

Then, in the next step S804, the authentication processing unit 611 performs the authenticating process based on the ID and the password using the ID and the password obtained from the authentication information input unit 210 and the information stored in the authentication information DB 619.

Furthermore, in the next step S805, the authentication processing unit 611 notifies the history management unit 615 of the authentication results. The history management unit 615 in the personal authentication unit 610 may recognize the judgment result notified in step S802 from the environment judgment unit 290 to the personal authentication unit 610 through the address management unit 620.

Therefore, in step S805, the history management unit 615 adds a new entry including a user name, a judgment result by the environment judgment unit 290, an authentication result notified from the authentication processing unit 611, and a current time to the history DB 618. Then, control is passed to step S806.

In step S806, the authentication processing unit 611 judges whether or not the authentication in step S804 is successful. When a correct combination of an ID and a password is input in step S803, the authentication is successful, thereby passing control to step S807.

On the other hand, when the combination of an ID and a password is not correct, the authentication fails, thereby terminating the judging process. Depending on an embodiment, when the authentication fails, the authentication processing unit 611 may display an error message on the screen, and control may be returned to step S803.

Step S807 refers to the process performed when the user terminal 600 is located in an environment different from the registered environment, and the authentication is successful. In step S807, the address management unit 620 accepts the input from the user through the input unit (for example, input device 405 in FIG. 4) not illustrated in FIG. 29 about whether or not the registered environment DB 270 is to be forcibly initialized.

For example, for any reason, the user may consider that the environment in which the user terminal 600 is used is to be changed hereafter. In this case, the user takes the user terminal 600 to the new environment after the change, powers on the terminal, and inputs a correct ID and password, thereby executing step S807.

Obviously, the user may have powered on the user terminal 600 in the environment temporarily different from the normal environment (that is, an environment different from the registered environment). Then, in step S807, the address management unit 620 accepts an instruction from the user, and judges at the accepted instruction whether or not the registered environment DB 270 is to be initialized.

For example, when the user considers that the environment in which the user terminal 600 is used is to be changed hereafter as described above, the user may issue an instruction to forcibly initialize the registered environment DB 270. On the other hand, when the user terminal 600 is temporarily used in an environment different from the registered environment, the user may issue an instruction not to initialize the registered environment DB 270.

If the input accepted by the address management unit 620 from the user is an instruction to initialize the registered environment DB 270, control is passed to step S833 in FIG. 34. On the other hand, if the input accepted by the address management unit 620 from the user is an instruction not to initialize the registered environment DB 270, control is passed to step S808.

In step S808, the user terminal 600 (concretely, the CPU 401, for example) appropriately performs other processes. The process performed in step S808 may be an arbitrary process whose execution permission is granted to an authenticated user. When step S808 is terminated, the judging process also terminates.

Contrary to the above-mentioned steps S803 through S808, when the judgment result that the current environment is the same as the registered environment is notified in step S802, the processes in and after step S809 are performed.

First, in step S809, the statistic process unit 263 in the address management unit 620 copies the contents of the current environment information 295 to the registered environment DB 270 as with step S512 in FIG. 15. After the copying process, the statistic process unit 263 discards the current environment information 295.

In the next step S810, the scheme change unit 612 in the personal authentication unit 610 selects the authentication depending on whether or not communications with the registered and specified radio device 750 may be performed as an authentication scheme. As described above, the judgment result by the environment judgment unit 290 that the current environment is the same as the registered environment has already been notified in step S802 from the address management unit 620 to the personal authentication unit 610. Therefore, the scheme change unit 612 may select the authentication scheme in step S810 according to the judgment result by the environment judgment unit 290.

As a result, the authentication processing unit 611 performs the authenticating process depending on whether or not communications with the registered and specified radio device 750 may be performed. Concretely, the authentication processing unit 611 first requests the device identification unit 614 to read the ID.

If the radio device 750 is located near the user terminal 600, the device identification unit 614 reads the ID of the radio device 750 through the wireless communication unit 630, and outputs the read ID to the authentication processing unit 611. If an unregistered radio device not the radio device 750 is located near the user terminal 600, then the device identification unit 614 outputs the ID of the unregistered radio device to the authentication processing unit 611. Otherwise, there is a possibility that no radio device is located in the range in which the wireless communication unit 630 may perform communications (that is, near the user terminal 600).

For example, unless the device identification unit 614 outputs the ID within a specified time, the authentication processing unit 611 may judge that communications are not performed with the registered radio device 750.

In addition, if any ID is output from the device identification unit 614 within a specified time, the authentication processing unit 611 compares the ID registered in the radio device DB 617 with the ID output from the device identification unit 614. If the two IDs are identical, the authentication processing unit 611 judges that communications may be performed with the registered radio device 750. If the two IDs are different, the authentication processing unit 611 judges that communications are not performed with the registered radio device 750.

When the authentication processing unit 611 judges that communications may be performed with the registered radio device 750, the authenticating is successful. Then, control is passed to step S811.

On the other hand, when the authentication processing unit 611 judges that communications are performed with the registered radio device 750, the scheme change unit 612 switches the authentication scheme into the authentication using an ID and a password. Then, control is passed to step S812.

In step S811, the authentication processing unit 611 notifies the history management unit 615 of the authentication result indicating that the authentication is successful. The history management unit 615 in the personal authentication unit 610 may recognize the judgment result notified from the environment judgment unit 290 to the personal authentication unit 610 through the address management unit 620 in step S802.

Therefore, in step S811, the history management unit 615 adds a new entry including a user name, a judgment result by the environment judgment unit 290, an authentication result notified from the authentication processing unit 611, and a current time to the history DB 618. Then, control is passed to step S816.

When communications are not performed with the registered radio device 750, the authentication information input unit 210 (for example, the keyboard 412) accepts the input of an ID and a password, and outputs the accepted ID and password to the authentication processing unit 611 in step S812.

Then, in the next step S813, the authentication processing unit 611 performs the authenticating process based on an ID and a password according to the ID and the password obtained from the authentication information input unit 210, and the information stored in the authentication information DB 619.

Then, in the next step S814, the authentication processing unit 611 notifies the history management unit 615 of the authentication result. The history management unit 615 in the personal authentication unit 610 may recognize the judgment result notified from the environment judgment unit 290 to the personal authentication unit 610 through the address management unit 620 in step S802.

Therefore, in step S814, the history management unit 615 adds a new entry including a user name, a judgment result by the environment judgment unit 290, an authentication result notified from the authentication processing unit 611, and a current time to the history DB 618.

In the next step S815, the authentication processing unit 611 judges whether or not the authentication has been successful in step S813. If a correct combination of an ID and a password is input in step S812, the authentication is successful, thereby passing control to step S816.

On the other hand, if the combination of an ID and a password is not correct, the authenticating process fails, thereby terminating the judging process. Depending on an embodiment, when the authenticating process fails, the authentication processing unit 611 may display an error message on the screen and control may be returned to step S812.

In and after step S816, it is judged whether or not the environment registering process is to be performed again to correspond to a change with time of the registered environment. Depending on the situation, the environment registering process is called. In addition, to judge whether or not the environment registering process is to be performed again, whether there is a reproducible new address or not is checked. Then, the new address information 623 to be used in detecting the presence/absence of a reproducible new address is appropriately updated.

The "reproducible new address" refers to, in a broad sense, an address corresponding to the following (O1) and (O2). In the third embodiment, the "reproducible new address" is more concretely defined to allow the address management unit 620 to automatically judge whether there is a reproducible new address or not. That is, the "reproducible new address" in the third embodiment refers to the addresses corresponding to all of the following (O1) through (O4).

(O1) An address not registered in the registered environment DB 270.

(O2) An address which has been collected in an environment judged as the same as the registered environment.

(O3) An address for which the elapsed time from the date and time when the address is collected in (O2) above to the current time is equal to or exceeds a specified value.

(O4) An address which is necessarily collected when the environment is judged as the same as the registered environment in plural consecutive rounds of judging process after the latest environment registering process is performed.

(O1) refers to a new address which has not been collected in the registered environment. In addition, (O2) refers to the reproducibility at least in a broad sense. However, there are various reproducibility levels.

In the third embodiment, the reproducibility of the level which satisfies (O3) and (O4) is regarded as significant reproducibility, and is to be detected. Concretely, (O3) above is the condition for removal of the address which is incidentally located in the environment at a certain point in time. (O4) above is the condition for removal of the address which is not constantly or stably located in an environment.

Obviously, depending on an embodiment, a reproducibility level which is regarded as significant may be defined by the condition other than (O3) and (O4), and a process may be transformed appropriately depending on the definition.

The "specified value" in (O3) above is regulated by a reproducibility judgment time 624 illustrated in FIG. 31. In the example in FIG. 31, the reproducibility judgment time 624 is 24 hours. The reproducibility judgment time 624 is predetermined as a constant which may be referred to by the new address statistic process unit 621.

Back to the explanation with reference to FIG. 32, the process in step S816 is performed when the authentication is successful. In step S816, the authentication processing unit 611 notifies the address management unit 260 that the authentication is successful. Then, the new address statistic process unit 621 in the address management unit 260 which has already recognized that the current environment is the registered environment stores (i.e., records) the current time. The current time stored in step S816 is used in steps S822, S823, and S830.

Then, in step S817 illustrated in FIG. 33 after step S816, the new address statistic process unit 621 initializes to false a reproducibility flag which indicates whether or not a reproducible new address has been detected.

In addition, in the next step S818, the new address statistic process unit 621 judges whether or not all addresses detected by the address measurement unit 250 in the measuring process in the current round have already been regarded (i.e., focused on) as the target of the process in steps S819 through S824. The "measuring process in the current round" refers to the measuring process in step S712 immediately before the step S713 in FIG. 30 which corresponds to the judging process including step S818.

In the measuring process in this round, if there is an address not yet regarded (i.e., focused on) in the addresses detected by the address measurement unit 250, control is passed to step S819. On the other hand, if all addresses detected by the address measurement unit 250 in the measuring process in this round have been regarded, control is passed to step S826 in FIG. 34.

In step S819, the new address statistic process unit 621 regards (i.e., focuses on) the address which has not been regarded in the addresses detected by the address measurement unit 250 in the measuring process in this round. For convenience of explanation below, the address regarded in step S819 is referred to as a "target address".

Then, in the next step S820, the new address statistic process unit 621 judges whether or not the target address has been registered in the registered environment DB 270. If the target address has been registered in the registered environment DB 270, the target address does not satisfy the condition of (O1) above, thereby returning control to step S818. On the other hand, if the target address has not been registered in the registered environment DB 270, control is passed to step S821.

In step S821, the new address statistic process unit 621 judges whether or not the target address is included in the new address information 623. The new address information 623 is the information for storage of a candidate for a reproducible new address.

An example of the new address information 623 is illustrated in FIG. 31. As illustrated in FIG. 31, the new address information 623 may include one or more entries, and each entry includes an address and a detection data and time.

For example, a user may start his or her job by powering on the user terminal 600 in the morning on Aug. 30, 2010, disconnects the power supply from the user terminal 600 at lunch time, and power on the user terminal 600 again. Furthermore, the user may power on the user terminal 600 in the morning on Aug. 31, 2010 again in the afternoon. Then, the judging process is performed in the morning on Aug. 30, 2010, in the afternoon on Aug. 30, 2010, and in the morning on Aug. 31, 2010.

Furthermore, assume that, for example, the addresses A through E are registered in advance in the registered environment DB 270. Also assume that, in the measuring process in the morning on Aug. 30, 2010, the addresses A through E, and J are collected, and the addresses A through E and J are collected in the measuring process in the afternoon on Aug. 30, 2010. Furthermore, assume that the addresses A through E, J, and K are collected in the measuring process in the morning on Aug. 31, 2010, and it is judged in the judging process immediately after the collection that the address J has significant reproducibility.

FIG. 31 is an example of the new address information 623 under the situation above.

That is, the first entry in FIG. 31 is an entry for association of the address J with the detection date and time of 9:25:10 on Aug. 30, 2010. The second entry is an entry for association of the address J with the detection date and time of 13:3:27 on Aug. 30, 2010. The third entry is an entry for association of the address K with the detection date and time of 9:32:15 on Aug. 31, 2010.

In the situation assumed above, the address J is also collected in the measuring process performed in the morning on Aug. 31, 2010. However, there is no entry for association of the morning on Aug. 31, 2010 with the address J in the new address information 623 in FIG. 31. The reason is described later. Furthermore, although the history transmission setting 616*a* including the time, the history DB 618, and the new address information 623 are exemplified in FIG. 31, they do not represent the state at the same point in time.

In the situation above, at the point in time in the morning on Aug. 30, 2010, it is clear that the address J satisfies the condition (O1). However, it is not clear whether or not the address J satisfies the condition (O2) through (O4).

Then, at the point in time in the afternoon on Aug. 30, 2010, it is clear that the address J also satisfies the contents (O2), and it is clear that the address J also satisfies the condition (O4) up to now. However, the address J has not satisfied the condition (O3) at the point in time in the afternoon on Aug. 30, 2010, and it is not clear whether or not the address J will satisfy the condition (O3) in the future. Furthermore, it is also unclear whether or not the address J will continuously satisfy the condition (O4) hereafter.

Afterwards, at the point in time in the morning on Aug. 31, 2010, it is clear that the address J also satisfies the condition (O3), and it is clear that the address J has also satisfied the condition (O4) up to now. Then, it is judged that the address J has significant reproducibility. As illustrated in FIG. 31, it is also clear at the point in time in the morning on Aug. 31, 2010 that the address K satisfies the condition (O1).

Back to the explanation with reference to FIG. 33, the new address statistic process unit 621 judges whether or not the target address is included in the new address information 623 in step S821 as described above.

When the target address is not included in the new address information 623 (that is, the target address satisfies the condition (O1), but does not satisfy condition (O2)), control is passed to step S822. On the other hand, when the target address is included in the new address information 623 (that is, when the target address satisfies the conditions (O1) and (O2)) control is passed to step S823.

In step S822, the new address statistic process unit 621 adds, to the new address information 623, an entry which associates the target address with the time stored in step S816. Then, control is returned to step S818.

Furthermore, in step S823, the new address statistic process unit 621 calculates the time difference by subtracting the oldest time associated with the target address in the new address information 623 from the time stored in step S816.

For example, when the user terminal 600 is powered on in the afternoon on Aug. 30, 2010 and the judging process is performed in the example in FIG. 31, assume that the target address is the address J. In this case, the new address information 623 includes an entry for association of the address J with the detection date and time of 9:25:10 on Aug. 30, 2010. Thus, the above-mentioned oldest time referenced in step S823 is 9:25:10 on Aug. 30, 2010.

Furthermore, when the user terminal 600 is powered on in the morning on Aug. 31, 2010 and the judging process is performed in the example in FIG. 31, assume that the target address is the address J. In this case, the new address information 623 includes an entry for association of the address J with the detection date and time of 9:25:10 on Aug. 30, 2010, and an entry for association of the address J with the detection date and time of 13:3:27 on Aug. 30, 2010. Therefore, the above-mentioned oldest time referenced in step S823 is also 9:25:10 on Aug. 30, 2010.

Then, in the next step S824, the new address statistic process unit 621 compares the time difference calculated in step S823 with the reproducibility judgment time 624.

If the time difference is equal to or exceeds the reproducibility judgment time 624, the target address satisfies the condition (O3). Furthermore, the new address statistic process unit 621 manages the new address information 623 so that the address which does not satisfy the condition (O4) is not left in the new address information 623 in the processes in steps S827 through S831 described later. Then, step S824 is not performed unless the target address satisfies the conditions (O1) and (O2).

Therefore, if the time difference is equal to or exceeds the reproducibility judgment time 624, the target address satisfies the conditions (O1) through (O4). Then, control is passed to step S825.

For example, in the example in FIG. 31, in the judging process in the morning on Aug. 31, 2010, control is passed from step S824 to step S825 because the time difference obtained by subtracting 9:25:10 on Aug. 30, 2010 from 9:32:15 on Aug. 31, 2010 is 24 hours 7 minutes and 5 seconds. That is, the difference exceeds 24 hours defined as the reproducibility judgment time 624.

The new address information 623 exemplified in FIG. 31 is generated according to the following process flow when it is explained in more detail. In the judging process in the morning on Aug. 31, 2010, address K is selected as a target address prior to the address J, and an entry about the address K is added in step S822. As a result, the new address information 623 becomes the state illustrated in FIG. 31. Afterwards, when the address J is selected as a target address, control is passed from step S824 to step S825.

Back to the explanation with reference to FIG. 33, contrary to the description above, when the time difference calculated in step S823 is smaller than the reproducibility judgment time 624, control is passed from step S824 to step S822. For example, in the example in FIG. 31, in the judging process in the afternoon on Aug. 30, 2010, control is passed from step S824 to step S822.

In step S825, the new address statistic process unit 621 sets True in the reproducibility flag. Then, control is passed to step S826 in FIG. 34.

In step S826, the new address statistic process unit 621 judges whether the value of the reproducibility flag is True or False.

When the value of the reproducibility flag is False, it indicates that no significant and reproducible new address has been detected. In this case, the new address statistic process unit 621 judges that it is not necessary to perform again the environment registering process. Then, control is passed to step S827 not to leave the address which does not satisfy the condition (O4) in the new address information 623.

On the other hand, when the value of the reproducibility flag is True, it indicates that at least one significant and reproducible new address has been detected. Therefore, control is passed to step S833 to perform again the environment registering process.

In step S827, the new address statistic process unit 621 judges whether or not an address which has not been regarded (i.e., focused on) as a target to be processed in steps S828 through S831 is left in the new address information 623.

There is the case in which there are a plurality of entries corresponding to the same one address in the new address information 623. Also in this case, in step S827, the new address statistic process unit 621 does not judge whether there is an entry which has not been regarded, but judges whether there is an address which has not been regarded.

When there is an address which has not been regarded in the new address information 623, control is passed to step S828. On the other hand, if the new address statistic process unit 621 has already regarded all addresses stored in the new address information 623, control is passed to step S832.

In step S828, the new address statistic process unit 621 regards an address which has not been regarded in the new address information 623. For convenience of explanation below, the address which is regarded in step S828 is referred to as a target address.

In the next step S829, the new address statistic process unit 621 searches the new address information 623 for the latest detection date and time of the target address. As described above, the new address information 623 may include a plurality of entries corresponding to the target address. Then, in step S829, the new address statistic process unit 621 searches for the latest detection date and time from among one or more entries which correspond to the target address and which are included in the new address information 623.

Then, in step S830, the new address statistic process unit 621 judges whether or not the latest time obtained as a detection result in step S829 is equal to the time stored in step S816.

The case in which two time values are equal refers to the case in which a target address is collected in the measuring process in this round and the entry corresponding to the target address is added to the new address information 623 in step S822. That is, when two time values are equal, it refers to that the condition (O4) holds true with respect to the target address for the time being.

Therefore, the target address may be still a candidate for an address having significant reproducibility. That is, there is no reason for removing the target address from the new address information 623, thereby control is returned to step S827.

On the other hand, the case in which two time values are different it refers to that the target address has not been collected in the measuring process in this round. That is, if the target address has been collected in the measuring process in the previous round, an entry corresponding to the target address has been added to the new address information 623 in the judging process in the previous round, but the collection of the target address has stopped, then two time values are different. That is, two different time values indicate that the target address does not satisfy the condition (O4). Then, control is passed to step S831.

In step S831, the new address statistic process unit 621 deletes all entries corresponding to the target address in the new address information 623. Then, control is returned to step S827.

In step S832, the user terminal 600 (concretely, for example, the CPU 401) appropriately performs other processes. The process performed in step S832 may be any process whose execution permission is granted to an authenticated user.

When step S832 is completed, the judging process also terminates. After the termination of the judging process, the user terminal 600 may be powered off.

When a forcible environment registering process is specified in step S807 in FIG. 32, or the reproducibility flag is True, the processes in and after step S833 are performed. Concretely, in step S833, the initialization unit 622 clears the registered environment DB 270 and the new address information 623. Then, processes in steps S834 and S835 are concurrently performed.

In step S834, the address management unit 620, the address measurement unit 250, and the communication control unit 240 cooperate to perform the environment registering process in FIG. 8 described above. As a result, the environment in which the user terminal 600 is currently located is newly registered in the registered environment DB 270.

Furthermore, in step S835, the user terminal 600 (concretely, for example, the CPU 401) appropriately performs other processes. The process performed in step S835 may be any process whose execution permission is granted to an authenticated user.

When both the processes in steps S834 and S835 are completed, the judging process also terminates. After the termination of the judging process, the user terminal 600 may be powered off.

The third embodiment described above is different from the second embodiment in options of authentication scheme. However, the second and third embodiments are identical in that user-friendliness may be prioritized in a registered environment, and security may be prioritized in an unregistered environment.

That is, in the third embodiment, a user may be authenticated only by making the radio device 750 approach the user terminal 600, thereby acquiring user-friendliness in a registered environment. On the other hand, a user is not authenticated unless the user inputs a correct ID and a correct password in an unregistered environment. That is, in an unregistered environment, a more strict authenticating process is performed than in a registered environment.

Furthermore, in the third embodiment as in the second embodiment, it is not necessary for a user to spend time and effort to register an environment, and an environment judgment result does not depend on a user.

The third embodiment may be varied on, for example, the following point of view.

In FIG. 30, the radio device 750 is registered in step S708, and the environment registering process is performed in the next step S709. However, the radio device 750 may be registered after authenticating a user with any timing independent of the environment registering process. In this case, in step S810 in FIG. 32, if the radio device 750 is unregistered in the radio device DB 617, control is obviously passed to step S812.

The management server 700 in FIG. 29 is preferable in collectively managing a plurality of user terminals 600, but the management server 700 may be omitted depending on an embodiment. When the management server 700 is omitted, the history transmission unit 616 is also unnecessary.

When the management server 700 is not used, the personal authentication unit 610 may include the history management unit 615 and the history DB 618 for allowing the user terminal 600 itself to manage the history information. Otherwise, when the management server 700 is not used, the history management unit 615 and the history DB 618 may also be omitted.

The user terminal 200 in the second embodiment may further include the history management unit 615, the history transmission unit 616, and the history DB 618, and the management server 700 may be further used in the second embodiment.

The present invention is not limited to the above-mentioned embodiments. Although some variations are described in the explanation above, the embodiments above may further be varied from the following points of view, and these variations may be combined unless they are contradictory to one another.

Some processes in the embodiments above include a comparison with a threshold. Depending on an embodiment, the comparison with a threshold may be a process of judging whether or not a value to be compared exceeds a threshold, or whether or not a value to be compared is equal to or exceeds a threshold. Furthermore, although thresholds for various uses are exemplified in the explanation above, a concrete value of each threshold may be determined appropriately and arbitrarily depending on an embodiment.

Furthermore, the information processing device 100 in FIG. 1, the user terminal 200 in FIGS. 3 and 5, and the user terminal 600 in FIG. 29 may be, for example, realized by the computer 400 in FIG. 4. However, depending on an embodiment, a part of the information processing device 100, the user terminal 200, and the user terminal 600 may be realized by a hardware circuit such as an ASIC (application-specific integrated circuit) etc. instead of the computer 400.

Furthermore, the feature point distribution relating to registered environment may be generated in advance in the environment registering process, not generated in the judging process, and may be stored in the registered environment DB 270. That is, steps S501 through S503 in FIG. 14 may be performed after it is judged that the measurement frequency 264 has reached the reference frequency 265 in step S302 in FIG. 8. Otherwise, step S501 may be performed immediately after step S312.

Then, the registered environment DB 270 may further include the fields of “X coordinate”, “Y coordinate”, and “angle to centroid” respectively indicating the feature point distribution of registered environment.

Depending on an embodiment, the registered environment DB 270 may include the fields of “X coordinate” and “Y coordinate” instead of the field of “MAC address”. In this case, in step S605 in FIG. 20, it is judged whether or not an entry having the same X coordinate and Y coordinate as the target entry before movement is located in the registered environment DB 270. Furthermore, in step S512 in FIG. 15, the X coordinate and the Y coordinate before movement in the current environment information 295 are copied to the registered environment DB 270.

Furthermore, in addition to some examples of exemplification above, the execution order of processes may be appropriately changed unless there is inconsistency. For example, in the judging process in FIGS. 14 and 15, steps S504 through S509 may be performed before steps S501 through S503.

In addition, the values etc. exemplified in the present specification and drawings are example for convenience of explanation. It is obvious that a different value may be appropriately used depending on an embodiment.

Furthermore, in the embodiments above, only a particular environment is registered, but a plurality of environments may be registered. Then, the judgment unit 104 or the environment judgment unit 290 may judge which of the plurality of registered environments the current environment matches in an allowable range, or whether or not the current environment matches any of the plurality of registered environments in the allowable range. When a plurality of environments are registered, a judgment result may be used in switching a configuration file depending on, for example, an environment.

According to the second and third embodiments, an environment is expressed as a feature point distribution, and it is judged whether or not the environments matches in an allowable range by comparing the feature point distributions. However, for example, in FIG. 2, the first and second distributions may be distributions of simple points having coordinates, not distributions of feature points having coordinates and angles. Then, in step S107, distributions having coordinates may be compared by an appropriate pattern matching algorithm.

Furthermore, there may be various types of devices 300_a_ through 300_d_ exemplified in FIGS. 3, 5, and 29. Thus, since no particular assumption is imposed on the types of devices 300_a_ through 300_d_, the judging process in each embodiment above may operate effectively independent of the uses of the user terminal 200 or 600.

For example, when the user terminal 200 or 600 is a terminal of office use to be used in an office, a LAN is adopted in an environment to be registered in many cases. Furthermore, other devices of a certain number or more may belong to the same subnet as the user terminal 200 or 600 in many cases.

Therefore, although an address is collected only in the method using an ARP packet of (B2) above, it is rare that there may be a very small number of collectable addresses in an environment to be registered. That is, when the user terminal 200 or 600 is a terminal of office use, the case in which the number of feature points included in the feature point distribution indicating a registered environment is very small (for example, 1 or 2), and therefore the feature point distribution hardly expresses the entire image of the environment rarely occurs.

On the other hand, the user terminal 200 or 600 may be a terminal for use in the home of a user (for example, a home office etc.). However, it is rare that a large scale LAN is configured in the home of a user. Then, if the user terminal 200 or 600 collects an address only in the method above (B2), there may be a very small number of collectable addresses in an environment to be registered.

However, according to the embodiments above, the user terminal 200 or 600 may collect an address in various methods such as (B1) through (B4) above. Thus, by collecting an address in various methods, it is not necessary to substantially limit the type of target device for collecting an address, thereby increasing the number of collectable addresses. Accordingly, although a user wants to register the environment of the user home, the user may avoid the case in which there are a very small number of feature points included in the feature point distribution indicating a registered environment, thereby failing in appropriate expressing the entire image of the environment by the feature point distribution.

For example, in the method of (B3) above, aMAC address of the wireless LAN access point is collected using a beacon frame from the wireless LAN access point. Then, in recent years, a number of users have a wireless LAN access point at home to configure a small scale LAN.

Therefore, when a user of the user terminal 200 or 600 intends to register the environment of his or her home, the user terminal 200 or 600 may use, for example, the MAC address of the wireless LAN access point provided in an adjacent house to recognize the environment of the home of the user. As a result, it is expected that the user terminal 200 or 600 may collect a sufficient number of addresses to express the entire image of the environment.

That is, by the user terminal 200 or 600 collecting an address in various methods as exemplified in (B1) through (B4), different environments (for example, an in-house LAN environment, a home environment, etc.) may be recognized by correctly capturing each entire image. Then, although there are various environments to be registered depending on the use of the user terminal 200 or 600, the user terminal 200 or 600 may collect an address in various methods, thereby expectedly maintaining the accuracy of the judgment result at or above a specified level regardless of the use.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium having stored therein a program for causing a computer to execute a process comprising:

recognizing a first individual address of each of one or more other devices located in a first environment in which the computer is located at a first point in time;

mapping each first individual address to a first individual point in a coordinate space;

recognizing a first distribution using coordinates of each first individual point;

recognizing a second individual address of each of one or more other devices located in a second environment in which the computer is located at a second point in time;

mapping each second individual address to a second individual point in the coordinate space;

recognizing a second distribution using coordinates of each second individual point;

judging whether the first distribution and the second distribution match in accordance with a distribution matching criterion as to whether two distributions match;

outputting a first result that the first environment and the second environment are identical, when the first distribution and the second distribution are judged to match; and outputting a second result that the first environment and the second environment are different, when the first distribution and the second distribution are not judged to match, wherein the process further comprising:

receiving an input of first biometric information from a user;

reading second biometric information which is associated with the user and stored in advance in a first storage unit, from the first storage unit;

when the first result is output, judging using a first threshold whether a degree of matching between the first biometric information and the second biometric information satisfies a biometric information matching criterion.

2. The storage medium according to claim 1, the process further comprising:

recognizing a third individual address of each of one or more other devices located in an environment in which the computer is located at each of one or more third points in time different from the first point in time and different from the second point in time; and mapping each third individual address recognized at each third point in time to a third individual point in the coordinate space, wherein in the recognizing of the first distribution, coordinates of each third individual point are used, and the recognizing of the second distribution includes:

calculating an offset corresponding to each address, according to a fluctuation of a set of recognized addresses among a plurality of points in time including the first point in time, the second point in time and the one or more third points in time; and adding the corresponding offset to the coordinates of each second individual point.

3. The storage medium according to claim 2, wherein the calculating of the offset includes, for each address recognized at least one point in time of the plurality of points in time:

calculating one or more address fluctuation indexes indicating a fluctuation relating to the address in the fluctuation of the set of addresses; and calculating the offset corresponding to the address from the one or more address fluctuation indexes, and at least one of the one or more address fluctuation indexes of each address is a value depending on how many points in time in the plurality of points in time the address has been recognized.

4. The storage medium according to claim 3, wherein at least one of the one or more address fluctuation indexes of each address is a value depending on a latest point in time at which the address has been recognized.

5. The storage medium according to claim 3, wherein the offset is a vector, and the calculating of the offset includes:

calculating a size of the offset using a function monotonically increasing with a magnitude of each fluctuation indicated by each of the one or more address fluctuation indexes; and calculating a direction of the offset using a random number.

6. The storage medium according to claim 2, wherein the recognizing of the first distribution includes calculating a first angle of each first individual point with respect to a first reference point, the recognizing of the second distribution includes calculating a second angle of each second individual point moved by the offset, with respect to a second reference point, the judging whether the first distribution and the second distribution match includes judging whether a certain condition holds true for each matching address that is one of the second individual addresses and is identical with one of the first individual addresses, the certain condition is a condition that a difference between a first relative position and a second relative position is within a first range, and a difference between the first angle and the second angle is within a second range, the first relative position is a relative position of a certain point to which the matching address is mapped, with respect to the first reference point, the second relative position is a relative position of a point to which the certain point is moved by the offset, with respect to the second reference point, and the distribution matching criterion defines the first range, the second range, and a threshold which defines a lower limit of a rate of addresses for which the certain condition holds true, to judge that the first distribution and the second distribution match.

7. The storage medium according to claim 1, the process further comprising:

when the second result is output, judging whether the degree of matching satisfies the biometric information matching criterion using a second threshold which is different from the first threshold;

authenticating the user when judging that the degree of matching satisfies the biometric information matching criterion; and not authenticating the user or calling another authenticating process when judging that the degree of matching does not satisfy the biometric information matching criterion.

8. The storage medium according to claim 1, wherein mapping one address to one point corresponding to the one address includes obtaining a coordinate of each coordinate axis in the coordinate space of the one point by extracting bits at a plurality of predefined bit positions from a bit string indicating the one address, and calculating a remainder of dividing, by a constant, an integer indicated by a partial bit string which is concatenation of the bits at the plurality of predefined bit positions.

9. The storage medium according to claim 1, the process further comprising:

storing in a second storage unit at least the first individual address or the coordinates of the first individual point as environment information indicating the first environment; and when the first result is output, updating the environment information in the second storage unit by adding, to the environment information, an address of new occurrence that is one of the second individual addresses and is equal to none of the first individual addresses, or coordinates of a point in the coordinate space obtained by mapping the address of new occurrence.

10. The storage medium according to claim 1, the process further comprising:

authenticating a user when the first result is output and a particular device is recognized; and not authenticating the user or calling another authenticating process when failing to recognize the particular device or when the second result is output.

11. An information processing device comprising:

a communication device; and a processor configured to recognize through the communication device a first individual address of each of one or more other devices located in a first environment in which the information processing device is located at a first point in time;

map each first individual address to a first individual point in a coordinate space;

recognize a first distribution using coordinates of each first individual point;

recognize through the communication device a second individual address of each of one or more other devices located in a second environment in which the information processing device is located at a second point in time;

map each second individual address to a second individual point in the coordinate space;

recognize a second distribution using coordinates of each second individual point;

judge whether the first distribution and the second distribution match in accordance with a distribution matching criterion as to whether two distributions match;

output a first result that the first environment and the second environment are identical, when the first distribution and the second distribution are judged to match;

output a second result that the first environment and the second environment are different, when the first distribution and the second distribution are not judged to match;

receive an input of first biometric information from a user;

read second biometric information which is associated with the user and stored in advance in a first storage unit, from the first storage unit; and when the first result is output, judge using a first threshold whether a degree of matching between the first biometric information and the second biometric information satisfies a biometric information matching criterion.

12. A method executed by an information processing device, the method comprising:

recognizing a first individual address of each of one or more other devices located in a first environment in which the information processing device is located at a first point in time;

mapping each first individual address to a first individual point in a coordinate space;

recognizing a first distribution using coordinates of each first individual point;

recognizing a second individual address of each of one or more other devices located in a second environment in which the information processing device is located at a second point in time;

mapping each second individual address to a second individual point in the coordinate space;

recognizing a second distribution using coordinates of each second individual point;

judging whether the first distribution and the second distribution match in accordance with a distribution matching criterion as to whether two distributions match;

outputting a first result that the first environment and the second environment are identical, when the first distribution and the second distribution are judged to match;

outputting a second result that the first environment and the second environment are different, when the first distribution and the second distribution are not judged to match;

receiving an input of first biometric information from a user;

reading second biometric information which is associated with the user and stored in advance in a first storage unit, from the first storage unit; and when the first result is output, judging using a first threshold whether a degree of matching between the first biometric information and the second biometric information satisfies a biometric information matching criterion.

* * * * *